US011876869B2

(12) United States Patent
Liu et al.

(10) Patent No.: US 11,876,869 B2
(45) Date of Patent: Jan. 16, 2024

(54) APPARATUSES, COMPUTER-IMPLEMENTED METHODS, AND COMPUTER PROGRAM PRODUCTS FOR IMPROVED MANAGEMENT, SELECTION, AND PROVISION OF NETWORK ASSET DATA OBJECTS

(71) Applicant: Thrive Market, Inc., Los Angeles, CA (US)

(72) Inventors: Yang Liu, Irvine, CA (US); Mo Lin, Los Angeles, CA (US); Mohammad Sabah, San Pedro, CA (US)

(73) Assignee: Thrive Market, Inc., Los Angeles, CA (US)

(*) Notice: Subject to any disclaimer, the term of this patent is extended or adjusted under 35 U.S.C. 154(b) by 11 days.

(21) Appl. No.: 17/654,666

(22) Filed: Mar. 14, 2022

(65) Prior Publication Data

US 2022/0321672 A1    Oct. 6, 2022

Related U.S. Application Data

(63) Continuation of application No. 17/220,582, filed on Apr. 1, 2021, now Pat. No. 11,290,564.

(51) Int. Cl.
*H04L 67/306* (2022.01)
*G06N 20/00* (2019.01)

(52) U.S. Cl.
CPC ........... *H04L 67/306* (2013.01); *G06N 20/00* (2019.01)

(58) Field of Classification Search
CPC ....... H04L 67/306; H04L 67/02; G06N 20/00; G06N 3/08; G06F 9/4451
See application file for complete search history.

(56) References Cited

U.S. PATENT DOCUMENTS

| 2014/0207793 A1 | 7/2014 | Liu et al. |
| 2015/0168150 A1 | 6/2015 | Kahn et al. |
| 2017/0098236 A1* | 4/2017 | Lee ................ G06Q 10/067 |
| 2021/0089963 A1* | 3/2021 | Baek .................. H04L 67/63 |
| 2021/0241309 A1* | 8/2021 | Wolf, Jr. ............... G06N 5/04 |

* cited by examiner

*Primary Examiner* — Soe Hlaing
(74) *Attorney, Agent, or Firm* — Alston & Bird LLP

(57) ABSTRACT

Embodiments of the present disclosure provide for improved management, selection, and provision of network asset data objects. For example, embodiments described throughout are configured to score various network assets corresponding to real-world assets, items, products, and/or the like, for selection and provision associated with one or more particular user profile identifiers. Embodiments are configured to train network asset scoring model(s) based on specific data, such as prioritized network asset data set(s), such that the trained network asset scoring model(s) efficiently generate more accurate, improved scores for network asset data objects. Additional or alternative embodiments are configured to provide data tagged network asset set(s) utilizing specially trained model(s), such as one or more multi-armed bandit models and/or one or more network asset scoring model(s).

20 Claims, 23 Drawing Sheets

APPARATUSES, COMPUTER-IMPLEMENTED METHODS, AND COMPUTER PROGRAM PRODUCTS FOR IMPROVED MANAGEMENT, SELECTION, AND PROVISION OF NETWORK ASSET DATA OBJECTS

CROSS-REFERENCE TO RELATED APPLICATIONS

This application is a continuation of U.S. patent application Ser. No. 17/220,582, titled "Apparatuses, Computer-Implemented Methods, And Computer Program Products For Improved Management, Selection, And Provision Of Network Asset Data Objects," filed Apr. 1, 2021, the contents of which are incorporated herein by references in its entirety.

TECHNOLOGICAL FIELD

Embodiments of the present disclosure generally relate to distribution of electronically represented data objects maintained by or otherwise available via a particular computing system, and specifically to improved maintenance, selection, and provision of one or more network asset data object(s) to a client device associated with a particular user profile identifier.

BACKGROUND

Systems that aim to select and provide particular data for a profile (e.g., a representation of a user registered with the system) often do not function in a manner that sufficiently identifies particular data as optimal for providing for the particular profile based on a target goal. In circumstances where a particular user utilizes a profile accesses such system, for example to view, browse, or search such data, some systems utilize rudimentary algorithmic and/or other processing methodologies to select and provide data arbitrarily believed to be best for the particular profile, but that in actuality may not be a good fit and result in wasted utilization of resources in selecting and providing such data. Applicant has discovered problems with current implementations of managing, selecting, and providing network asset data object(s). Through applied effort, ingenuity, and innovation, Applicant has solved many of these identified problems by developing embodied in the present disclosure, which are described in detail below.

BRIEF SUMMARY

In general, embodiments of the present disclosure provide for improved management, selection, and provision of network asset data objects. Other implementations for improved management, selection, and provision of network asset data objects will be, or will become, apparent to one with skill in the art upon examination of the following figures and detailed description. It is intended that all such additional implementations be included within this description be within the scope of the disclosure, and be protected by the following claims.

In accordance with a first aspect of the disclosure, a computer-implemented method for improved management, selection, and provision of network asset data objects is provided. The computer-implemented method may be executed via one or more computing devices embodied in hardware, software, firmware, and/or a combination thereof, as described herein. An example embodiment of the computer-implemented method includes accessing enterprise network interaction data comprising an interaction data set associated with a unique profile identifier, the interaction data set associated with at least a prioritized network asset data set provided associated with the unique profile identifier, each prioritized network asset of the prioritized network asset data set satisfying an asset prioritization threshold. The example computer-implemented method further includes generating a network interaction training data corpus based at least on the enterprise network interaction data. The example computer-implemented method further includes training at least one network asset scoring model based on at least the network interaction training data corpus. The example computer-implemented method further includes determining a scored network assets data set for the unique profile identifier based on the trained at least one network asset scoring model. The example computer-implemented method further includes providing at least a portion of the scored network assets data set associated with the unique profile identifier via at least one network assets serving database.

Additionally or alternatively, in some embodiments, the prioritized network asset data set comprises a subset of a second scored network assets data set, the subset of the second scored network assets data set comprising one or more network assets of the second scored network assets data set the asset prioritization threshold based on an arrangement of the second scored network assets data set.

Additionally or alternatively, in some embodiments, the example computer-implemented method further includes receiving the enterprise network interaction data associated with the unique profile identifier in response to user interaction with at least one network asset display interface; and storing the enterprise network interaction data in an enterprise network interaction database, where accessing the enterprise network interaction data comprises accessing from the enterprise network interaction database based on the unique profile identifier.

Additionally or alternatively, in some embodiments, the portion of the scored network assets data set associated with the unique profile identifier comprises a second prioritized network asset data set arranged based on the scored network assets data set for the unique profile identifier.

Additionally or alternatively, in some embodiments, providing at least the portion of the scored network assets data set associated with the unique profile identifier via the at least one network assets serving database includes pushing at least the portion of the scored network assets data set associated with the unique profile identifier via the at least one network assets serving database; and causing, via interaction with the at least one network assets serving database, rendering of a network asset display interface comprising at least the portion of the scored network assets data set via a user-facing network asset transaction application on a client device. Additionally or alternatively, in some such embodiments, the network asset display interface comprises a carousel display interface configured to, in response to user interaction, enable transitioning between the at least the portion of the data tagged network asset set associated with the unique profile identifier.

Additionally or alternatively, in some embodiments, providing at least the portion of the scored network assets data set associated with the unique profile identifier via the at least one network assets serving database includes pushing at least the portion of the scored network assets data set associated with the unique profile identifier via the at least one network assets serving database; and causing, via interaction with the at least one network assets serving database, rendering of a user interface comprising at least the portion of the scored network assets data set via a third-party application on a client device.

Additionally or alternatively, in some embodiments, generating the network interaction training data corpus based at least on the enterprise network interaction data includes applying a transformation protocol to the enterprise network interaction data to create a first network interaction training data corpus; receiving a synchronous network interaction data set; applying the transformation protocol to the synchronous network interaction data set to create a second network interaction training data corpus; and generating the network interaction training data corpus from the first network interaction training data corpus and the second network interaction training data corpus.

Additionally or alternatively, in some embodiments, providing at least the portion of the scored network assets data set associated with the unique profile identifier via the at least one network assets serving database includes pushing at least the portion of the scored network assets data set associated with the unique profile identifier to a first network assets serving database and a second network assets serving database; causing, via interaction with the first network assets serving database, rendering of a network asset display interface comprising at least the portion of the scored network assets data set via a user-facing network asset transaction application on a client device; and causing, via interaction with the second network assets serving database, rendering of a user interface comprising at least the portion of the scored network assets data set via a third-party application on the client device.

In accordance with a second aspect of the disclosure, an apparatus for improved management, selection, and provision of network asset data objects is provided. In some embodiments, an example apparatus includes at least one processor and at least one memory having computer-coded instructions stored thereon. The computer-coded instructions, in execution with at least one processor, configure the apparatus to perform any one of the example computer-implemented methods described herein. Another example apparatus includes means for performing each step of any one of the example computer-implemented methods described herein.

In accordance with a third aspect of the disclosure, a computer program product for improved management, selection, and provision of network asset data objects is provided. In some embodiments, an example computer program product includes at least one non-transitory computer-readable storage medium having computer program code stored thereon that, in execution with at least one processor, configured for performing any one of the example computer-implemented methods described herein.

In accordance with a fourth aspect of the disclosure, a computer-implemented method for improved management, selection, and provision of network asset data objects is provided. The computer-implemented method may be executed via one or more computing devices embodied in hardware, software, firmware, and/or a combination thereof, as described herein. A second example embodiment of the computer-implemented method includes accessing enterprise network interaction data comprising an interaction data set associated with a unique profile identifier, at least a portion of the enterprise network interaction data accessed from an enterprise network interaction database. The second example computer-implemented method further includes accessing a set of data tagged network asset sets, each data tagged network asset set associated with a shared network asset tag data object of a shared network asset tag data object set. The second example computer-implemented method further includes training at least one multi-armed bandit model to, based on the enterprise network interaction data and the set of data tagged network asset sets, provide a selected network asset scoring model from a network asset scoring model set and a selected data tagged network asset set from the set of data tagged network asset sets. The second example computer-implemented method further includes providing at least a portion of the data tagged network asset set associated with the unique profile identifier based on the selected network asset scoring model and the selected data tagged network asset set.

Additionally or alternatively, in some embodiments, each network asset scoring model of the network asset scoring model set is trained based on the enterprise network interaction data and explicit user insight data.

Additionally or alternatively, in some embodiments, the second example computer-implemented method further includes identifying an available network asset set; generating a selected shared network asset tag data object based on historical network asset transaction data associated with the unique profile identifier; and associating one or more network assets from the available network asset set with the selected shared network asset tag data object based on the historical network asset transaction data, the one or more network assets representing the selected data tagged network asset set.

Additionally or alternatively, in some embodiments, the second example computer-implemented method further includes identifying an available network asset set; generating a selected shared network asset tag data object based on asset detail information associated with one or more of network assets of the available network asset set; and associating the one or more network assets from the available network asset set with the selected shared network asset tag data object.

Additionally or alternatively, in some such embodiments, the second example computer-implemented method includes utilizing an asset clustering algorithm or topic modeling algorithm to associate the one or more network assets from the available network asset set with the selected shared network asset tag data object.

Additionally or alternatively, in some embodiments, the second example computer-implemented method further includes updating the at least one multi-armed bandit model associated with the unique profile identifier based at least on the enterprise network interaction data associated with the unique profile identifier.

Additionally or alternatively, in some embodiments, generating at least the portion of the data tagged network asset set includes generating, utilizing the selected network asset scoring model, a scored network asset data set from the selected data tagged network asset set; and providing at least a portion of the scored network data asset set.

Additionally or alternatively, in some embodiments, the second example computer-implemented method further includes receiving the enterprise network interaction data associated with the unique profile identifier in response to user interaction with at least one network asset display interface; and storing the enterprise network interaction data in an enterprise network interaction database, where the enterprise network interaction data is accessed from the enterprise network interaction database based on the unique profile identifier.

Additionally or alternatively, in some embodiments, the portion of the data tagged network asset set comprises a prioritized network asset data set, each network asset of the prioritized network asset data set arranged based on a network asset score generated by the selected network asset scoring model.

Additionally or alternatively, in some embodiments, providing at least the portion of the data tagged network asset set associated with the unique profile identifier based on the selected network asset scoring model and the selected data tagged network asset set includes causing rendering of a network asset display interface comprising at least the portion of the data tagged network asset set associated with the unique profile identifier.

Additionally or alternatively, in some embodiments, the network asset display interface comprises a carousel display interface configured to, in response to user interaction, enable transitioning between the at least the portion of the data tagged network asset set associated with the unique profile identifier.

In accordance with a fifth aspect of the disclosure, a second apparatus for improved management, selection, and provision of network asset data objects is provided. In some embodiments, a second example apparatus includes at least one processor and at least one memory having computer-coded instructions stored thereon. The computer-coded instructions, in execution with at least one processor, configure the second example apparatus to perform any one of the second example computer-implemented methods described herein. Another second example apparatus includes means for performing each step of any one of the second example computer-implemented methods described herein.

In accordance with a sixth aspect of the disclosure, a second example computer program product for improved management, selection, and provision of network asset data objects is provided. In some embodiments, a second example computer program product includes at least one non-transitory computer-readable storage medium having computer program code stored thereon that, in execution with at least one processor, configured for performing any one of the second example computer-implemented methods described herein.

BRIEF DESCRIPTION OF THE DRAWINGS

Figure 1:
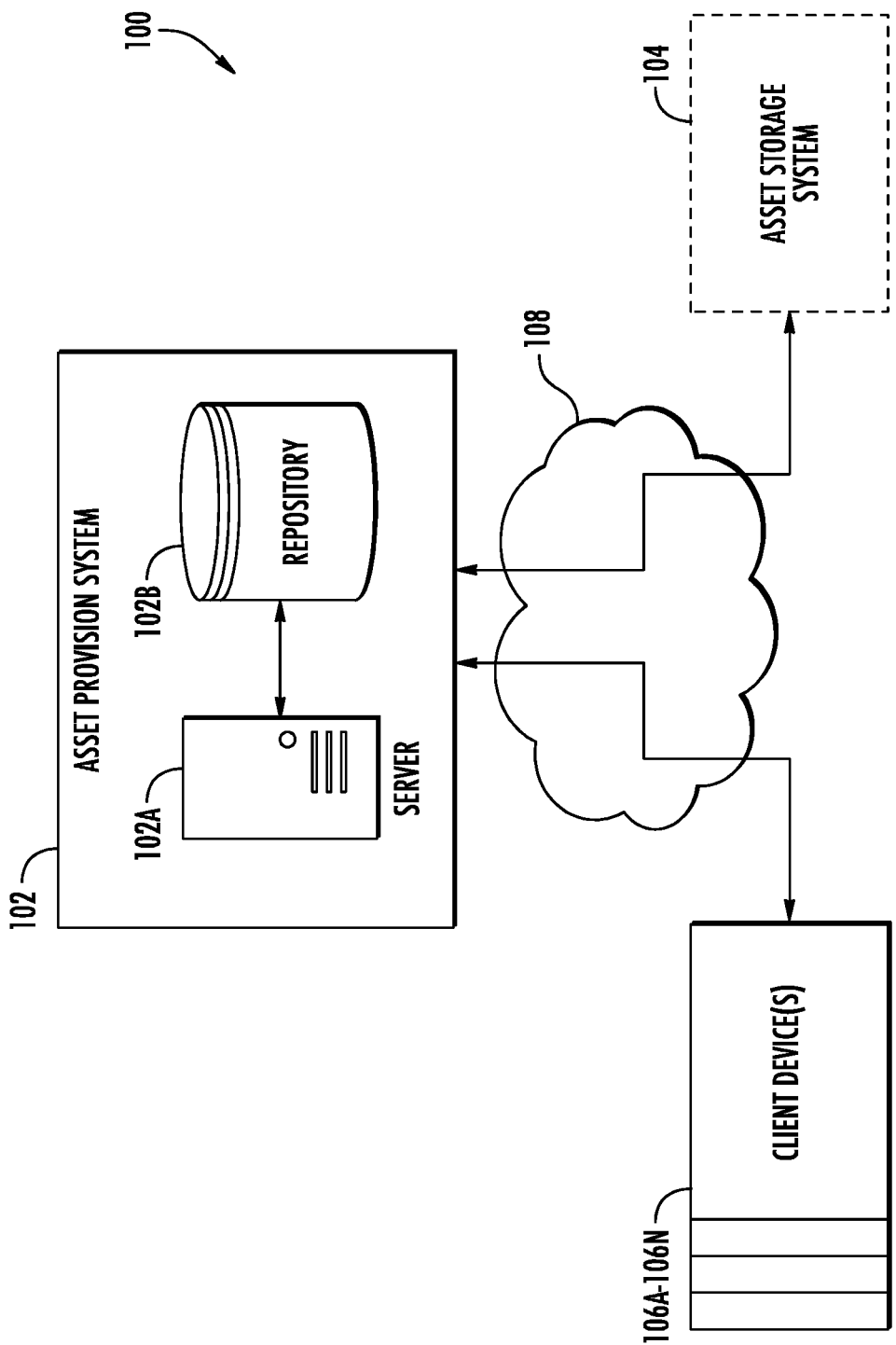
Figure 2:
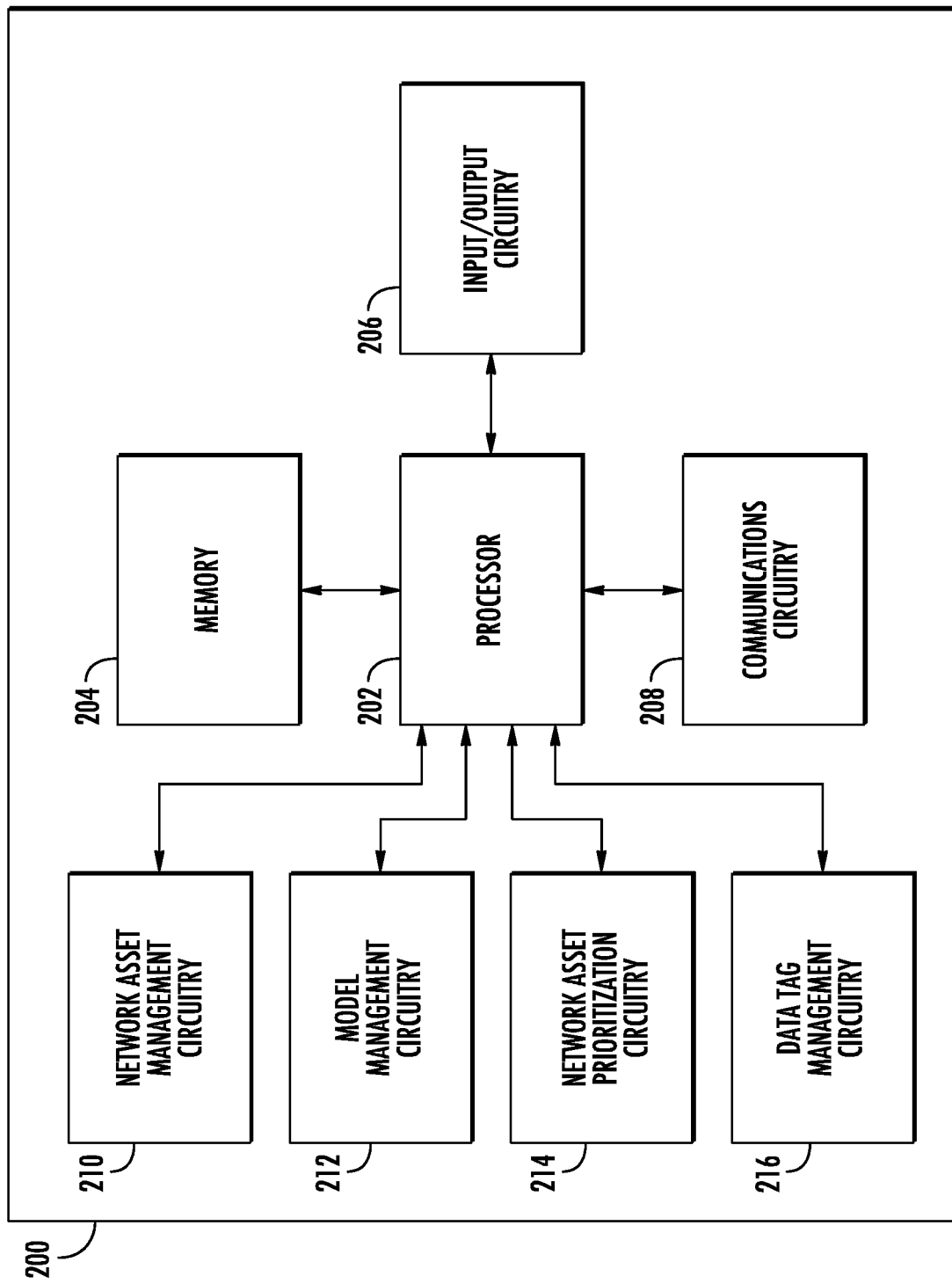
Figure 3:
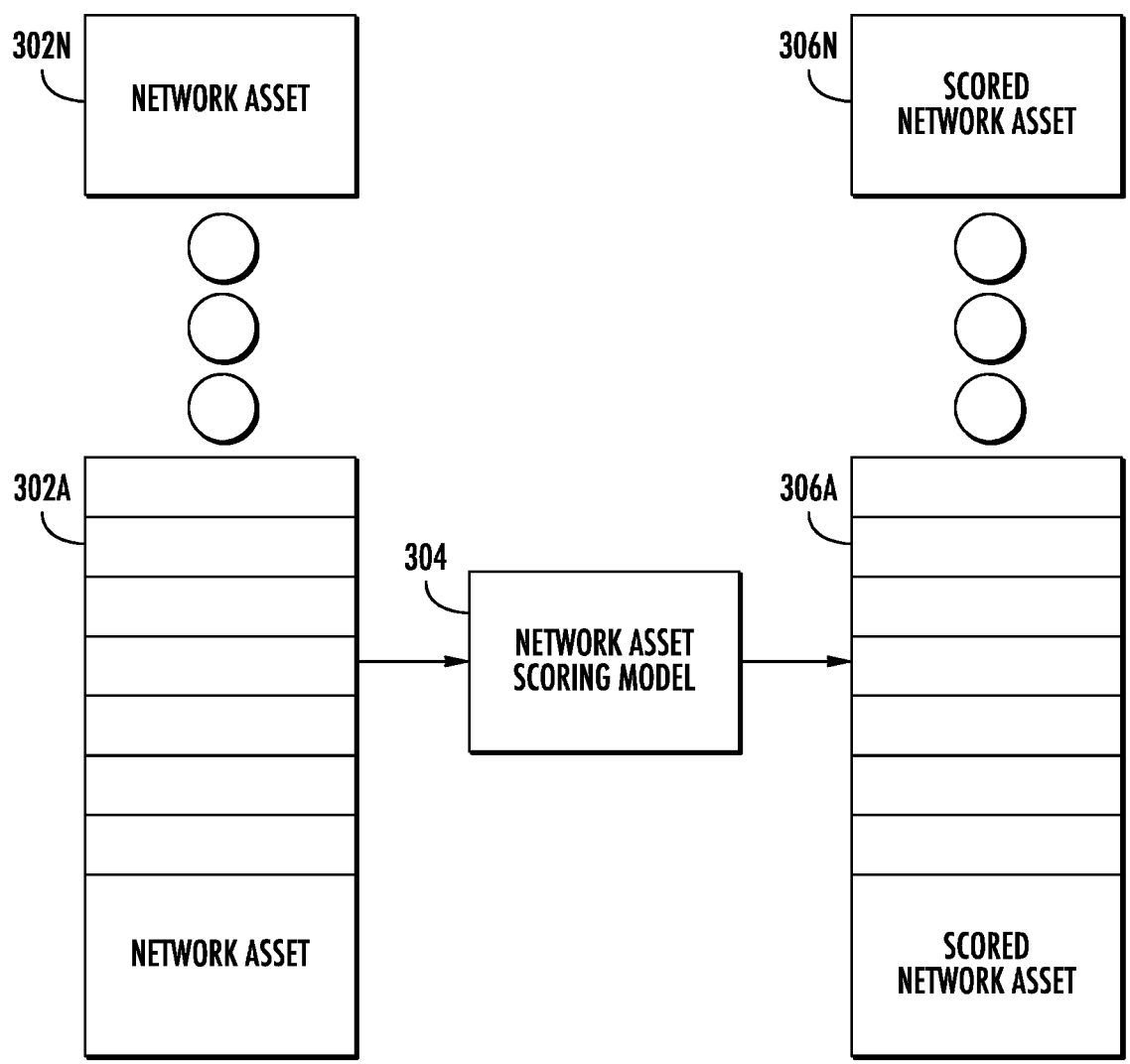
Figure 4:
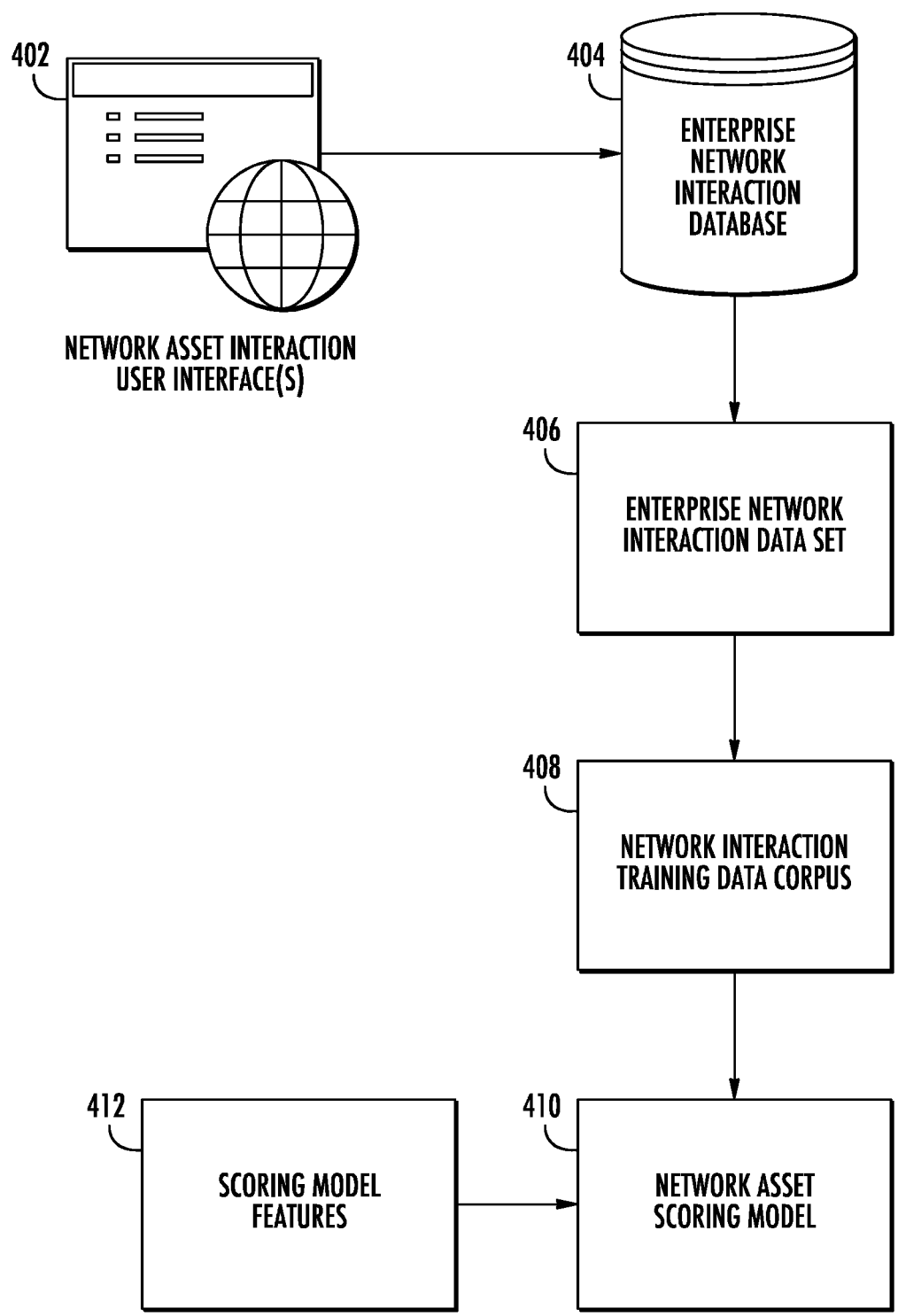
Figure 5:
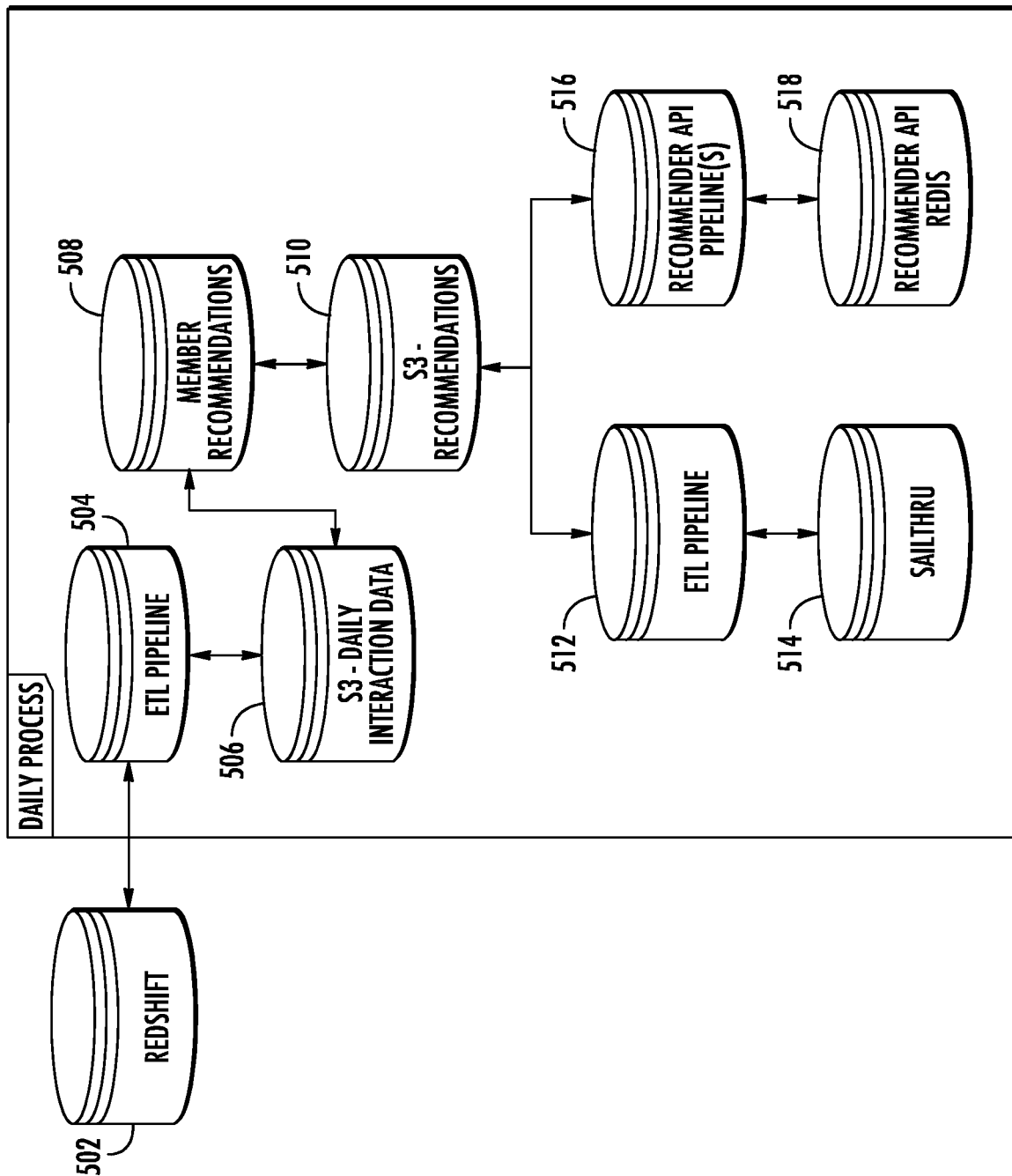
Figure 6:
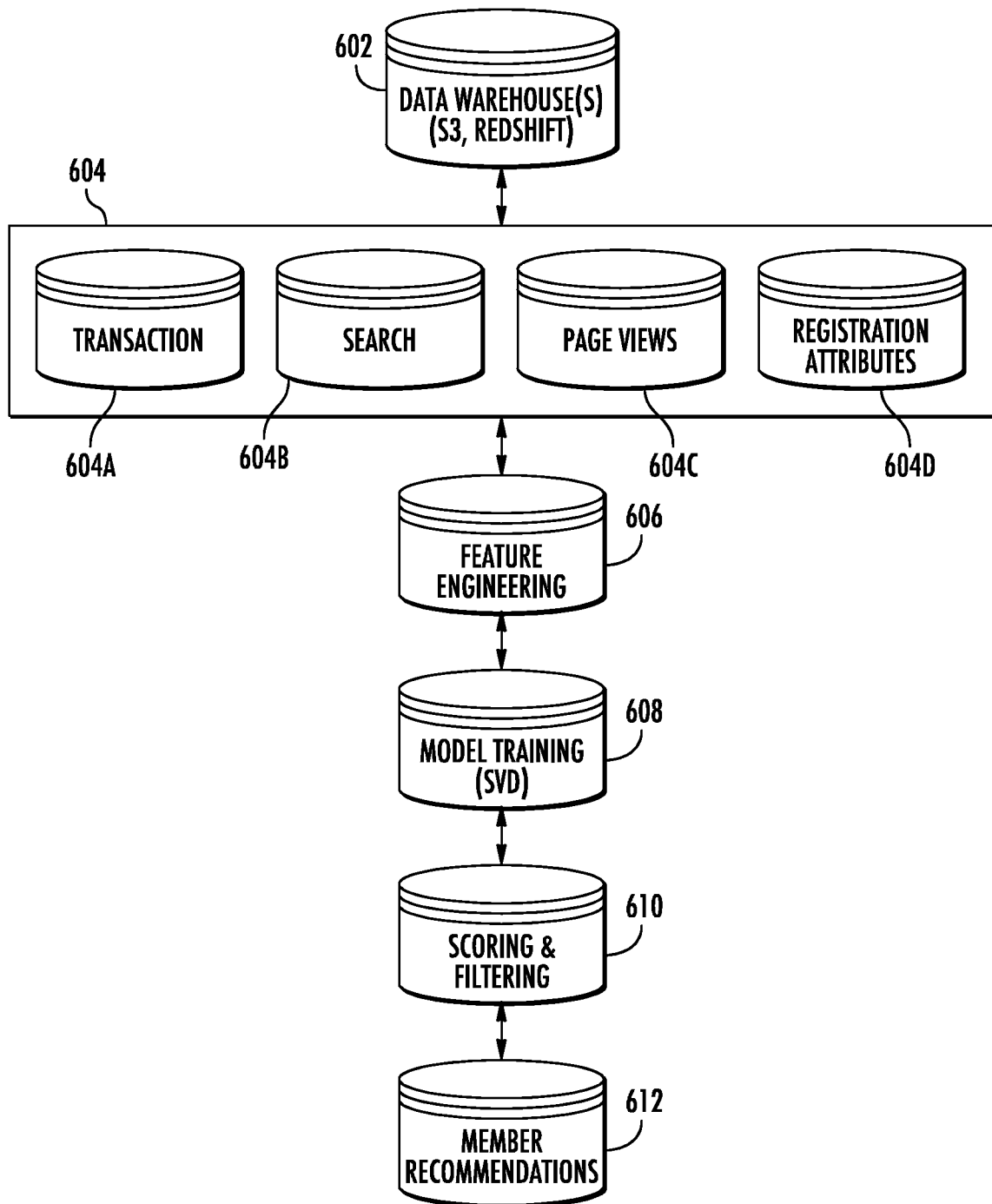
Figure 7:
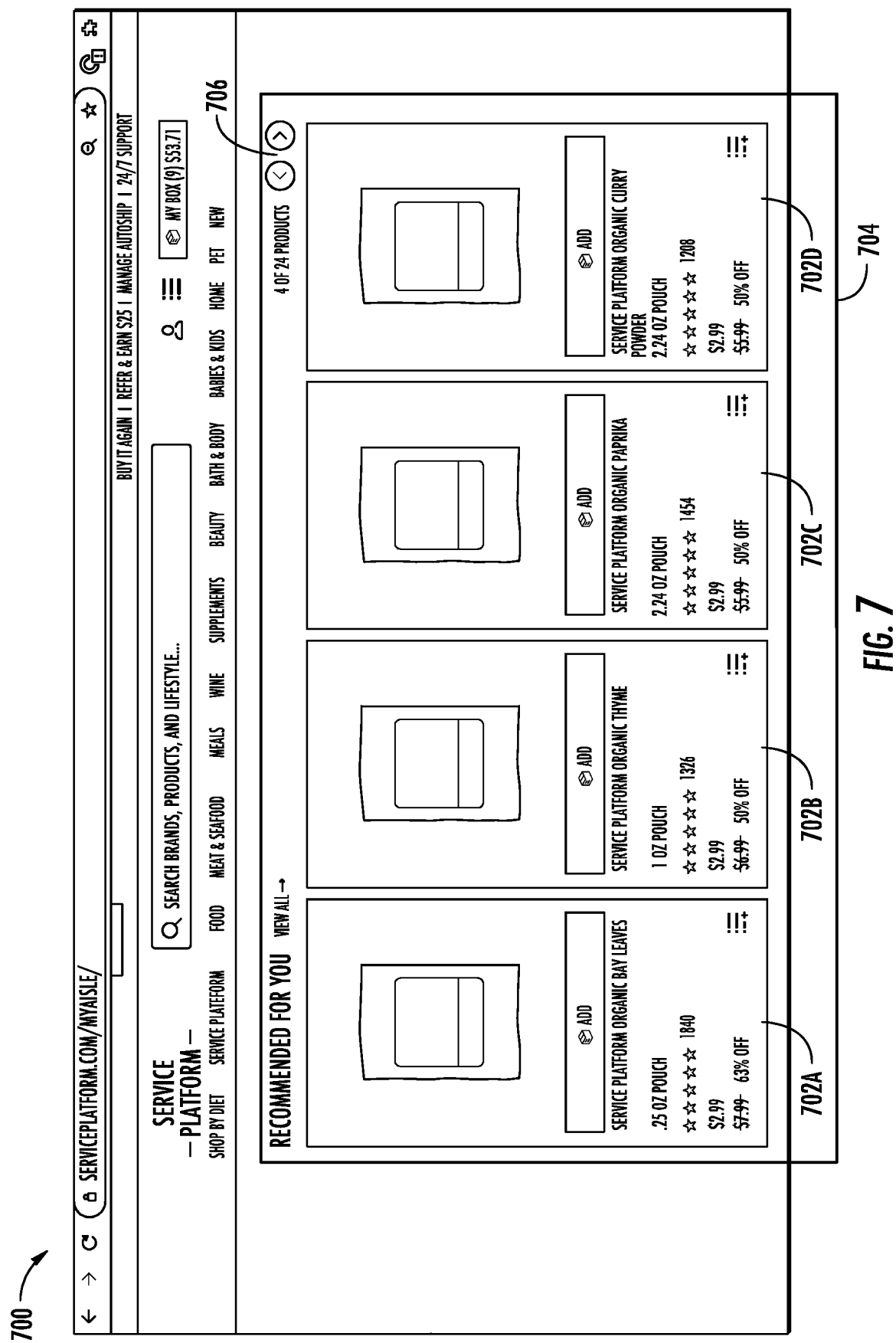
Figure 8:
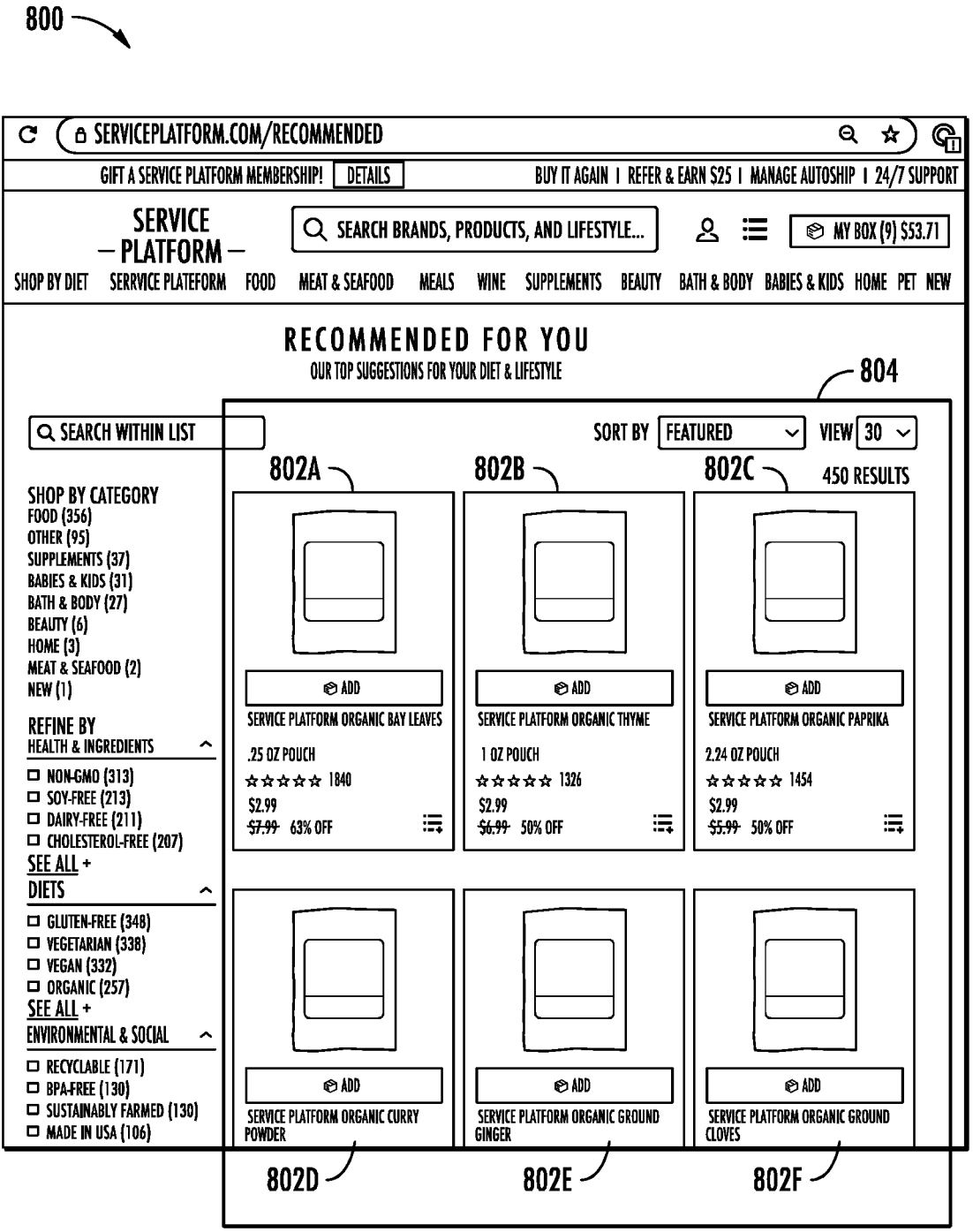
Figure 9:
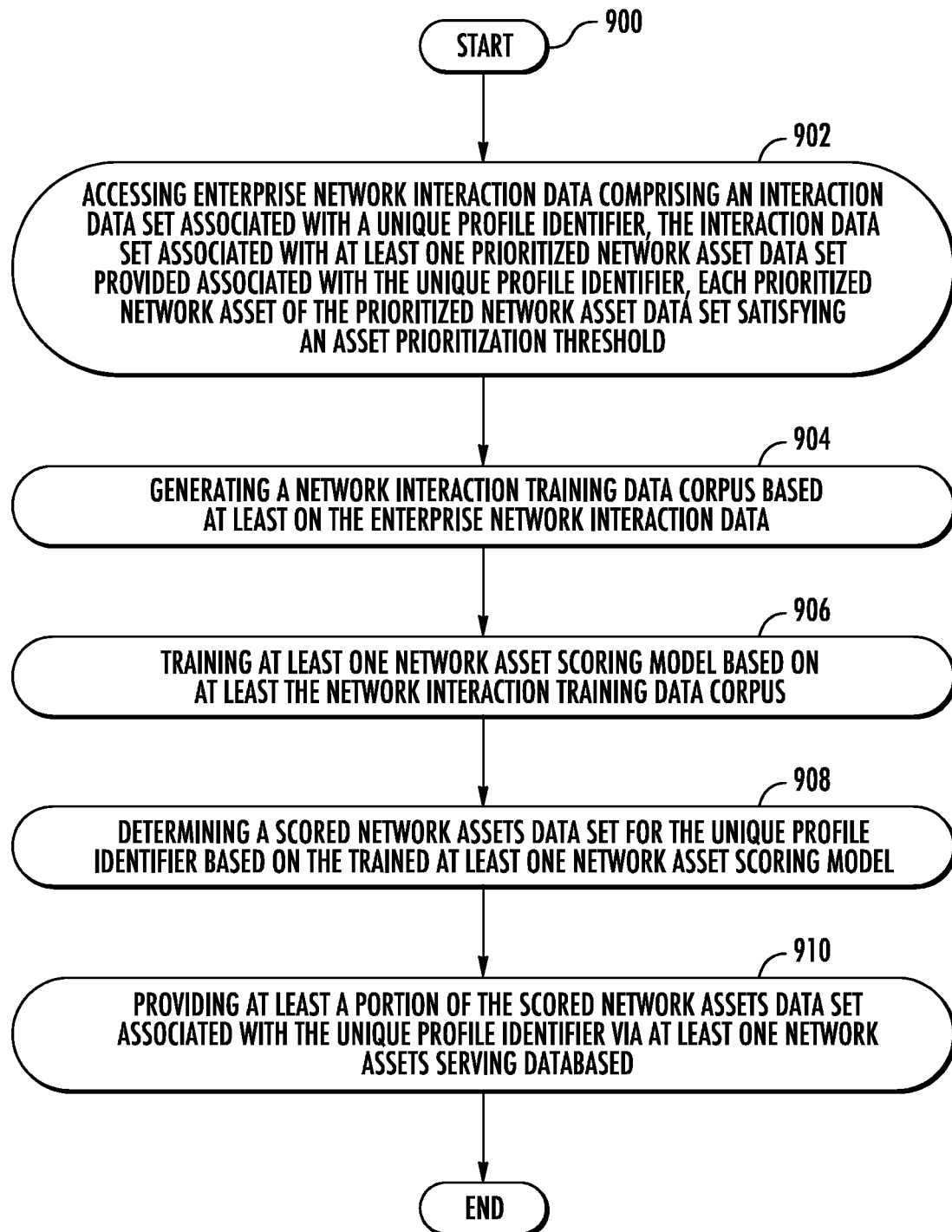
Figure 10:
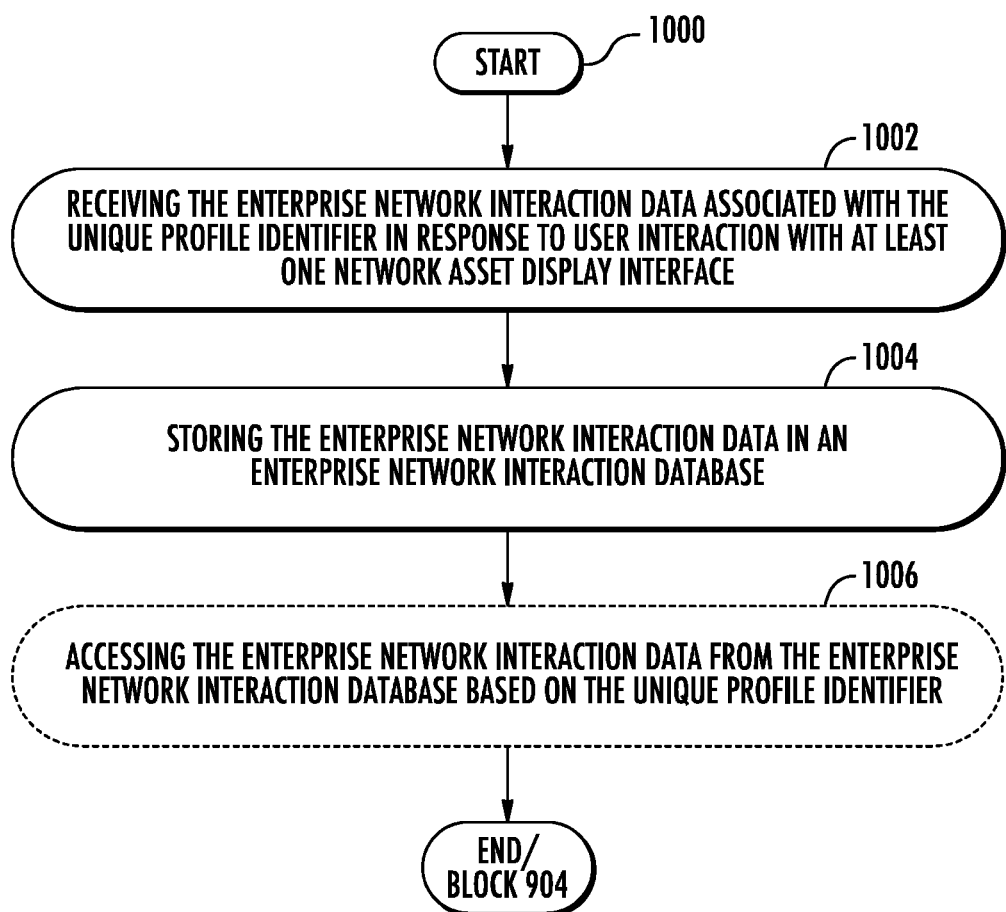
Figure 11:
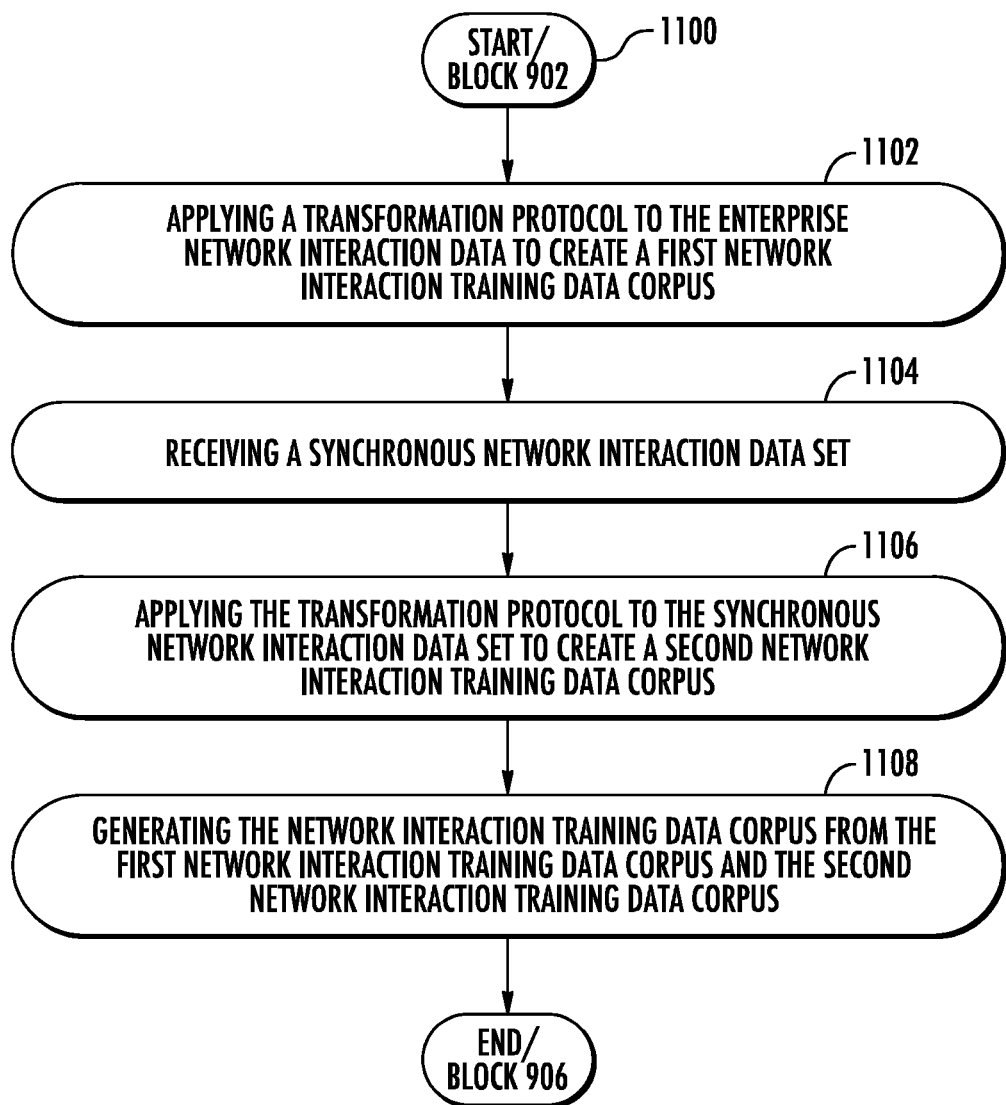
Figure 12:
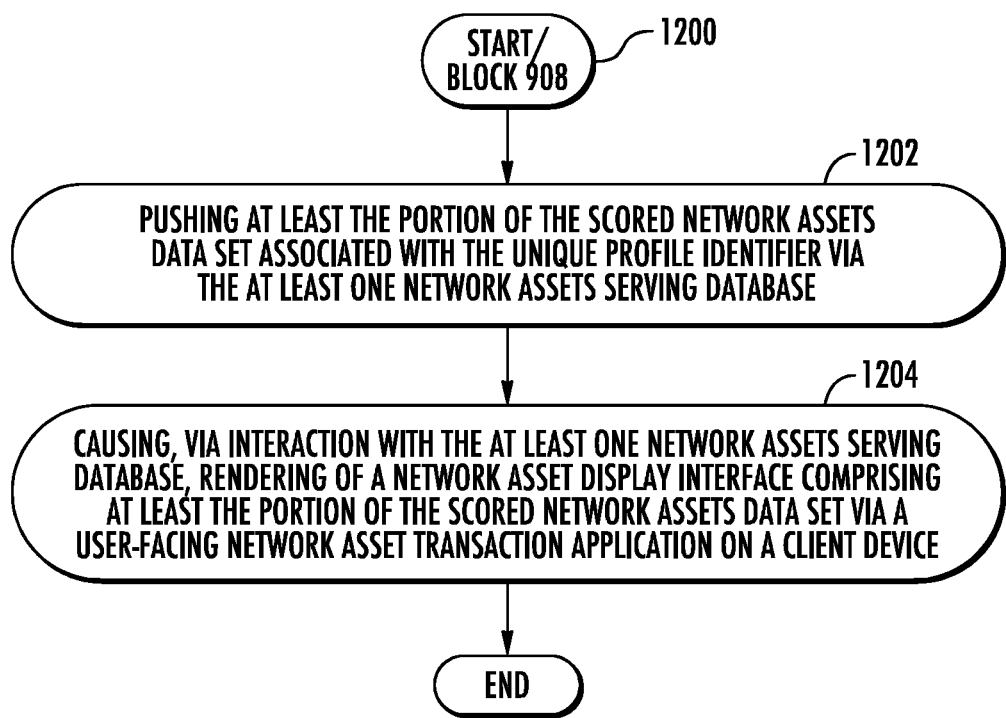
Figure 13:
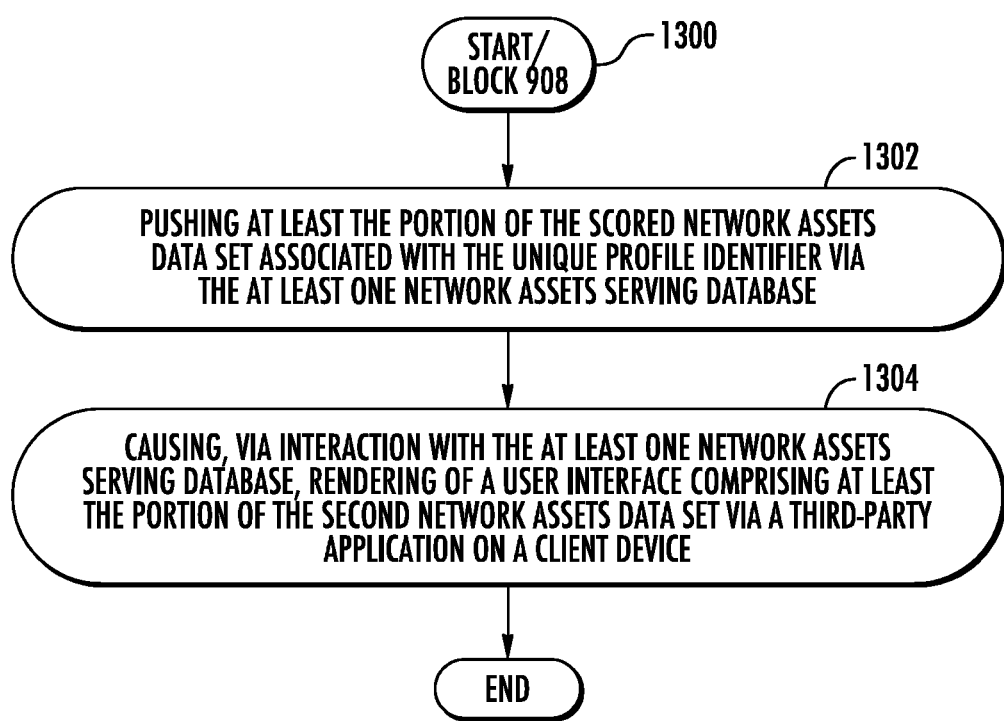
Figure 14:
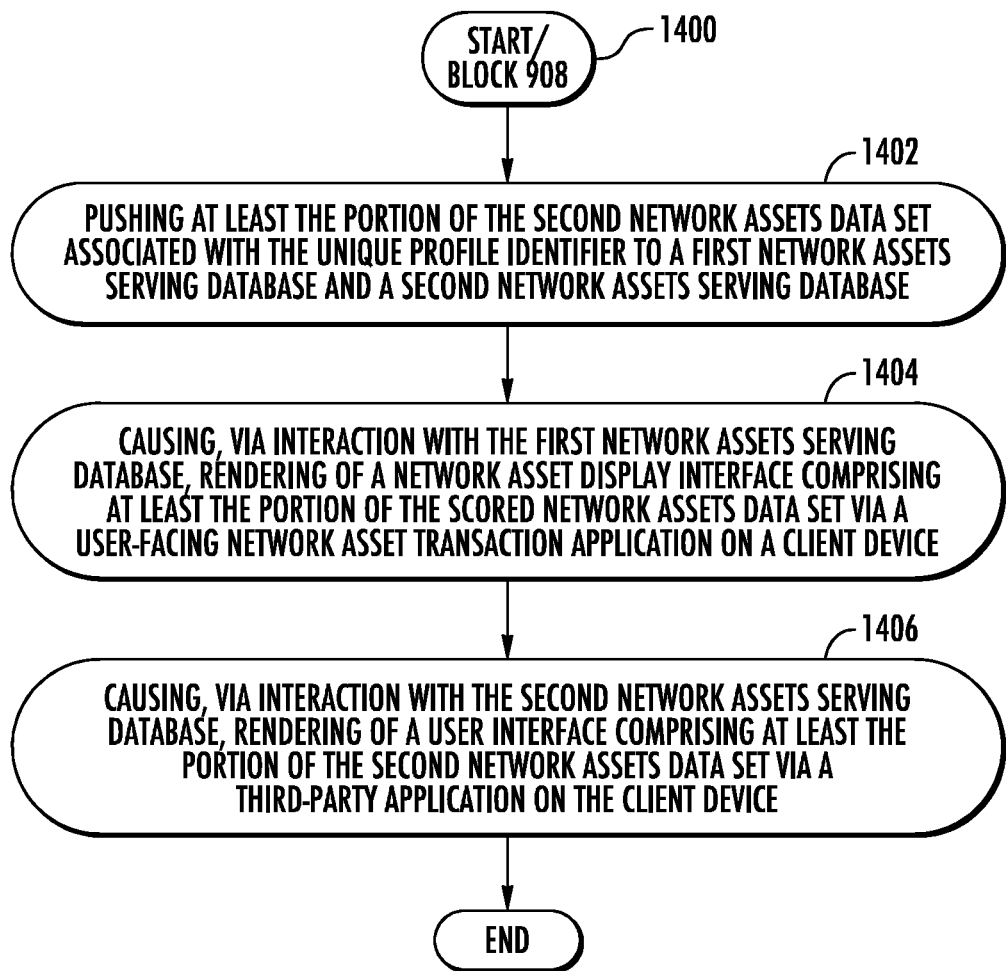
Figure 15:
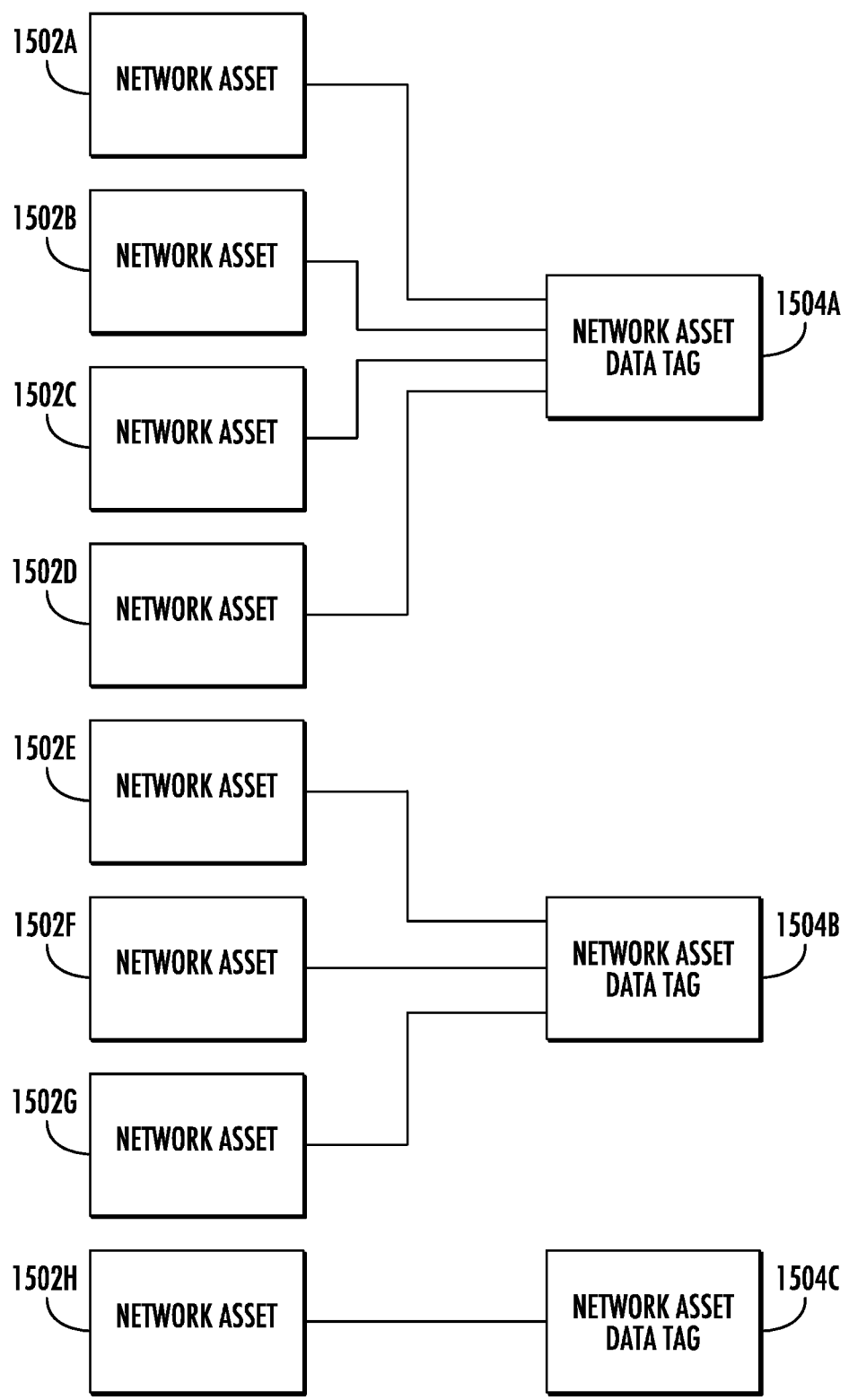
Figure 16:
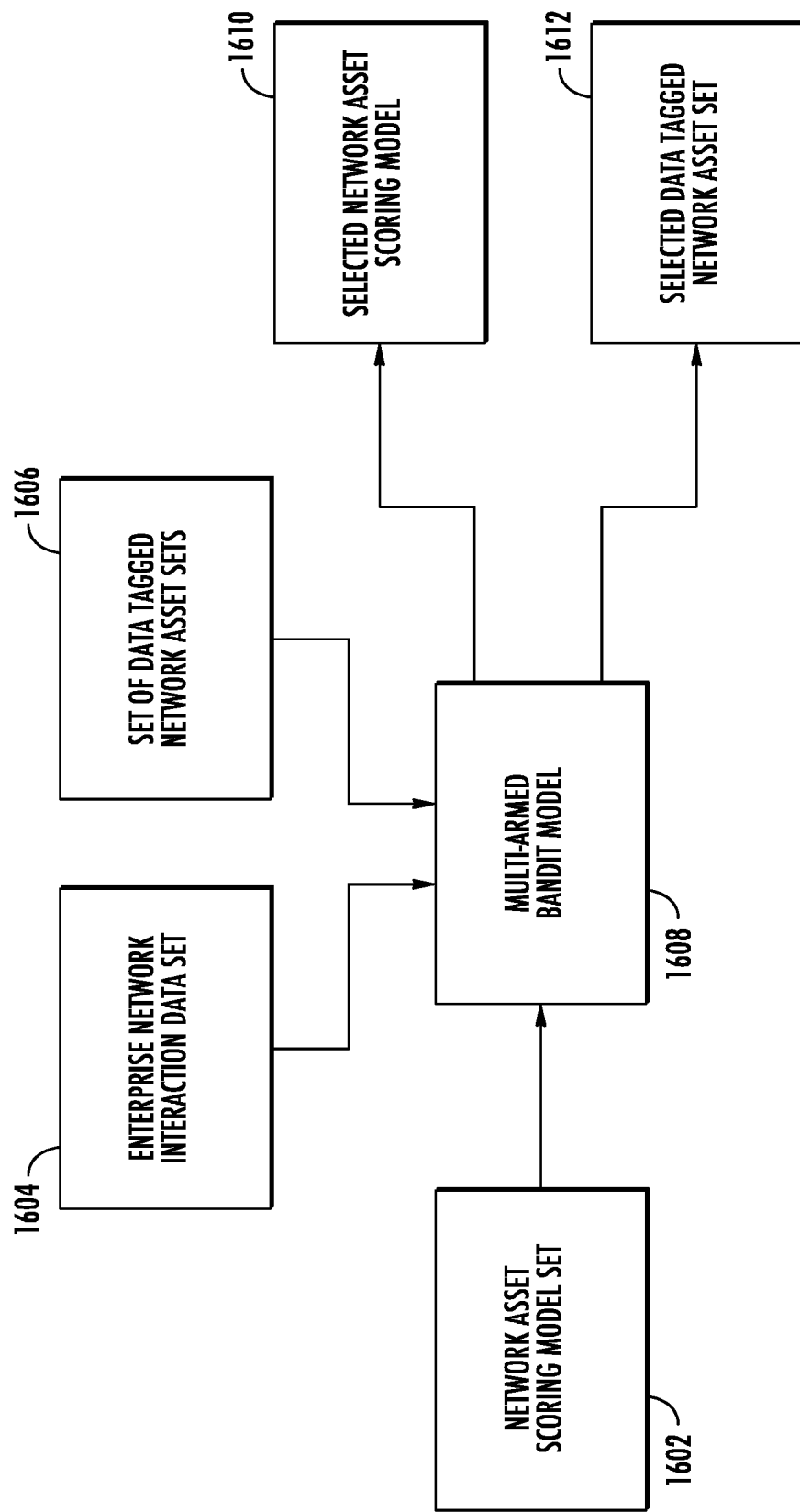
Figure 17:
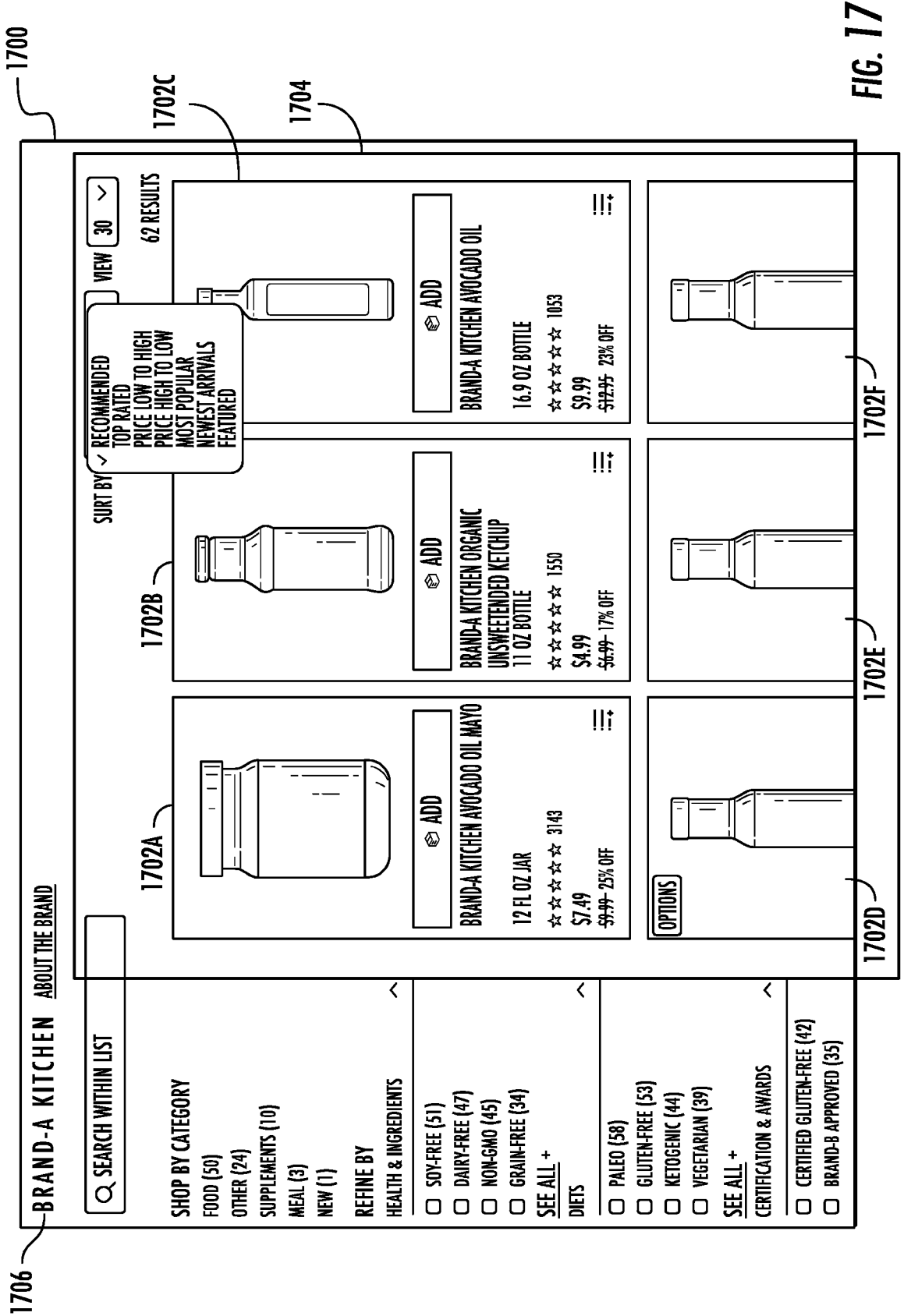
Figure 18:
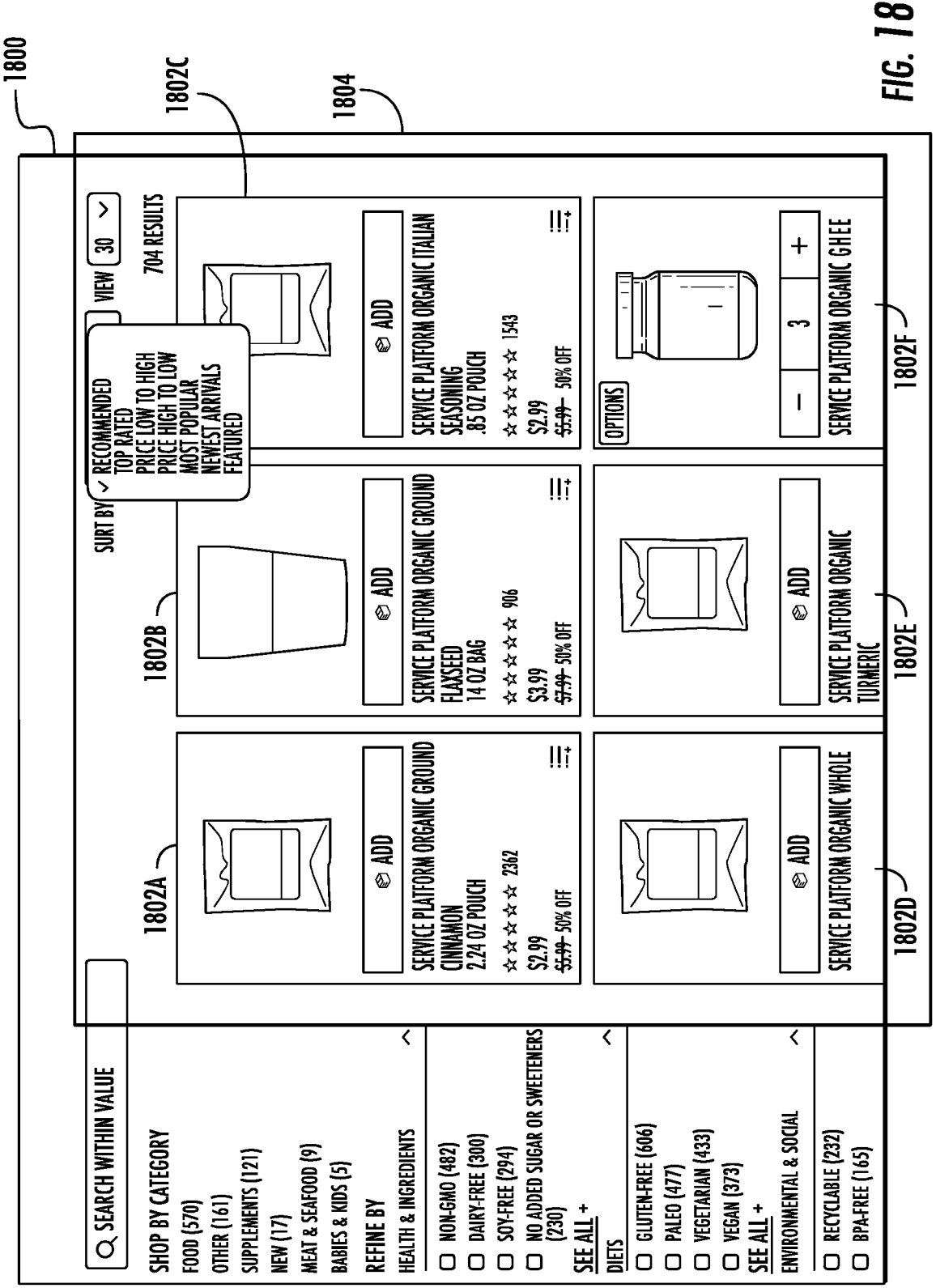
Figure 19:
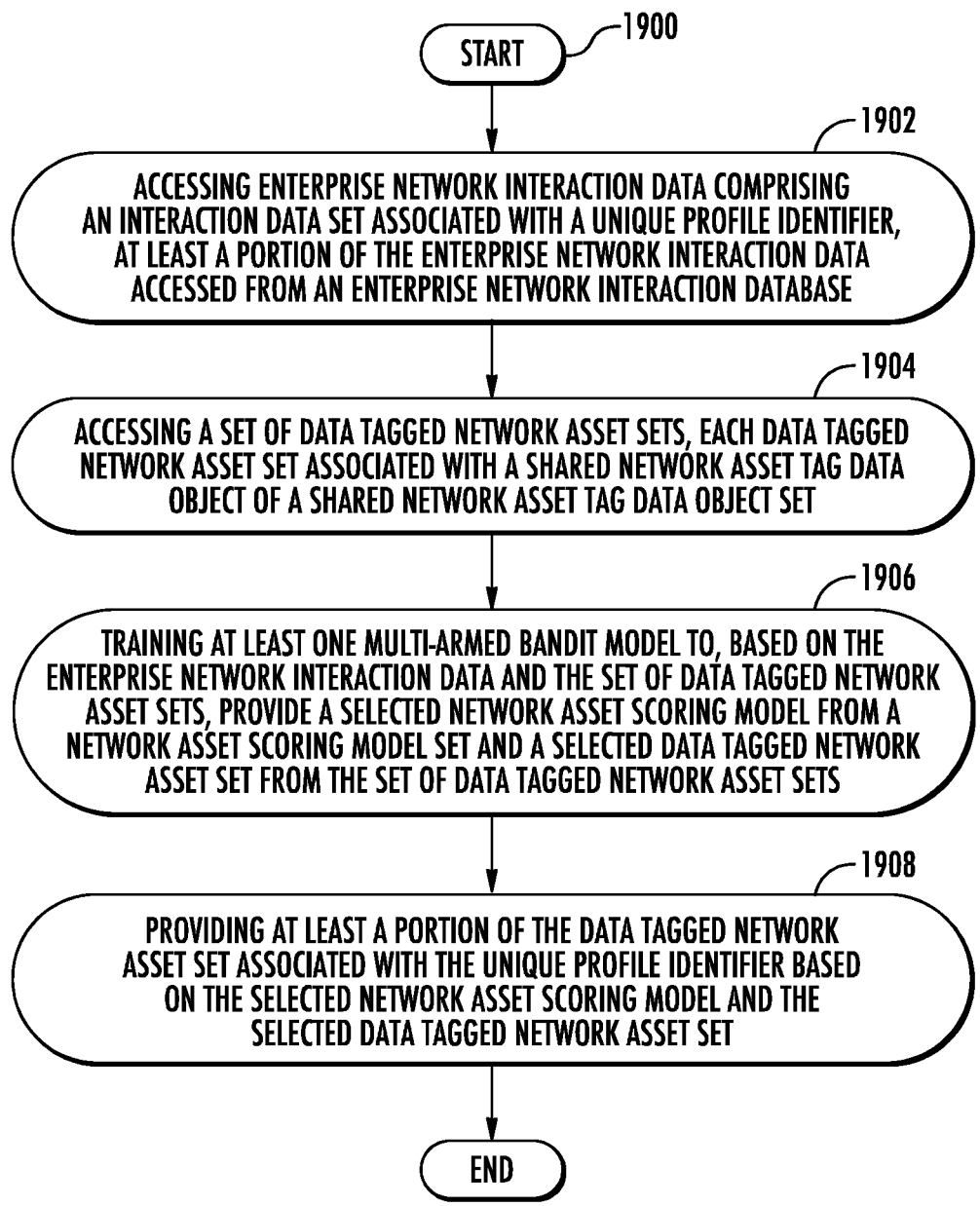
Figure 20:
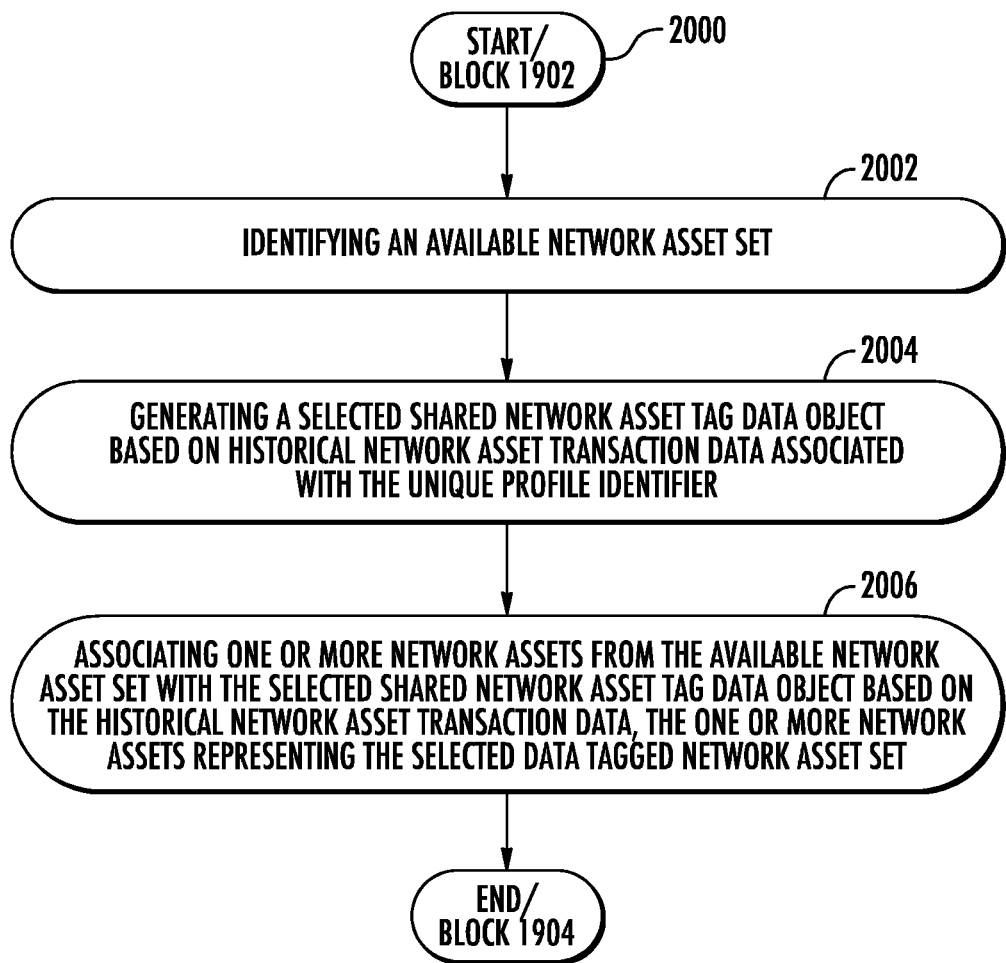
Figure 21:
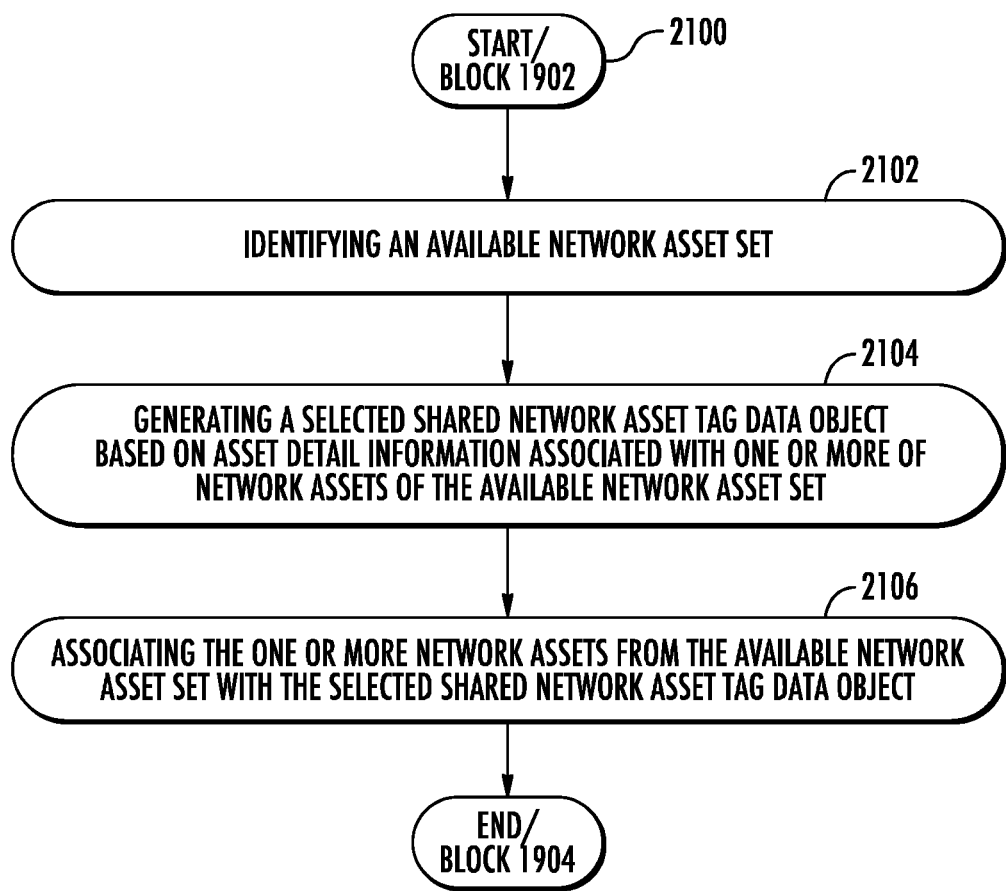
Figure 22:
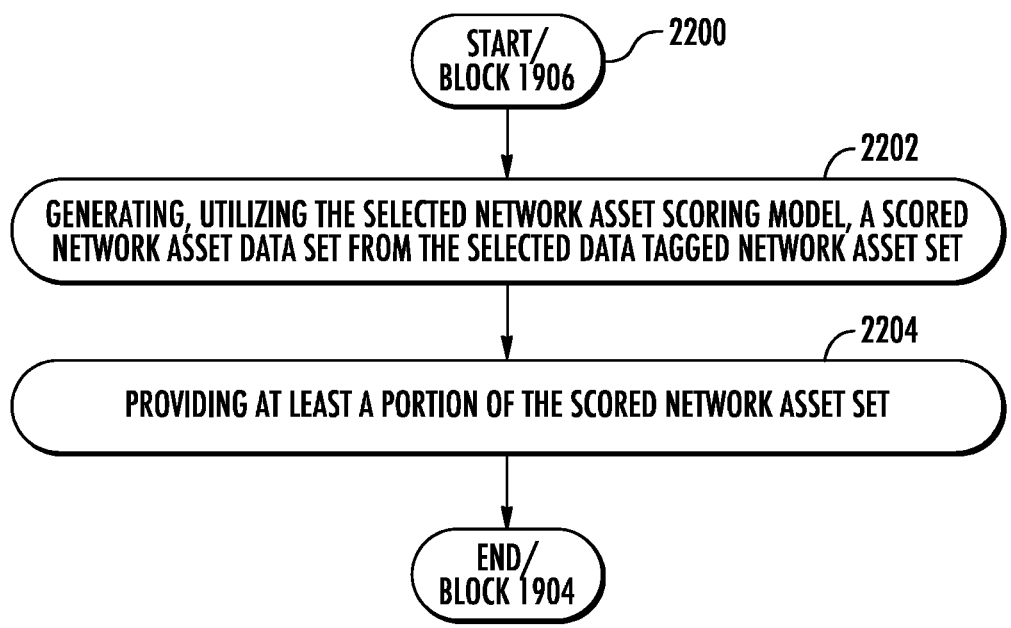
Figure 23:
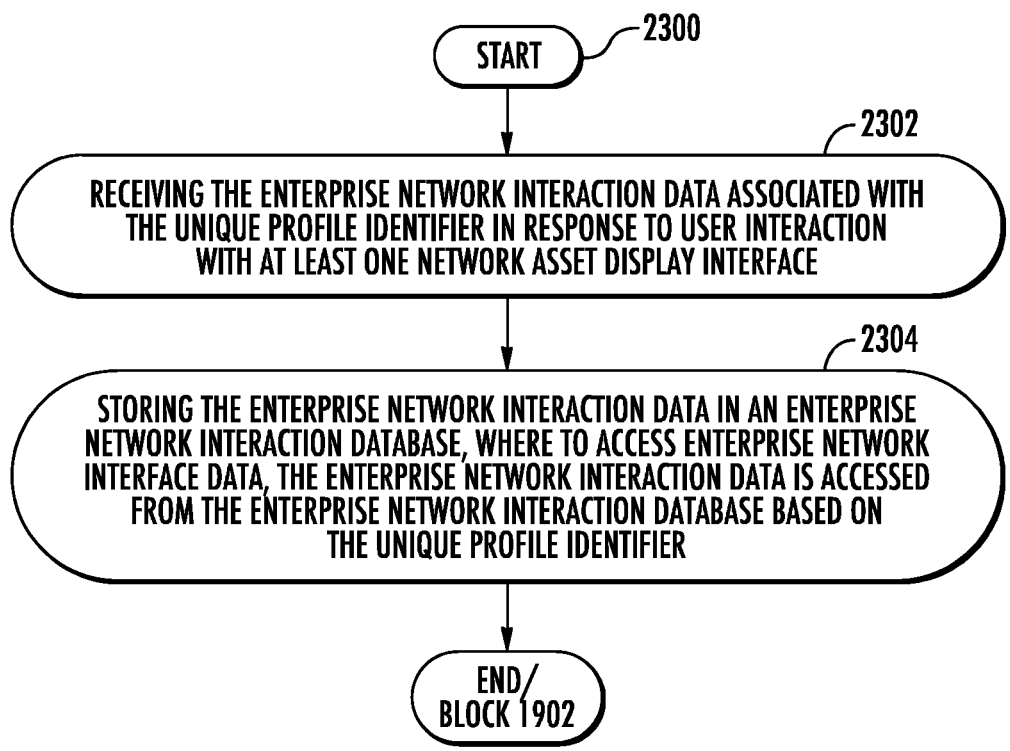
Figure 24:
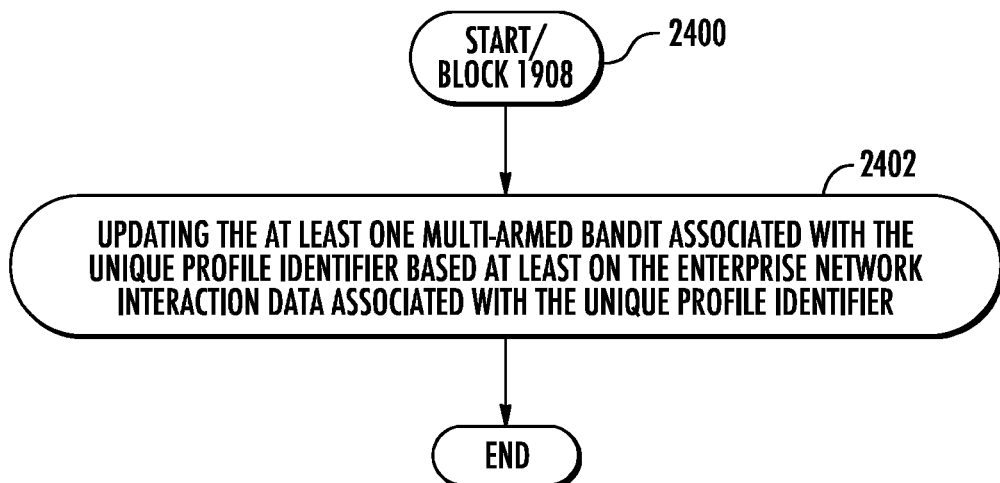
Figure 25:
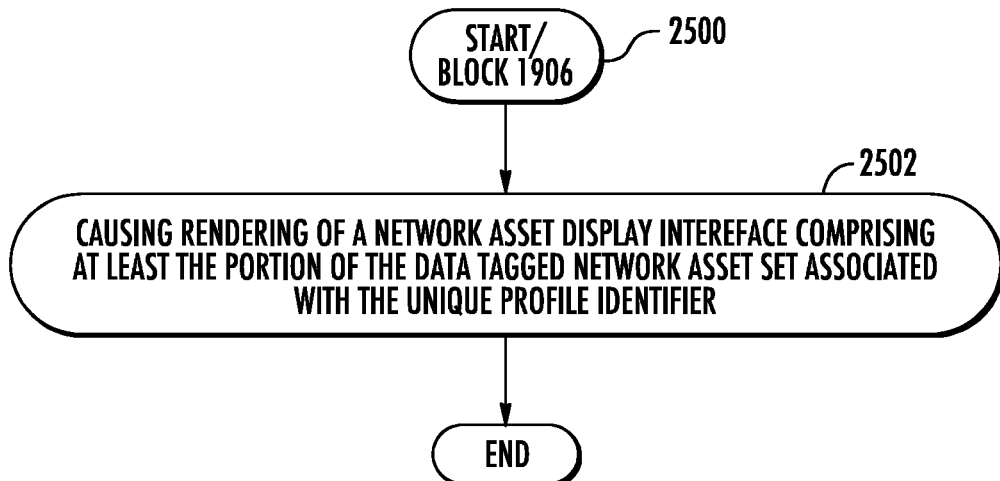

Having thus described the embodiments of the disclosure in general terms, reference now will be made to the accompanying drawings, which are not necessarily drawn to scale, and wherein:

FIG. 1 illustrates a block diagram of an asset management system that may be specially configured within which embodiments of the present disclosure may operate;

FIG. 2 illustrates a block diagram of an example network asset processing apparatus that may be specially configured in accordance with at least some example embodiment of the present disclosure;

FIG. 3 illustrates a visualization of an example computing environment for determining at least one scored network asset set in accordance with at least some example embodiments of the present disclosure;

FIG. 4 illustrates a visualization of an example computing environment for training a network asset scoring model in accordance with at least some example embodiments of the present disclosure;

FIG. 5 illustrates a visualization of example computing components for providing at least one network asset set in accordance with at least some example embodiments of the present disclosure;

FIG. 6 illustrates a visualization of example computing components for determining at least one network asset set to be provided in accordance with at least some example embodiments of the present disclosure;

FIG. 7 illustrates an example user interface including an example carousel display interface including network asset data object(s) in accordance with at least some example embodiments of the present disclosure;

FIG. 8 illustrates another example user interface including network asset data object(s) in accordance with at least some example embodiments of the present disclosure;

FIG. 9 illustrates operations of an example process for providing network asset data object(s) in accordance with at least some example embodiments of the present disclosure;

FIG. 10 illustrates operations of an example process for storing enterprise network interaction data for use, as part of providing network asset data object(s) in accordance with at least some example embodiments of the present disclosure;

FIG. 11 illustrates operations of an example process for training a network asset scoring model, as part of providing network asset data object(s) in accordance with at least some example embodiments of the present disclosure;

FIG. 12 illustrates operations of an example process for causing rendering via a user-facing network asset transaction application, as part of providing network asset data object(s) in accordance with at least some example embodiments of the present disclosure;

FIG. 13 illustrates operations of an example process for causing rendering via a third-party application, as part of providing network asset data object(s) in accordance with at least some example embodiments of the present disclosure;

FIG. 14 illustrates operations of an example process for causing rendering via a plurality of applications, as part of providing network asset data object(s) in accordance with at least some example embodiments of the present disclosure;

FIG. 15 illustrates a computing environment for managing data tagged network asset(s), in accordance with at least some example embodiments of the present disclosure;

FIG. 16 illustrates a computing environment for selecting data tagged network asset(s) and/or network asset scoring model(s), in accordance with at least some example embodiments of the present disclosure;

FIG. 17 illustrates an example user interface including data tagged network tagged data object(s) associated with a first example network asset data tag, in accordance with at least some example embodiments of the present disclosure;

FIG. 18 illustrates another example user interface including data tagged network tagged data object(s) associated with a second example network asset data tag, in accordance with at least some example embodiments of the present disclosure;

FIG. 19 illustrates operations of an example process for providing data tagged network asset(s), in accordance with at least some example embodiments of the present disclosure;

FIG. 20 illustrates operations of an example process for generating a data tagged network asset set based on historical network asset transaction data, as part of providing network asset data object(s) in accordance with at least some example embodiments of the present disclosure;

FIG. 21 illustrates operations of an example process for generating a data tagged network asset set based on asset detail information, as part of providing network asset data object(s) in accordance with at least some example embodiments of the present disclosure;

FIG. 22 illustrates operations of an example process for providing one or more scored network data asset(s), as part of providing network asset data object(s) in accordance with at least some example embodiments of the present disclosure;

FIG. 23 illustrates operations of an example process for storing enterprise network interaction data, as part of providing network asset data object(s) in accordance with at least some example embodiments of the present disclosure;

FIG. 24 illustrates operations of an example process for updating at least one model based on enterprise network interaction data, as part of providing network asset data object(s) in accordance with at least some example embodiments of the present disclosure; and FIG. 25 illustrates operations of an example process for providing at least a portion of the data tagged network asset set by causing rendering of a network asset display interface, as part of providing network asset data object(s) in accordance with at least some example embodiments of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

In various contexts, systems are designed to select network asset data objects from a set of available network asset data objects. For example, in one example context, network asset data object(s) embody products available for ordering via an e-commerce platform. Such products (or services, electronic items, and/or other network assets) may be made available for purchase by various users utilizing client devices in communication with the e-commerce platform. The e-commerce platform may include one or more systems that are configured to function for providing network asset data object(s) for a user to view, interact with, and/or for which a user may initiate transactions.

An asset provision system of the platform, for example, may be configured to determine which of a plurality of network asset data objects available via the platform should be provided associated with a particular user corresponding to a user profile identified via a unique profile identifier. In this regard, the asset provision system may utilize any of a myriad of factors to score the network asset data object(s) with respect to a particular unique profile identifier and a particular determination goal representing a desired outcome from provision of the network asset data object(s). The highest-ranked network asset data object(s) represent the network asset(s) (e.g., products) that best fit for providing to a particular user profile to achieve a particular determination goal, for example the network asset data objects that are determined based on data known associated with the user profile as most likely to be transacted with (e.g., purchased) by the user associated with the user profile, and/or the like.

The asset provision system may provide certain network asset data object(s), such as all scored network asset data objects in a particular arrangement and/or only prioritized network asset data objects above an asset prioritization threshold, for selection by a user.

The network asset data object(s) may be provided to the user by displaying to one or more user interfaces rendered to a client device corresponding to the user. The user may subsequently interact with such user interfaces to perform any of a myriad of user interactions and/or initiate any number of process(es) associated therewith. For example, the user may interact with the user interface to select one or more network asset data objects and add such network asset data objects to a selected set associated with the user profile (e.g., an electronic shopping cart), initiate transactions associated with the user profile (e.g., purchase network asset data objects), and/or the like.

Often, systems that attempt to select particular network assets for providing associated with a particular user profile fail to do so with sufficient accuracy. For example, in some circumstances such systems provide selected network asset data object(s) as recommendations for further viewing and/or transacting by a particular user, with a particular determination goal of increasing the number of such interactions. Network asset data object(s) selected and/or provided inaccurately (e.g., provided even though such network asset data objects are unlikely to be interacted with) waste computing resources utilized by any number of computing devices.

Computing resources utilized by the asset provision system to select network asset data object(s) that are irrelevant or otherwise not viewed or accessed by the user via the corresponding client device (e.g., not transacted with by the user) do not satisfy the determination goal and are entirely wasted. Similarly, computing resources utilized by client devices to provide the selected network asset data object(s) (e.g., to render user interfaces associated with viewing and/or selecting from the provided network asset data object(s)) that are irrelevant or otherwise not accessed by the user are entirely wasted. Further still, computing resources utilized to communicate such data between the asset provision system and the client device associated with a user (e.g., networking resources) are entirely wasted. Reducing the amount of wasted computing resources is desirable to improve operational efficiency, reduce costs, and improve overall system operational throughput.

Embodiments of the present disclosure provide improved mechanisms for managing, selecting, and providing network asset data object(s). In this regard, the embodiments select and/or provide network asset data object(s) in an improved manner, such as to increase the accuracy of the selected network asset data object(s) for a particular unique profile identifier meeting a particular determination goal, and/or in a manner that provides set(s) of network asset data object(s) via one or more specially configured user interfaces that display such network asset data object(s) in a preferred manner for viewing and/or interaction by a user. In this regard, the various embodiments provide each of these technical advantages, which are not provided by conventional implementations. Additionally, the various embodiments address each of the problems described above by utilizing one or more specially configured model(s), for example and without limitation one or more network asset scoring model(s) and/or one or more multi-armed bandit model(s).

Some such embodiments utilize prioritized network asset data object(s) to train one or more asset scoring model(s) that remain accurate while being trained more efficiently (e.g., utilizing a reduced amount of computing resources). For example, data embodying or otherwise associated with the prioritized network asset data object(s) may be stored and/or accessed such that significant data associated with various other network asset data object(s) need not be stored and/or processed. In this regard, such embodiments reduce the amount of computing resources utilized to store training data and/or process such training data. Conventional implementations fail to provide such improvements, and at best perform equal or with worse accuracy than the embodiments disclosed herein while utilizing significantly more computing resources to achieve such training.

Additionally or alternatively, some such embodiments utilize one or more specially trained model(s) to accurately select from a plurality of network asset scoring model(s) to use for scoring and/or one or more data tagged network asset set(s). For example, a trained multi-armed bandit model may be utilized to select a network asset scoring model utilized for ranking network asset data object(s), and to select a data tagged network asset set including network asset data object(s) for providing associated with a particular unique profile identifier. Such implementations improve the accuracy of selected network asset data object(s) with respect to a particular unique profile identifier corresponding to a particular user. Conventional implementations fail to provide such technical advantages.

Some embodiments described herein may generate and/or leverage an embedding space of one or more types of data objects. For example, one or more embedding model(s) (e.g., algorithmic, machine learning, and/or statistical model(s)) may be trained based on one or more types of data objects, such that the embedding model(s) learn to generate an embedding space including the embedded representations of such data object(s). In some embodiments, the embedding model may be embodied by one or more neural networks (e.g., deep neural networks and/or the like) specially configured to embed the data objects into a lower dimensional embedding space that includes embedded representations of the data object(s). In this regard, the embedding space may represent categorized and/or characterized versions of the data objects, where the representations are arranged such that data objects deemed similar to one another are located proximate to one another in the embedding space.

It should be appreciated that the definition of what constitutes "similar" data objects may be defined based on any number of data properties either automatically or by a particular user. For example, data objects may be deemed similar based on where the data object falls on a learned probability distribution indicating how likely the data object is to meet a particular category based on the data value(s) for one or more data properties of the data object, and similar objects may be determined based on the proximity of a data object to other data objects with similar value(s) on the distribution.

In some embodiments, network asset data object(s) may be embedded such that network asset data object(s) deemed similar may be identified, grouped, and processed and/or provided together as described herein. For example, similar network asset data object(s) may be identified such that data associated with such network asset data object(s) may be processed to learn data trends, patterns, and/or inferences regarding which other network asset data object(s) are most likely to be interacted with if a user interacts with a particular network asset data object or set of network asset data objects. The network asset data object(s) may similarly be embedded to enable generation of network asset tag data object(s) and/or association of network asset data object(s) to a corresponding network asset tag data object. Additionally or alternatively, user profile(s) may be embedded such that user profile(s) determined as similar may be identified, grouped, and/or processed together as described herein. For example, similar user profiles may be identified such that data associated with such profiles may be processed to learn data trends, patterns, and/or inferences regarding the interactions between such user profiles and network asset data object(s) having particular characteristics.

Utilizing an embedding space provides a myriad of technological advantages not provided by existing systems. For example, reducing the dimensionality of the training may improve the overall accuracy of the trained model(s). Additionally or alternatively, utilizing a lower dimension embedding space in some embodiments reduces the computational expense (e.g., use of processing, memory, and/or network resources) required to perform such processing. In this regard, efficiencies in the time to train such model(s) and the volume of data that may be transmitted during training enables such processing to occur in real-time or near real-time. Such technological advantages are further enhanced in circumstances where one or more embedding space(s) are generated at an asset-level and user-level.

One such example context of an asset provision system is an e-commerce platform, such as Thrive Market, that selects particular network asset data object(s), such as products provided by Thrive Market, as recommendations for purchasing by a particular unique profile identifier corresponding to a user registered with Thrive Market. User Andy, for example, may be a registered user with Thrive Market, and utilize his smartphone as an example client device for accessing functionality provided by Thrive Market. As part of such functionality, one or more system(s) embodying the Thrive Market platform may be configured to provide selected network asset data object(s) that represent recommended products specific to User Andy. Such recommendations may meet any of a number of technical and/or business goals, for example such selected network asset data objects may represent the products determined to be most relevant for User Andy, most likely to be purchased by User Andy, most likely to be favorited by User Andy, and/or the like. The Thrive Market platform may provide the network asset data objects with a particular determination goal to receive corresponding interactions in response.

The asset provision system of the Thrive Market platform may be configured to score network asset data object(s) for selection. The network asset data object(s) may be scored utilizing one or more network asset scoring model(s) trained for User Andy (e.g., trained based on user interaction data specific to User Andy) and/or all users and specially configured based on various information associated with User Andy. For example, as User Andy interacts with the Thrive Market platform (e.g., views products, searches for products, adds products to favorites, adds products to a shopping cart, purchases products, and/or the like), enterprise network interaction data representing such user interactions may be generated and/or stored. Such enterprise network interaction data may subsequently be retrieved and utilized for one or more processing operation(s), for example to train one or more network asset scoring model(s) and/or multi-armed bandit model(s) as described herein.

In some embodiments, to reduce the storage resources utilized for such data, the enterprise network interaction data collected, stored, and/or otherwise utilized for training may be limited to only information associated with prioritized network asset data object(s). The prioritized network asset data object(s) may include network asset data object(s)

highest ranked with respect to User Andy for each displayed list of network asset data object(s) (e.g., each page of products viewed by User Andy). For example, only data associated with the highest-scored network asset data object(s) (e.g., the top 5 products determined as most likely to be purchased by User Andy for each displayed list of network asset data object(s)) may be stored and/or utilized to improve the efficiency of training without diminishing accuracy of such training.

The newly trained network asset scoring model(s) may subsequently be utilized to re-score one or more network asset data object(s) and/or provide at least a portion of the scored network asset data object(s). For example, the scored network asset data object(s) may be utilized to provide a certain number of the highest-ranked scored network assets data set. As User Andy subsequently interacts with the newly provided network asset data object(s), new interaction data may be generated and/or stored for further processing. For example, to update one or more network asset scoring model(s) and/or multi-armed bandit model(s) continuously, at defined intervals, and/or the like, to ensure such model(s) remain accurate with respect to User Andy and a particular determination goal. Each of these operations is performed in an improved, efficient manner such that User Andy may continue to interact with the Thrive Market platform without degradation in the operations of the Thrive Market platform, and with improvement to (or at least without degradation to) the accuracy of the selected network asset data objects provided to User Andy.

In some embodiments, the asset provision system is configured to provide a particular data tagged network asset set selected for provision to User Andy. In one example context, the data tagged network asset set embodies products associated with a particular shared network asset tag data object representing a theme of products. The theme of products, and/or the products associated with each particular theme, may be generated in any of a myriad of manners, such as automatically based on processing particular information associated with User Andy and/or other users, manually by administrators of the Thrive Market platform, and/or the like. The asset provision system may utilize at least one multi-armed bandit model trained based on the interaction data associated with User Andy to select from one or more network asset scoring model(s) and/or data tagged network asset set(s). In this regard, such embodiments may accurately provide network asset data object(s) representing products of a particular theme that are most likely to be transacted with by User Andy. In some embodiments, the model(s) selecting such network asset data object(s) may be efficiently and accurately trained utilizing the enterprise network interaction data associated with prioritized network asset data object(s) to perform such training in an efficient and accurate manner, as described herein.

Systems that do not employ the embodiments discussed herein may suffer from further deficiencies with respect to selection of network asset data object(s) in circumstances where a particular grouping of such network asset data objects is to be provided. For example, in some contexts, it is desirable to group network asset data objects to be provided in association with a particular unique profile identifier. Generating effective groupings of network asset data objects, however, is often performed manually without leveraging analytical insights into whether such groupings are likely to be effective in meeting particular network or system goals.

Additionally, in contexts where such groupings are manually created (e.g., manually by administrators), deficiencies remain in selecting a grouping of network asset data objects that have a reasonable probability of serving a system goal that is associated with a particular unique profile identifier. Still, further deficiencies remain in finally selecting particular network asset data objects from the selected grouping. For example, even if a particular grouping of network asset data objects is selected, providing particular network asset data objects from such a grouping for maximizing a particular system goal is not supported by systems lacking implementations of the embodiments herein described.

Without such operations for improving the accuracy of selections (e.g., selecting a particular grouping of network asset data objects and selecting particular network asset data objects from a selected grouping) to optimize a particular determination goal, system implementations can waste various computing resources in performing such selections and providing selected data without attaining a desirable response. For example, in circumstances where a system goal involves maximizing user interaction with a system, systems lacking the embodiments described herein may waste processing resources, networking resources, memory storage resources, and the like, in performing selections and providing such selections to client devices only to fail to trigger the desired user interaction. Similarly, in another example context where the determination goal represents maximizing user-initiated transactions, systems can waste processing resources, networking resources, memory storage resources, and the like, in performing selections and providing such selections to the user only to not receive such initiated transactions.

Embodiments of the present disclosure improve such aspects of conventional implementations by improving the efficiency of utilized computing resources and reducing wasted computing resources in selecting a grouping of network asset data objects, and/or selecting particular network asset data objects from a selected grouping, for providing associated with a particular unique profile identifier. For example, at least some embodiments of the present disclosure utilize a multi-armed bandit model to select a particular data tagged network asset set from a set of possible data tagged network asset sets. Additionally or alternatively, some embodiments of the present disclosure utilize a multi-armed bandit model to select a particular network scoring model for further arranging and/or selecting from the selected data tagged network asset set. The multi-armed bandit model may be specially configured and/or trained based on particular data to perform selections that optimize a particular determination goal, as described herein.

In this regard, utilizing the specially configured multi-armed bandit model, embodiments of the present disclosure provide various technical advantages not afforded by conventional implementations. For example, such implementations reduce the amount of computing resources wasted in providing network set data objects. Further, embodiments of the present disclosure improve the accuracy of selections for optimizing a particular determination goal. In some such embodiments, utilizing particular data for configuring and/or training one or more of the model(s) described herein (e.g., utilizing interaction data associated with a prioritized network asset data object set), embodiments of the present disclosure provide such technical improvements while limiting the amount of computing resources that conventionally is allocated for data collection, storage, and/or processing.

Definitions

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device is described herein to receive data from a second computing device, it will be appreciated that the data may be received directly from the second computing device or may be received indirectly via one or more intermediary computing devices, such as, for example, one or more servers, relays, routers, network access points, base stations, hosts, and/or the like, sometimes referred to herein as a "network." Similarly, where a first computing device is described herein as sending data to a second computing device, it will be appreciated that the data may be sent directly to the second computing device or may be sent indirectly via one or more intermediary computing devices, such as, for example, one or more servers, remote servers, cloud-based servers (e.g., cloud utilities), relays, routers, network access points, base stations, hosts, and/or the like.

The terms "comprising" means including but not limited to, and should be interpreted in the manner it is typically used in the patent context. Use of broader terms such as comprises, includes, and having should be understood to provide support for narrower terms such as consisting of, consisting essentially of, and comprised substantially of.

The terms "in one embodiment," "according to one embodiment," "in some embodiments," and the like generally refers to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

The term "example" is used herein to mean "serving as an example, instance, or illustration." Any implementation described herein as "example" is not necessarily to be construed as preferred or advantageous over other implementations.

The terms "computer-readable medium" and "memory" refer to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

The term "client device" refers to one or more computing devices in hardware, software, firmware, and/or a combination thereof, that is configured to perform particular functionality and provide data to an end use of the client device. The client device enables data input associated with such functionality and/or data output associated with such functionality. In some embodiments, a client device communicates with a remote system (e.g., an asset provision system) to provide such functionality. Non-limiting examples of a client device include a user device, a mobile computing device, a tablet computer, a laptop computer, a desktop computer, a smartphone, a kiosk, a wearable device, an Internet-of-Things (IoT) device, an electronic assistant device, a smart home device (e.g., a smart television), and a portable digital assistant.

The term "user interaction" refers to electronically managed data representing a user engagement with a computing device and/or associated peripheral embodying input data for processing via the computing device. Non-limiting examples of a user interaction include a tap, a swipe, a pinch, a mouse click, a key press, a peripheral activation or deactivation, a voice command, a gesture, a device movement, and a physical engagement with the computing device.

The term "asset provision system" refers to one or more computing devices each embodied in hardware, software, firmware, and/or a combination thereof that provide functionality associated with network asset data object(s). In some embodiments, an asset provision system is configured, alone or in combination with one or more other computing device(s), to provide functionality for generating network asset score(s) associated with a network asset data object set, providing one or more network asset data object(s), viewing one or more network asset data object(s) and/or associated information, transacting for one or more network asset data object(s), and/or otherwise interacting with one or more network asset data object(s).

The term "unique profile identifier" refers to electronically managed data that uniquely identifies a user profile registered to a system. A user profile may be associated with one or more of biographical data representing aspects of the user corresponding to the user profile, and/or data associated with user-accessed functionality performed via the system.

The term "explicit user insight data" refers to electronically managed data representing user-inputted data values indicating preferences, interests, and/or other filters associated with network asset selection and/or prioritization for a particular user profile associated with a unique profile identifier. In some embodiments, explicit user insight data includes inquiry response data embodying user responses to one or more data inquiries provided to the user during registration with a system and/or at a first instance upon registration with the system. In one particular context, for example, a user survey is provided to the user during user account registration (or immediately upon completion of user account registration) that includes various survey inquiries regarding the user's behaviors (e.g., a user's shopping frequency, activity frequency, travel frequency, locations of interest, and the like) and which generates particular data sets, e.g., biographical data (e.g., a user's age, location, gender, and the like), family data (e.g., a user's marital status, family size, number of children, number of pets, types of pets, and the like), asset interest data (e.g., particular items the user is considering purchasing or is otherwise interested in), asset purchasing behavior data (e.g., particular items generally purchased by the user), explicit preferences data (e.g., dietary restrictions and/or preferences of the user), and/or the like.

The term "enterprise network interaction data" refers to electronically managed data representing actions performed by an asset provision system associated with one or more user profile identifier(s). In some embodiments, enterprise network interaction data includes at least data resulting from user-initiated actions with the asset provision system. Such user-initiated actions may result from interaction with any of a myriad of modalities, such as via interaction with a user-facing native application corresponding to the asset provision system, a user-facing web application corresponding to the asset provision system, a third-party application serving data associated with or generated by the asset provision system (e.g., communications provided via text, email, push notification, and/or the like including recommended network asset data objects) and controlled by a different entity than controls the asset provision system. In some embodiments, enterprise network interaction data includes at least data resulting from actions automatically initiated via the asset provision system. Non-limiting examples of enterprise network interaction data includes user clicks, page loads, favorites of network asset data object(s), selections of network asset data object(s), initiated transaction(s) for network asset data object(s), search queries submitted by the user, temporal information regarding the user's use of the system and/or particular portions thereof, client device information (e.g., type of device, operating system for device, age of device, application information, and/or the like), system access information (e.g., the client devices utilized to access a particular user account, the application(s) utilized to access the particular user account such as a browser or a native app, favorited network asset data object(s) associated with the user account, selected network asset data object(s) associated with the user account, and other user actions associated with a network asset data object.

The term "interaction data set" refers to any number of portions of enterprise network interaction data associated with a particular unique profile identifier.

The term "enterprise network interaction database" refers to at least one repository embodied in hardware, software, firmware, and/or a combination thereof, configured to store enterprise network interaction data associated with an asset provision system.

The term "synchronous network interaction data set" refers to enterprise network interaction data received in real-time or at a particular time associated with a most-recent timestamp interval for which enterprise network interaction data is collected and/or otherwise received. For example, synchronous network interaction data set in some embodiments embodies daily enterprise network interaction data associated with any number of unique profile identifiers.

The term "network interaction training data corpus" refers to electronically managed data embodying or derived from particular data for use in training one or more model(s) to identify data trends and/or patterns represented in the particular data. In some embodiments, network interaction training data corpus embodies explicit data (e.g., user-inputted explicit user insight data) and/or implicit data (e.g., enterprise network interaction data and/or data derived therefrom).

The term "transformation protocol" refers to one or more algorithms, one or more data transformations, and/or one or more data manipulations that structures, enhances, and/or otherwise prepares enterprise network interaction data for further processing. In some embodiments, a transformation protocol processes enterprise network interaction data into a network interaction training data corpus as described and defined herein.

The terms "network asset data object" and "network asset" refer to an electronically managed representation of an object, item, or product made available for transacting over a network via communication with an asset provision system. Non-limited examples of a network asset data object include an electronic data representation of a product made available via an asset provision system embodying an e-commerce platform, where a user may access such a platform for purposes of searching and/or otherwise browsing such products and/or purchasing (or otherwise ordering) such products.

The terms "prioritized network asset data object" and "prioritized network asset" refer to a particular network asset data object of an arranged set of network asset data objects that is arranged above a corresponding asset prioritization threshold. In one example context, a non-limiting example of a prioritized network asset data object includes a particular network asset data object having one of the top three highest positions in an arrangement of a corresponding network asset data object set arranged based on corresponding network asset scores for the network asset data object set.

The term "asset prioritization threshold" refers to an electronically managed data value representing a cutoff rank at or above which a network asset data object in an arrangement of a network asset data object set is identified as a prioritized network asset data object.

The term "network asset scoring model" refers to an algorithmic, statistical, and/or machine learning model trainable to generate a network asset score for a particular network asset data object or an arranged scored network assets data set corresponding to a particular set of network asset data objects. A network asset scoring model is trainable based on a network interaction training data corpus. In some embodiments, a network asset scoring model scores and/or arranges network asset data object(s) based on a determined predicted likelihood a user profile corresponding to a particular unique profile identifier performs a particular user-driven action associated with the network asset if provided the network asset (e.g., views information associated with the network asset, performs a transaction associated with the network asset, and/or the like). In one particular context, for example, a network asset scoring model is embodied by one or more trained machine learning models that scores each item from an available inventory based on a propensity for a particular user to initiate a transaction including that item (e.g., a propensity for the user to purchase that item). In some embodiments, a network asset scoring model is specially configured based on one or more value(s) for exploration and/or diversity amongst a set of network asset data object(s), for example such that network asset data object(s) different from the highest scoring network asset data objects are provided for consideration by the user associated with a particular user account to encourage exploration of a diverse set of network asset data object(s).

The term "scored network assets data set" refers to electronically managed data representing one or more network asset data object(s) associated with corresponding network asset score(s) for such network asset data object(s). In some embodiments, a scored network assets data set is arranged based on the value of the network asset score(s) corresponding to each of the network asset data object(s) (e.g., in descending order such that highest-scored network asset data objects appear first in the set, or in ascending order such that highest-scored network asset data objects appear last in the set).

The term "network assets serving database" refers to one or more repositories embodied in hardware, software, firmware, and/or a combination thereof, that enable provision of particular network asset data object(s) via one or more application(s) associated with accessing functionality of an asset provision system.

The term "user-facing network asset transaction application" refers to a software-driven computer program code executable via a client device that enables a user to access functionality of an asset provision system to view provided network asset data object(s) and/or information associated therewith, and/or initiate transactions associated with one or more of such network asset data object(s).

The term "third-party application" refers to a software-driven computer program code executable via a client device that is offered by a different entity from the entity offering or otherwise in control of the functionality provided by asset provision system. Non-limiting examples of a third-party application include an email application, a messaging application, and a social media application.

The term "network asset display interface" refers to a user interface renderable via a native user-facing network asset transaction application corresponding to an asset provision system that includes interface elements associated with providing one or more network asset data object(s) and/or information associated therewith.

The term "carousel display interface" refers to a user interface comprising interface elements for providing and/or otherwise displaying at least one network asset data object, or other information associated therewith, of a network asset data object set. A carousel display interface is configured to receive particular user interaction and, in response to such user interaction, update to cause rendering of at least one other network asset data object of the network asset data object set. For example, in some embodiments, a carousel display interface includes interface elements for displaying three network asset data objects of a set of twenty network asset data objects, and in response to a mouse click or tap on a particular interface element, causes the interface element associated with the first network asset data object of the three displayed network asset data objects to be de-rendered and causes rendering of a new interface element associated with the next network asset data object in the network asset data object set.

The terms "network asset tag data object" and "network asset tag" refer to electronically managed data representing a unique data identifier associable with any number of network asset data object(s) to indicate that such associated network asset data object(s) are linked by one or more shared attribute(s) represented by the shared network asset tag data object. In some embodiments, the shared network asset tag data object represents a unique identifier embodying a "theme" that correlates a set of network asset data objects (e.g., "healthy items," "spicy items," and/or "items liked by User A"). A "shared" network asset tag data object refers to a network asset tag data object associated with two or more network asset data objects. The term "data tagged network asset set" refers to the network asset data objects associated with a particular shared network asset tag data object.

The term "selected network asset scoring model" refers to a particular network asset scoring model determined or otherwise selected for use in scoring one or more network asset data object(s).

The term "selected data tagged network asset set" refers to a particular data tagged network asset set determined or otherwise selected for scoring utilizing a selected network asset scoring model. The term "selected shared network asset tag data object" refers to a network asset tag data object associated with each network asset data object in the selected data tagged network asset set.

The term "available network asset" refers to a network asset data object determined to be enabled for transacting via a system based on availability of one or more real-world objects corresponding to the network asset data object. In some embodiments, for example, each available network asset data object corresponds to an object in an inventory associated with an asset provision system.

The terms "transaction" and "transacting" with respect to a network asset refer to one or more action(s) initiated via an asset provision system and/or associated computing system to purchase or otherwise order an object represented by a network asset data object provided by the asset provision system.

The term "historical network asset transaction data" refers to electronically managed data representing previous transactions performed by or otherwise associated with a unique profile identifier.

The term "asset detail information" refers to electronically managed data representing data value(s) for one or more aspects or data properties associated with a particular network asset data object. In one example context, a non-limiting example of asset detail information includes product information associated with an object (e.g., a product) made available via an asset provision system embodying an e-commerce platform providing access to functionality for ordering the object.

The term "determination goal" refers to a data-driven measurable statistic to be optimized via on or more particular algorithms representing how well particular data satisfies a target goal. In some embodiments, for example, a determination goal is associated with or embodied by minimization and/or maximization of a particular value. In this regard, in some embodiments a model is specially configured to produce output based on a particular determination goal. Non-limiting examples of a determination goal include maximizing user interactions with higher-ranked network asset data objects, maximizing user-initiated transactions associated with higher-ranked network asset data objects, maximizing electronic currency value expended associated with higher-ranked network asset data objects, and/or the like. One particular example context of a determination goal implemented via a network asset processing apparatus, as described herein, includes the network asset processing apparatus configured to provide network asset data objects in a particular arrangement determined such that a user is more likely to initiate a transaction associated with the higher-ranked network asset data objects in the arrangement.

Example Systems of the Disclosure

FIG. 1 illustrates a block diagram of a network asset management system that may be specially configured within which embodiments of the present disclosure may operate. Specifically, FIG. 1 depicts an example network asset management system 100 including client device(s) 106A-106N (collectively "clients 106"), an asset storage system 104, and an asset provision system 102. The asset provision system 102 is in communication with the clients 106 and the asset storage system 104 over one or more communications network(s), for example the communications network 108 as illustrated.

In some embodiments, each of the clients 106 embodies one or more computing device(s) specially configured to enable user-facing functionality for accessing functionality of the asset provision system 102. For example, in some embodiments, each of the clients 106 is embodied in hardware, software, firmware, and/or any combination thereof that provides access to at least one user-facing application enabling access to the asset provision system 102 for viewing network asset data object(s), interacting with network asset data object(s), and/or transacting with network asset data object(s). In one example context, the clients 106 are each embodied by a mobile computing device configured to execute a native user-facing application and/or access a user-facing web application executed on the client device.

The user of one of the clients 106 may access the user-facing application(s) executed on the client to initiate operations associated with the asset provision system 102, render user interfaces associated with such operations, and/ or the like (e.g., by transmitting specially configured requests, receiving response data, and/or processing such response data). In this regard, a user of one of the clients 106 may utilize the client device to initiate an authenticated session associated with a particular user profile registered with the asset provision system 102, receive provided network asset data object(s) associated with the user profile, cause rendering of user interfaces associated with interacting with the provided network asset data object(s), and/or receive and process user input associated with such user interface(s). In this regard, in some embodiments, clients 106 include one or more touch-adaptive displays, input/output devices, wireless network communication interfaces, and/or the like to perform any of such operations. The clients 106, in some such embodiments, serve as the point of interaction with a particular user of the asset provision system 102, for example an online shopper of an e-commerce platform for purposes of network asset data object viewing and/or transacting, and to be provided recommended network asset data object(s) via the asset provision system 102.

As illustrated, in at least some embodiments, the asset provision system 102 includes a specially configured asset provision server 102A and a specially configured asset provision repository 102B. The asset provision server 102A includes one or more specially configured servers embodied in hardware, software, firmware, and/or any combination thereof, that provides network asset data object management, scoring, selection, and/or provision functionality. In some embodiments, for example, the asset provision server 102A includes one or more server(s) that receive information embodying user interactions with one or more network asset data object(s) provided to the user, process(es) such information, and/or stores such user interaction data as enterprise network interaction data. Additionally or alternatively, in some embodiments, the asset provision server 102A includes one or more server(s) that generate a score for each of one or more network asset data object(s), select from the network asset data object(s) (e.g., based on the score(s)), and providing one or more network asset data object(s) to one or more clients 106. Additionally or alternatively, in some embodiments, the asset provision server 102A includes one or more server(s) that receive and/or process information associated with determining and/or processing data corresponding to network asset data object(s) available via the asset provision system 102.

It should be appreciated that the asset provision server 102A may include or otherwise embody any number of servers, including one or more virtual, remote, and/or "cloud" servers. For example, in some embodiments, the asset provision server 102A embodies computing hardware configured to embody any number of virtual server(s) that each perform various portions of the functionality as described herein. Alternatively or additionally, in some embodiments, the asset provision server 102A includes any number of communicable but separate physical servers, for example a plurality of cloud servers located in a remote, cloud environment.

To perform some or all of the described functionality, the asset provision server 102A may interact with the asset provision repository 102B. The asset provision repository 102B may include any number of memory storage device(s) and/or computing systems embodied in hardware, software, firmware, and/or a combination thereof, configured to persistently store data for processing by the asset provision server 102A. In this regard, the asset provision server 102A may store various information to the asset provision repository 102B during processing, and/or retrieve information from the asset provision repository 102B for performing the described functionality. For example, non-limiting examples of data stored to the asset provision repository 102B by the asset provision server 102A includes user profile(s) registered with the asset provision system 102 and/or an associated platform, data representing network asset data object(s) available, enterprise network interaction data associated with network asset data object(s), network asset tag data object(s), data tagged network asset data object(s) associated with each particular network asset tag data object, and/or the like.

In some embodiments, the asset provision repository 102B includes one or more repositories configured for storing different portion(s) of such data. For example, in some embodiments, the asset provision repository 102B includes one or more user datastore(s) configured to store user profiles, associated unique profile identifier(s) and/or user profile information, one or more enterprise network interaction datastore(s) configured to store interaction data associated with one or more network asset data object(s) via one or more unique profile identifier(s). one or more model datastore(s) configured to store trained model(s) utilized by the asset provision system 102, and/or the like. Additionally or alternatively, in some embodiments, the asset provision repository 102B includes one or more asset datastore(s) configured to store data corresponding to available network asset data object(s).

In some embodiments, the asset provision repository 102B includes one or more computing devices that enable requesting and/or retrieval of the data stored by the asset provision repository 102B. For example, the asset provision repository 102B may include one or more database(s) and corresponding software, hardware, and/or firmware that manages storage of data to, and/or retrieval of data from, the one or more database(s).

It should be appreciated that the asset provision repository 102B may include or otherwise embody any number of repositories, including one or more virtual, remote, and/or "cloud" repositories. For example, in some embodiments, the asset provision repository 102B embodies computing hardware configured to embody any number of virtual repositories that each store various portions of the described data. Alternatively or additionally, in some embodiments, the asset provision repository 102B includes any number of communicable but separate physical repositories, for example a plurality of cloud repositories located in a remote cloud environment.

The asset provision system 102 provides access to particular network asset data object(s) made available via the asset provision system 102 and/or an associated platform. In some such embodiments, the asset provision system 102 maintains a set of available network asset data object(s) independently, for example where the asset provision repository 102B embodies or otherwise maintains the available network asset data object(s). Additionally or alternatively, in some embodiments, the asset provision system 102 provides access to particular available network asset data object(s) through communication with one or more third-party and/or external providers. For example, in some embodiments, the asset provision system 102 optionally communicates with asset storage system 104 to determine available network asset data object(s). In this regard, the asset storage system 104 may include server(s), datastore(s), and/or the like embodied in hardware, software, firmware, and/or a combination thereof to maintain a network asset data set and/or availability of such network asset data object(s). In this regard, the asset provision system 102 may communicate with the asset storage system 104, for example via the asset provision server 102A over the communications network 108, to identify available network asset data object(s) for further processing, scoring, selecting, and/or providing associated with one or more unique profile identifier(s). The asset provision system 102 may communicate with the asset storage system 104 in real-time, at pre-defined interval(s) (e.g., daily, weekly, hourly, and/or the like), or in any customized manner.

The communications network 108 may be configured to operate utilizing any of a myriad of networking protocol(s) and computing device(s). For example, in some embodiments, the communications network 108 includes hardware, software, firmware, and/or a combination thereof, that enables communication over a public network, private network, and/or hybrid network. In one particular example context, the communications network 108 includes any number of computing devices embodying connection over the Internet. The communications network 108 may include hardware, software, firmware, and/or a combination thereof, that enables communication over a near-field connection, a Bluetooth connection, a Wi-Fi connection, a radio frequency connection, a cellular connection, and/or the like, between the asset provision system 102 and clients 106, and between the asset provision system 102 and the asset storage system 104. In some embodiments, the communications network 108 includes one or more base stations, relays, cell towers, intermediary processing servers and/or domain hosts, and/or associated connections, wires, and/or associated physical connections. In some such contexts, the communications network 108 may include one or more user-owned and/or user-controlled devices facilitating access to the communications network 108. For example, in some embodiments, the communications network 108 includes a router, modem, relay, and/or other user-controlled network access device that facilitates access to the particular public, private, and/or hybrid network embodied by the communications network 108.

Example Apparatuses of the Disclosure

The methods, apparatuses, systems, and computer program products of the present disclosure may be embodied by any variety of devices. For example, a method, apparatus, system, and computer program product of an example embodiment may be embodied by a fixed computing device, such as a personal computer, computing server, computing workstation, or a combination thereof. Further, an example embodiment may be embodied by any of a variety of mobile terminals, mobile telephones, smartphones, laptop computers, tablet computers, or any combination of the aforementioned devices.

In at least one example embodiment of the present disclosure, the asset provision system 102 is embodied by one or more computing devices, such as the network asset processing apparatus 200 as shown in FIG. 2. The network asset processing apparatus 200 may include processor 202, memory 204, input/output circuitry 206, communications circuitry 208, network asset management circuitry 210, model management circuitry 212, network asset prioritization circuitry 214, and data tag management circuitry 216. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, and/or the like to perform their associated functions, such that duplicate hardware is not required for each set of circuitry. The use of the term "circuitry" as used herein with respect to components of the network asset processing apparatus 200 should therefore be understood to include particular hardware configured to perform the functions associated with the particular set of circuitry as described herein.

Additionally or alternatively, the term "circuitry" should be understood broadly to include hardware and, in some embodiments, software and/or firmware for configuring the hardware. For example, in some embodiments, "circuitry" may include processing circuitry, storage media, network interfaces, input/output devices, and the like. In some embodiments, other elements of the network asset processing apparatus 200 may provide or supplement the functionality of the particular circuitry. For example, the processor 202 may provide processing functionality, the memory 204 may provide storage functionality, the communications circuitry 208 may provide network interface functionality, and the like, to one or more of the other sets of circuitry.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium).

The memory 204 may be configured to store information, data, content, applications, instructions, or the like, for enabling the network asset processing apparatus 200 to carry out various functions in accordance with example embodiments of the present disclosure. In some embodiments, for example, the memory 204 embodies one or more databases for storing user data objects, electronic data objects, and/or other data associated therewith, and/or otherwise is configured to maintain such data objects for accessing and/or updating as described herein.

The processor 202 may be embodied in any one of a myriad of ways and may, for example, include one or more processing devices configured to perform independently. Additionally or alternatively, the processor 202 may include one or more processors configured in tandem via a bus to enable independent execution of instructions, pipelining, and/or multithreading. The use of the terms "processor," "processing module," and "processing circuitry" may be understood to include a single-core processor, a multi-core processor, multiple processors internal to the apparatus, other central processing unit ("CPU"), microprocessor, integrated circuit, and/or remote or "cloud" processors.

In an example embodiment, the processor 202 may be configured to execute computer-coded instructions stored in the memory 204 or otherwise accessible to the processor. Alternatively, or additionally, the processor 202 may be configured to execute hard-coded functionality. As such, whether configured by hardware or software means, or by a combination thereof, the processor 202 may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

As one example context, the processor 202 is configured to provide functionality associated with managing, scoring, selecting, and/or providing network asset data object(s), for example via the network asset processing apparatus 200. In some such embodiments, the processor 202 is configured to provide such functionality including accessing enterprise network interaction data comprising an interaction data set associated with a unique profile identifier, for example where the interaction data set is associated with at least one prioritized network asset data set provided associated with the unique profile identifier. Additionally or alternatively, in some embodiments, the processor 202 is configured to provide functionality including generating a network interaction training data corpus based at least on the enterprise network interaction data. Additionally or alternatively, in some embodiments, the processor 202 is configured to provide functionality including training at least one network asset scoring model based on at least the network interaction training data corpus. Additionally or alternatively, in some embodiments, the processor 202 is configured to provide functionality including determining a scored network assets data set for the unique profile identifier based on the trained at least one network asset scoring model. Additionally or alternatively, in some embodiments, the processor 202 is configured to provide functionality including providing at least a portion of the scored network assets data set associated with the unique profile identifier via at least one network assets serving database.

Additionally or alternatively, in another example context, the processor 202 is configured to provide functionality utilizing particular model(s), such as a utilizing a trained multi-armed bandit model, for example via the network asset processing apparatus 200. In some such embodiments, the processor 202 is configured to provide such functionality including accessing enterprise network interaction data comprising an interaction data set associated with a unique profile identifier, at least a portion of the enterprise network interaction data accessed from an enterprise network interaction database. Additionally or alternatively, in some embodiments, the processor 202 is configured to provide functionality including accessing a set of data tagged network asset sets, each data tagged network asset set associated with a shared network asset tag data object. Additionally or alternatively, in some embodiments, the processor 202 is configured to provide functionality including training at least one multi-armed bandit model to, based on enterprise network interaction data and/or a set of data tagged network asset sets, provide a selected network asset scoring model from a network asset scoring model set and/or provide a selected data tagged network asset set from the set of data tagged network asset sets. Additionally or alternatively, in some embodiments, the processor 202 is configured to provide functionality including providing at least a portion of the data tagged network asset set associated with the unique profile identifier based on the selected network asset scoring model and/or the selected data tagged network asset set. In some other embodiments, the processor 202 is configured for performing any one or more of the operations of the computer-implemented processes described herein.

In some embodiments, the network asset processing apparatus 200 may include input/output circuitry 206 that may, in turn, be in communication with processor 202 to provide output to the user and, in some embodiments, to receive an indication of a user input. The input/output circuitry 206 may comprise one or more user interfaces, and may include a display to which user interface(s) may be rendered. In some embodiments, the input/output circuitry 206 may comprise a web user interface, a mobile application, a desktop application, a linked or networked client device, and/or the like. In some embodiments, the input/output circuitry 206 may also include a keyboard, a mouse, a joystick, a touch screen, touch areas, soft keys, a microphone, a speaker, or other input/output mechanisms. In some such embodiments, the input/output mechanisms are configured to enable a user to provide data representing one or more user interaction(s) for processing by the network asset processing apparatus 200. The processor and/or user interface circuitry comprising the processor, for example processor 202, may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the network asset processing apparatus 200. In this regard, the communications circuitry 208 may include, for example, at least a network interface for enabling communications with a wired or wireless communications network. For example, the communications circuitry 208 may include one or more network interface cards, antennas, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The network asset management circuitry 210 includes hardware, software, firmware, and/or a combination thereof, configured to support network asset data object identification and/or interaction functionality associated with the asset provision system 102. The network asset management circuitry 210 may utilizing processing circuitry, such as the processor 202, to perform one or more of these actions. In some embodiments, the network asset management circuitry 210 includes hardware, software, firmware, and/or a combination thereof, to identify a set of available network asset data object(s). Additionally or alternatively, in some embodiments, the network asset management circuitry 210 includes hardware, software, firmware, and/or a combination thereof, to receive and/or store interaction data associated with one or more particular network asset data object(s) and/or corresponding to a unique profile identifier. Additionally or alternatively, in some embodiments, the network asset management circuitry 210 includes hardware, software, firmware, and/or a combination thereof, to retrieve and/or manage enterprise network interaction data embodying any number of interaction data, as described herein. It should be appreciated that, in some embodiments, the network asset management circuitry 210 may include a separate processor, specially configured field programmable gate array (FPGA), or a specially configured application-specific integrated circuit (ASIC).

The model management circuitry 212 includes hardware, software, firmware, and/or a combination thereof, configured to support model training and/or use functionality associated with the asset provision system 102. In some embodiments, the model management circuitry 212 may utilize processing circuitry, such as the processor 202, to perform one or more of these actions. In some embodiments, the model management circuitry 212 includes hardware, software, firmware, and/or a combination thereof, to generate one or more training corpus(es) for training one or more network asset scoring model(s). Additionally or alternatively, in some embodiments, the model management circuitry 212 includes hardware, software, firmware, and/or a combination thereof, to train one or more network asset scoring model(s), for example based on generated training corpus(es) corresponding to the network asset scoring model(s). In this regard, the network asset scoring model(s) may be trained to maximize or otherwise optimize one or more value(s) associated with a particular determination goal based on the data representing in the training corpus, for example propensity for the user corresponding to the unique profile identifier to transact associated with particular network asset data object.

Additionally or alternatively, in some embodiments, the model management circuitry 212 includes hardware, software, firmware, and/or a combination thereof, to generate one or more training corpus(es) for training one or more multi-armed bandit model(s). Additionally or alternatively, in some embodiments, the model management circuitry 212 includes hardware, software, firmware, and/or a combination thereof, to train one or more multi-armed bandit model(s), for example based on generated training corpus(es) corresponding to the multi-armed bandit model. In this regard, the multi-armed bandit model(s) may be trained to select a network asset scoring model and/or data tagged network asset set that maximizes or otherwise optimizes a particular determination goal based on the data represented in the training corpus, for example propensity for the user corresponding to the unique profile identifier to transact associated with particular network asset data objects. Additionally or alternatively, in some embodiments, the model management circuitry 212 includes hardware, software, firmware, and/or a combination thereof, to update one or more model(s) maintained by the network asset processing apparatus 200, for example utilizing newly stored and/or received interaction data for a particular corresponding unique profile identifier. It should be appreciated that, in some embodiments, the model management circuitry 212 may include a separate processor, specially configured field programmable gate array (FPGA), or a specially configured application-specific integrated circuit (ASIC).

The network asset prioritization circuitry 214 includes hardware, software, firmware, and/or a combination thereof, configured to support network asset data object selection and/or provision functionality associated with the asset provision system 102. In some embodiments, the network asset prioritization circuitry 214 may utilize processing circuitry, such as the processor 202, to perform one or more of these actions. In some embodiments, the network asset prioritization circuitry 214 includes hardware, software, firmware, and/or a combination thereof, to select one or more network asset data object(s) to provide to a client device associated with a particular unique profile identifier. For example, the network asset data object(s) may be scored, and at least a portion of the scored network asset data object(s) may be selected. Additionally or alternatively, in some embodiments, the network asset prioritization circuitry 214 includes hardware, software, firmware, and/or a combination thereof, to provide one or more selected network asset data object(s).

In some embodiments, one or more prioritized network asset data object(s) is/are provided, for example, a certain number of highest-scored network asset data object(s) for a particular portion of scored network asset data object(s) to be provided. Additionally or alternatively, in some embodiments, the network asset prioritization circuitry 214 includes hardware, software, firmware, and/or a combination thereof, to receive, generate, store, and/or otherwise monitor interaction data associated with such prioritized network asset data object(s) provided associated with a particular unique profile identifier. It should be appreciated that, in some embodiments, the network asset prioritization circuitry 214 may include a separate processor, specially configured field programmable gate array (FPGA), or a specially configured application-specific integrated circuit (ASIC).

The data tag management circuitry 216 includes hardware, software, firmware, and/or a combination thereof, configured to support network data tagged network asset management functionality associated with the asset provision system 102. In some embodiments, the data tag management circuitry 216 may utilize processing circuitry, such as the processor 202, to perform one or more of these actions. In some embodiments, the data tag management circuitry 216 includes hardware, software, firmware, and/or a combination thereof, to generate one or more network asset tag data object(s). The data tag management circuitry 216 may include hardware, software, firmware, and/or a combination thereof, to enable such generation to occur automatically based on various data available to the network asset processing apparatus 200, and/or to enable such generation to occur manually based on user input (e.g., manually input network asset tag data object(s)). Additionally or alternatively, in some embodiments, the data tag management circuitry 216 includes hardware, software, firmware, and/or a combination thereof, to associate one or more network asset data object(s) with a network asset tag data object.

The data tag management circuitry 216 may include hardware, software, firmware, and/or a combination thereof, to enable association of network asset data object(s) with corresponding network asset tag data object(s) automatically based on various data described herein, and/or manually by a user (e.g., an administrator associated with the network asset processing apparatus 200). Additionally or alternatively, in some embodiments, the data tag management circuitry 216 includes hardware, software, firmware, and/or a combination thereof, to retrieve data tagged network data object(s) associated with a particular network asset tag data object. It should be appreciated that, in some embodiments, the data tag management circuitry 216 may include a separate processor, specially configured field programmable gate array (FPGA), or a specially configured application-specific integrated circuit (ASIC).

In some embodiments, one or more of the aforementioned sets of circuitry are combined to form a single set of circuitry. The single combined set of circuitry may be configured to perform some or all of the functionality described herein with respect to the individual sets of circuitry. For example, in at least one embodiment, circuitry 210, 212, 214, and/or 216 may be embodied by a single set of circuitry, and/or one or more of the circuitry 210, 212, 214, and/or 216 may be combined with the processor 202. Additionally or alternatively, in some embodiments, one or more of the sets of circuitry described herein may be configured to perform one or more of the actions described with respect to one or more of the other sets of circuitry.

Example Computing Environments of the Disclosure

Having discussed example systems and apparatuses in accordance with the present disclosure, example computing environments will now be described. Each computing environment may be embodied in any of a myriad of manners. In some embodiments, a computing environment is embodied as a software environment executed via one or more computing device(s), such as the network asset processing apparatus 200. The computing environment embodied as a software environment may be maintained via a single computing device or across multiple computing devices working with one another to provide particular functionality, as described herein.

FIG. 3 illustrates a visualization of an example computing environment for determining at least one scored network asset set in accordance with at least some example embodiments of the present disclosure. Specifically, the example computing environment includes a network asset data object set 302A-302N (collectively "network assets 302") utilized to generate scored network asset data object set 306A-306N (collectively "scored network assets 306") via a network asset scoring model 304. In this regard, the network assets 302 may be embodied by one or more data objects maintained associated with the computing environment, the scored network assets 306 may be embodied by one or more other data objects maintained associated with the computing environment, and the network asset scoring model 304 may be embodied by one or more data objects maintained associated with the computing environment.

The network assets 302 may each embody available network asset data object(s) made available via the network asset processing apparatus 200. In some embodiments, for example, the network asset processing apparatus 200 retrieves the network assets 302 embodying all available network asset data object(s) for scoring. In this regard, the network asset processing apparatus 200 may score each available network asset data object such that all available network asset data object is processed for possibly providing to the user. In other embodiments, the network assets 302 embodies a particular subset of available network asset data object(s). For example, in some embodiments, the network assets 302 may embody a data tagged network assets set associated with a particular shared network asset tag data object. In this regard, the network assets 302 may embody a particular sub-grouping of available network asset data object(s), for example those associated with a particular shared characteristic or otherwise linked together.

The network assets are input into network asset scoring model 304 for scoring. The network asset scoring model 304 may be embodied by any number of model(s). In some embodiments, for example, the network asset scoring model 304 is embodied by at least one specially configured machine learning model, for example trained based on particular data to maximize one or more determinative goals. In this regard, the network asset scoring model 304 may be trained to score network asset data objects of the network assets 302 higher based on the propensity the user corresponding to the associated unique profile identifier is to initiate a transaction associated with the network asset data object. Additionally or alternatively, in some embodiments, the network asset scoring model 304 is embodied by one or more algorithmic and/or statistical models alone or in conjunction with one more machine learning model(s).

In some embodiments, the network asset scoring model 304 may be configured to generate an asset score for each network asset data object of the network assets 302, where the asset score represents the fit for the corresponding network asset data object with a particular determination maximized by the network asset scoring model 304. For example, the asset score may represent the propensity for the user corresponding to the unique profile identifier to transact with the network asset data object. In some such embodiments, a higher asset score may represent a higher propensity for the corresponding user to transact with the network asset data object. In other embodiments, for example, the network asset scoring model 304 is configured to generate an asset score corresponding to the rank of the network asset data object with respect to other network asset data objects of the network assets 302 with respect to the maximized goal. In this regard, for example, the network asset data object associated with a highest rank may be associated with an asset score indicating that the network asset data object is most likely of the network assets 302 to be transacted by the corresponding user. In some such embodiments, the scored network assets 306 may be associated with asset scores that are not absolute, and rather are informative based on other asset scores for the scored network assets 306.

The network asset scoring model 304 may be trained based on any of a myriad of data associated with network asset data object(s) for one or more users. For example, in some embodiments, the network asset scoring model 304 is trained based on one or more portions of enterprise network interaction data associated with one or more unique profile identifiers. The enterprise network interaction data may include interaction data associated with each of the one or more unique profile identifiers. For example, the interaction data for a particular unique profile identifier may include any number of actions performed by a user associated with the unique profile identifier via the corresponding user profile, such as inputted search queries, page views, network asset data object(s) interacted with, network asset data object(s) added as favorite, network asset data object(s) selected associated with the unique profile identifier (e.g., to stage for a transaction, for example by adding to a virtual cart), and/or initiated transactions associated with network asset data object(s). In this regard, the network asset scoring model 304 may be trained to identify data trends, patterns, and/or other inferences present in the training data (e.g., the enterprise network interaction data set for one or more unique profile identifiers) to maximize a particular determinative goal. In the context where the network asset scoring model 304 is trained to maximize propensity to purchase, for example, the network asset scoring model 304 may be trained to identify data trends, patterns, inferences, and/or the like, from a training corpus that maximizes the likelihood that a user corresponding to a unique profile identifier initiates a transaction associated with highly-scored network asset data objects.

In some embodiments, the network asset scoring model 304 is trained to utilize various portions of data properties and/or information for a network asset data object to generate a corresponding score for said network asset data object. Such data and/or information associated with a network asset data object may be utilized in conjunction with enterprise network interaction data to determine the particular data property values and/or information associated with network asset data objects likely to be of interest, and/or transacted with, by the user. In some embodiments, for example, the network asset scoring model 304 is trained to score a network asset data object based on data embodied by or corresponding to the network asset data object that represents a brand name, product name, product category, product description, product metadata tag, and/or the like.

In some embodiments, a data value corresponding to one or more of such data properties is manually input by a data steward and/or administrative user for each network asset data object. In some embodiments, data value(s) for one or more of such data properties is embedded within a data embedding space that may be utilized for correlating such data value(s) and/or otherwise enabling exploration of different data value(s) that may be similar for one or more data properties. In this regard, similar network asset data object(s) (e.g., network asset data objects that are associated with data values for one or more data properties that are categorically indicated as similar based on one or more data properties) may be embedded within the embedding space at locations proximate to one another. Additionally or alternatively, network asset data object(s) may be categorized and/or otherwise linked together, such as by associating network asset data objects associated with proximate embeddings with a shared network asset data tag.

Similarly, exploring the embedding space enables identification of network asset data object(s) similar to one another based on similarities between various data value(s) for one or more data properties. Such exploration may enable determination of network asset data objects similar to a location in the embedding space that represents an interest of a particular user profile. In this regard, exploration of the embedding space may be utilized to identify network asset data objects that are similar to the interest(s) for the user profile, identify network asset data objects that are in a different portion of the embedding space (e.g., to test whether the user interacts with such network asset data objects), and/or the like, to continuously improve the accuracy of the asset provision system with respect to a diverse range of distinct network asset data object(s). Additionally or alternatively, in some embodiments, one or more data properties at the user level may be embedded into a particular embedding space. For example, in some embodiments, user insight data (e.g. explicit, implicit, and/or both) may be embedded into a particular embedding space that represents a lower dimension representation of the values for such user insight data. Additionally or alternatively, enterprise network interaction data associated with particular network asset data objects with which a user profile interacts may be embedded alone and/or together with one or more data values for data properties associated with the user profile. In this regard, the embedding space may embody a lower dimensionality representation of the interactions that a user profile associated with such certain data values is likely to perform. Additionally or alternatively still, user profile data, enterprise network interaction data, and/or data value(s) for one or more properties of network asset data objects may be embedded into a particular embedding space that decreases the dimensionality of the embedded data variables. In this regard, the embedding space may provide a lower dimensional representation that enables trends, interpretations, and other predictions to be accurately identified based on the various source data utilized to generate the lower dimensional embedding space. The lower dimensional representations may be less complex to process and/or derive features from while simultaneously accurately representing the data value that was embedded.

FIG. 4 illustrates a visualization of an example computing environment for training a network asset scoring model in accordance with at least some example embodiments of the present disclosure. For example, in some embodiments, the network asset scoring model 304 may be trained in the manner disclosed with respect to FIG. 4. As described herein, the network asset processing apparatus 200 may be configured to perform the actions described with respect to FIG. 4.

It should be appreciated that any number of network asset scoring model(s) may be trained, for example each having a different determinative goal. In one example context, for example, a first network asset scoring model is trained to maximize the propensity of a corresponding user to initiate a transaction associated with a particular network asset data object(s). Alternatively or additionally, a second network asset scoring model is trained to maximize an amount of electronic currency value transferred via transactions initiated associated with network asset data object(s) (e.g., to maximize revenue generated associated with transactions of network asset data object(s)). Alternatively or additionally still, a third network asset scoring model may be configured that ranks network asset data object(s) based on a particular data property value associated with the network asset data object(s) (e.g., price, time since the network asset data object became available, user rating value, and/or the like). In this regard, it should be appreciated that any number of network asset scoring model(s) may be available for use by the network asset processing apparatus 200. The selected network asset scoring model may be automatically determined, as described herein, or in some embodiments selectable based on user input (e.g., by the user of a client device associated with a particular use profile).

The computing environment begins with network asset interaction user interface(s) 402. The network asset interaction user interface(s) 402 may be configured to provide one or more network asset data object(s). For example, each of the network asset interaction user interface(s) 402 may include interface elements corresponding to one or more network asset data object(s) provided associated with a particular unique profile identifier. Alternatively or additionally, the network asset interaction user interface(s) 402 may include one or more user interfaces including interface element(s) that enable a user to view additional information associated with a particular network asset data object, and/or select the particular network asset data object (e.g., in one particular example context, a product page to view product information and/or add to cart). Additionally or alternatively still, in some embodiments, the network asset interaction user interface(s) 402 may include one or more user interfaces including interface element(s) that enable a user to initiate a transaction associated with one or more network asset data object(s) (e.g., to purchase a particular network asset data object, initiate a purchase of all network asset data object(s) added to the user's cart, and/or the like). Each interaction with network asset interaction user interface(s) 402 may generate and/or otherwise result in storing of enterprise network interaction data associated with the corresponding user profile by the network asset processing apparatus 200.

The network asset interaction user interface(s) may be rendered to a client device corresponding to a particular user profile for a unique profile identifier (e.g., via a mobile app authenticated with the network asset processing apparatus 200 to initiate an authenticated session). In this regard, interactions with the client device (e.g., user inputs) may result in one or more specially configured request(s) and/or other data transmissions that are received and processed by the network asset processing apparatus 200 to provide functionality requested based on the user input and corresponding request associated with the particular unique profile identifier corresponding to the user profile authenticated associated with the client device. In some such embodiments, the network asset processing apparatus 200 may generate, extract, and/or otherwise store interaction data embodied by, derived from, or otherwise associated with such transmissions. For example, the network asset processing apparatus 200 may receive, from a client device corresponding to a particular unique profile identifier, a request for a particular network asset interaction user interface embodying an information page associated with a particular network asset data object, and store interaction data representing that the unique profile identifier viewed the particular information page associated with the particular network asset data object. In some embodiments, the network asset processing apparatus 200 only stores interaction data associated with particular network asset data object(s), for example prioritized network asset data object(s) for the particular unique profile identifier.

Such interaction data may be stored in one or more databases, such as the enterprise network interaction database 404. In some embodiments, the enterprise network interaction database 404 is maintained by the network asset processing apparatus 200. The enterprise network interaction database 404 may include an enterprise network interaction data set, for example that includes an individual interaction data set for each particular unique profile identifier. In this regard, the network asset processing apparatus 200 may store newly received and/or generated interaction data in the enterprise network interaction database 404 in a manner such that the interaction data is retrievable associated with the corresponding unique profile identifier.

Training of one or more network asset scoring model(s) may be initiated at any of a myriad of times. In some embodiments, training of one or more network asset scoring model(s) is initiated at regular intervals (e.g., hourly, nightly, weekly, and/or the like). In other embodiments, training of one or more network asset scoring model(s) is initiated manually, for example by an administrative user of the network asset processing apparatus 200. It should be appreciated that the network asset processing apparatus 200 may continue to store interaction data to the enterprise network interaction database 404 for use in subsequent training operations.

Upon initiation of training, the network asset processing apparatus 200 may retrieve enterprise network interaction data set 406 from the enterprise network interaction database 404. The enterprise network interaction data set 406 may include interaction data associated with one or more unique profile identifiers. In some embodiments, for example in circumstances where one or more model(s) is to be trained associated with a particular unique profile identifier, the enterprise network interaction data set 406 is retrieved including the interaction data corresponding to the unique profile identifier. In such embodiments, for example, the model(s) may be trained specifically based on data trends, patterns, and/or other insights determined from the interaction data particularly associated with the unique profile identifier for which the model(s) are to be trained. In some embodiments, additionally or alternatively, the enterprise network interaction data set 406 includes interaction data associated with one or more other unique profile identifiers. In this regard, for example, the model(s) maybe trained based on trends, patterns, and/or other insights determined from interaction data associated with multiple users (or in some embodiments, all users) of the network asset processing apparatus 200.

The network asset processing apparatus 200 utilizes the enterprise network interaction data set 406 to generate a network interaction training data corpus 408. The network interaction training data corpus 408 may embody training data for use in training one or more network asset scoring models, such as the network asset scoring model 410. In some embodiments, for example, the enterprise network interaction data set 406 embodies the network interaction training data corpus 408. In other embodiments, the network interaction training data corpus 408 is embodied by a subset of the enterprise network interaction data set 406 (e.g., only the interaction data associated with a particular unique profile identifier). Additionally or alternatively, in some embodiments, enterprise network interaction data set 406 is combined with one or more additional data set(s), such as updated and/or real-time interaction data received at one or more timestamp intervals, to generate the network interaction training data corpus 408 as described herein. One such example is described with respect to the processing of interaction data in FIG. 5.

In some embodiments, the network interaction training data corpus 408 is generated by embedding of one or more data values associated with one or more user profile(s) and/or one or more network asset data object(s). In this regard, one or more embedding algorithms may be implemented that embed discrete data values representing data properties of a network asset data object and/or user profile into continuous data values within a particular embedding space (or multiple embedding spaces). In some embodiments, the embedding algorithm is embodied by one or more machine learning, algorithmic, and/or statistical model(s) configured to generate the embedding space. One such example implementation comprises a neural network specially trained based on input data of the same type to be embedded. The input data may be labelled and/or otherwise identified in a particular manner that enables training of the neural network (or other machine learning model) in a supervised manner. The resulting trained neural network embodies parameters weighted such that similar embedded data is located proximate to one another in the embedding space. The input data utilized to train the embedding algorithm may be automatically generated and/or manually generated (e.g., based on labels manually assigned to records of the input data) to enable training associated with a particular target supervised learning goal (e.g., identifying classifications of user profile(s) and/or network asset data object(s)).

Data values associated with data properties of a user profile and/or corresponding enterprise network interaction data, for example associated with one or more network asset data object(s), searches for network asset data object(s), transaction data for transactions of network asset data object(s), and/or the like. In this regard, high dimensional data (e.g., data values for one or more properties associated with network asset data object(s), data values for user profile properties, and/or the like) may be embedded into a lower dimensional embedding space. In this regard, features embodying associations and/or data trends between user profiles and/or particular network asset data object(s) may be learned based on the representations of such data within one or more embedding space(s). Training a network asset scoring model via the lower dimensional space (e.g., an embedding space) improves the accuracy of the resulting trained model, for example as such features may each represent more complex and/or otherwise deeper associations between various data object(s).

The network asset processing apparatus 200 trains the network asset scoring model 410 utilizing the network interaction training data corpus 408 and scoring model features 412. The network asset processing apparatus 200 maintains the scoring model features 412 based on automatically extracted feature(s), and/or embodying an engineered set of features manually constructed based on user input from one or more administrative user(s) associated with the network asset processing apparatus 200. For example, in some embodiments, the scoring model features 412 are each manually selected from a set of possible model features utilized for training network asset scoring model(s). It should be appreciated that, in some embodiments, different network asset scoring models may be trained based on different scoring model features.

The scoring model features 412 may be utilized to train the network asset scoring model 410 based on the network interaction training data corpus 408. In this regard, the network interaction training data corpus 408 may be utilized to generate and/or otherwise determine weights for each of the scoring model features 412. Upon completion of training, the network asset scoring model 410 may utilize the final weights for such scoring model features 412 (e.g., generated based on the network interaction training data corpus 408) to generate an asset score in subsequent operations of scoring network asset data object(s).

FIG. 5 illustrates a visualization of example computing components for providing at least one network asset set in accordance with at least some example embodiments of the present disclosure. Each of the computing components may be embodied by one or more computing devices, for example computing devices of an example system such as an asset provision system 102. In some embodiments, each computing component may be embodied by a single computing device embodied in hardware, software, firmware, and/or the like, and/or multiple computing devices each embodied in hardware, software, firmware, and/or the like, under the control of a particular entity. It should be appreciated that, in some embodiments, particular computing components depicted may be embodied by third-party own software-as-a-service cloud devices under the control of a single entity, for example the entity in control of the network asset processing apparatus 200 embodying one or more other computing components of the of the depicted computing components.

The computing components includes a Redshift repository 502. The Redshift repository 502 may be embodied as one or more implementations of Amazon Redshift that provides cloud data storage. In this regard, the Redshift repository 502 may store legacy enterprise network interaction data for any number of unique profile identifiers, for example.

The network asset processing apparatus 200 may retrieve data from the Redshift repository 502 to implement an instance of a process for providing one or more network asset data object(s) to user(s) registered with the network asset processing apparatus 200. As depicted, for example, data from the Redshift repository 502 (e.g., previously stored enterprise network interaction data) may be retrieved and processed via the ETL pipeline 504. The previously stored enterprise network interaction data retrieved from the Redshift repository 502 may be processed via ETL pipeline 504 together with daily interaction data 506. The daily interaction data 506 may include interaction data for particular unique profile identifiers that is combined with previous data from the Redshift repository 502 to provide updates to such data at a predetermined timestamp intervals (e.g., daily). In this regard, interaction data for one or more unique profile identifiers is continually updated for use in selecting and/or providing network asset data object(s). As depicted, for example, the daily interaction data may be stored utilizing Amazon S3, for example as a user utilizes a particular user profile to interact with the network asset processing apparatus 200.

The ETL pipeline 504 may perform any number of transformations to prepare the enterprise network interaction data from the Redshift repository 502 and the daily interaction data 506 for further processing. For example, the network asset processing apparatus 200 may transform the enterprise network interaction data from the Redshift repository 502 and the daily interaction data 506 into a single network interaction training data corpus for use in training and/or updating one or more model(s), such as network asset scoring model(s) and/or multi-armed bandit model(s).

The network asset processing apparatus 200 subsequently determines network asset data object(s) to be stored as member recommendations 508. In this regard, the determined network asset data object(s) may represent network asset data object(s) selected for providing associated with various unique profile identifiers. For example, such network asset data object(s) may be selected as best for providing based on one or more determination goals, for example for which a particular asset scoring model is trained to optimize. It should be appreciated that, in this regard, the network asset data object(s) embodying the member recommendations 508 may be generated based on one or more network asset scoring model(s). Additionally or alternatively, in some embodiments, the member recommendations 508 for different unique profile identifiers may differ. The network asset data object(s) embodying the member recommendations 508 are pushed to the S3 Recommendations repository 510 upon generation. In this regard, the S3 Recommendations repository 510 may be configured to enable distribution of the network asset data object(s) for one or more unique profile identifier(s) embodying the member recommendations 508 to one or more subsequent components for further processing and/or providing.

The network asset data object(s) embodying the S3 Recommendations 514 are processed via the ETL pipeline 512. The ETL pipeline 512 transforms, adapts, manipulates, and/or otherwise process the network asset data object(s) for providing via Sailthru instance 514. In this regard, the ETL pipeline 512 may process the network asset data object(s) embodying the selected network asset data object(s) in a manner utilized by Sailthru instance 514 for providing to a user corresponding to the unique profile identifier. For example, the ETL pipeline 512 may push processed versions of the recommendations 510 to the Sailthru instance 514 to enable the Sailthru instance 514 to generate and/or provide data embodying the selected network asset data object(s) embodying the recommendations 510 via a third-party application, such as an email accessible to the corresponding user via a third-party email application. In this regard, the Sailthru instance 514 may generate a specially configured transmission embodying an email transmission including some or all of the selected network asset data object(s), and/or information associated therewith. The transmission may arrange the network asset data object(s) in a particular order, for example based on corresponding ranks and/or scores generated by one or more model(s) during selection. In some such embodiments, for example, the network asset data object(s) are arranged such that data associated with the highest-ranked or otherwise highest-scored selected network asset data object appears first in the transmission.

The network asset data object(s) embodying the S3 Recommendations 514 are further processed via recommender API pipeline(s) 516. The recommender API pipeline(s) 516 transform, adapt, manipulates, and/or otherwise processes the network asset data object(s) for providing via the recommender API redis instance 518. For example, the recommender API pipeline(s) 516 may process the selected network asset data object(s) to process the network asset data objects into a format storable to and/or providable via the recommender API redis instance 518. The recommender API redis instance 518 may serve to provide a such data in a manner renderable to one or more user-facing application(s) corresponding to the network asset processing apparatus 200. For example, the recommender API redis instance 518 may serve the member recommendations embodied by data pushed to the recommender API redis instance 518 for a particular unique profile identifier at the time that a user renders one or more particular user interfaces.

In some embodiments, the process described with respect to FIG. 5 may be performed for any number of unique profile identifier(s). For example, in some embodiments, data specific to each unique profile identifier is utilized specifically to train one or more model(s) for performing determination(s) specific to the unique profile identifier. In this regard, the interactions performed by a particular user may be utilized to inform the selected network asset data objects recommended specifically for that unique profile identifier. The network asset processing apparatus 200 may subsequently update the recommendations for each unique profile identifier, or a specific subset thereof (e.g., those that have interacted with the system over the last day) by updating the data pushed to the Sailthru instance 514 and recommender API redis instance 518 for each specific unique profile identifier.

FIG. 6 illustrates a visualization of example computing components for determining at least one network asset set to be provided in accordance with at least some example embodiments of the present disclosure. Specifically, the example computing components perform a process at one or more time intervals (e.g., daily) for providing each user profile with a personalized set of network asset data object(s) recommended for the user profile via particular algorithmic implementations (e.g., machine learning model(s)) based on various user engagements and/or associated data.

In this regard, member recommendations embodying network asset data object(s) selected for providing associated with a particular unique profile identifier may be identified. The stored member recommendations embodying selected network asset data object(s) may differ for each unique profile identifier. It should be appreciated that, as such, each user profile may be associated with different member recommendations, or otherwise provided different selected network asset data object(s), based on the differences in interaction data for the different corresponding unique profile identifiers.

As illustrated, for example, particular data is pulled from the data warehouse(s) 602 for processing. Such data warehouse(s) may include one or more database(s) storing historical interaction data associated with one or more unique profile identifier(s), and/or updated data collected for a particular time interval (e.g., daily interaction data). As described with respect to FIG. 5, for example, at least one Redshift database instance may be utilized to store an enterprise network data set including interaction data associated with a particular unique profile identifier, and/or an S3 instance may be utilized to store updated and/or real-time interaction data for a particular time interval (e.g., daily interaction data). It should be appreciated that in some embodiments, the updated interaction data for a particular unique profile identifier comprises more detailed information associated with the corresponding interactions, and the historical interaction data stored may be manipulated, aggregated, and/or otherwise processed for enhanced storing (e.g., to remove levels of detail in attempts to reduce the amount of computing resources required for storing such data). In some such embodiments, enterprise network interaction data including data from each of the data warehouse(s) 602 may be retrieved.

In some embodiments, the network asset processing apparatus 200 retrieves interaction data 604 for a particular unique profile identifier, the interaction data 604 may include data representing aspects of different interactions between the user corresponding to a user profile associated with the unique profile identifier and the network asset processing apparatus 200 (or, in some embodiments, a related system and/or platform). As depicted, the interaction data 604 may include one or more of transaction data 604A, search data 604B, page view data 604C, and registration attributes data 604D.

The transaction data 604A may include interactions associated with the unique profile identifier for initiating transactions associated with particular network asset data object(s). For example, such transactions may include orders placed for particular network asset data object(s) via the network asset processing apparatus 200.

The search data 604B may include search queries for network asset data object(s) submitted by the user corresponding to the unique profile identifier. Additionally or alternatively, in some embodiments, the search data 604B includes result data associated with such search queries and/or interactions with such results of the search queries.

The page view data 604C may include data indicating which pages have been provided to the user associated with the unique profile identifier. Such "pages" may include information pages or other user interfaces associated with particular network asset data object(s) with which the user interacted. For example, the user may interact with an interface element associated with a particular network asset data object provided in response to a search interaction or a browse interaction to view an information page including information associated with the network asset data object.

The registration attributes data 604D may include user-submitted information associated with the user corresponding to the unique profile identifier. For example, the registration attributes data 604D may include biographical information associated with the user corresponding to the unique profile identifier (e.g., name data, age data, location data, marital status data, family size data, number of children data, children information data, and/or the like). Additionally or alternatively, for example, the registration attributes data 604D may include explicit insight data inputted by the user corresponding to the unique profile identifier. Such explicit insight data may include user preferences inputted by the user, user preferences selected from a set of predetermined user preferences, existing network asset tag data object(s) selected by the user a preference, network asset restrictions and/or other filtering data (e.g., dietary restrictions of the user), and/or the like.

The interaction data 604 corresponding to the particular unique profile identifier may embody a network interaction training data corpus. For example, the network interaction training data corpus may include data values utilized for training one or more model(s), such as a network asset scoring model and/or a multi-armed bandit model. Alternatively or additionally, in some embodiments, the interaction data 604 corresponding to the particular unique profile identifier is utilized to derive the network interaction training data corpus. For example, the interaction data 604 may be processed to extract values corresponding to particular features utilized for training one or more network asset scoring model(s) and/or multi-armed bandit model(s).

The network asset processing apparatus 200 subsequently performs feature engineering 606. In some embodiments, the feature engineering 606 identifies particular features upon which one or more model(s) are to be trained. For example, the feature engineering 606 may identify particular features utilized by one or more network asset scoring model(s). The network asset processing apparatus 200 may perform feature engineering 606 automatically, for example by processing the interaction data 604 and/or interaction data for other unique profile identifier(s) to extract such feature(s). Alternatively or additionally, in some embodiments, the network asset processing apparatus 200 may perform feature engineering 606 manually, for example by enabling a user to configure particular features from at least the interaction data 604.

The network asset processing apparatus 200 subsequently performs model training 608 for one or more model(s). In some embodiments, the model training 608 includes a single value decomposition (SVD) process. In this regard, the model training 608 is performed based on uncorrelated features determined via the SVD process. It should be appreciated that, in other embodiments, other principal component analysis algorithms that ensure uncorrelated features are utilized in training may be implemented. The model training 608 may be performed based on the values for such features identified within, extracted from, and/or otherwise derived based on the network interaction training corpus, for example including or embodied by the interaction data 604.

The network asset processing apparatus 200 subsequently performs scoring & filtering 610. In this regard, the network asset processing apparatus 200 may utilize one or more particular model(s) trained as described with model training 608. For example, in some embodiments, one or more network asset scoring model(s) may be utilized to score network asset data object(s) and/or rank network asset data object(s) amongst one another. The network asset data object(s) may additionally or alternatively be filtered based on one or more data values. For example, in some embodiments, explicit and/or implicit user insight data (e.g., preferences data in the registration attributes data 604D) may be utilized to remove one or more network asset data object(s) from consideration based on value(s) for data properties associated with the network asset data object. In one example context, for example, the explicit user insight data includes restricted value(s) for particular data properties of the network asset data object, such that network asset data objects having a data property with a restricted value may be removed from consideration and/or scoring.

The network asset processing apparatus 200 subsequently stores member recommendations 612. In some embodiments, the member recommendations 612 embody the scored network asset data object(s) determined as a result of the scoring & filtering 610. For example, the member recommendations 612 may embody all scored network asset data object(s) not filtered out and arranged based on the asset scores for each network asset data object. Alternatively or additionally, in some embodiments, the member recommendations 612 is embodied by or otherwise includes a particular subset of the scored network asset data object(s). For example, in some embodiments, the member recommendations 612 includes a certain number of network asset data object(s) corresponding to the certain number of highest asset score(s). In one example context, for example, the member recommendations 612 includes the top 100 highest scored network asset data objects for the particular unique profile identifier. The member recommendations 612 may subsequently be provided associated with one or more user(s), for example as described in FIG. 5 with respect to Sailthru instance 514 and recommender API redis instance 518.

Example User Interfaces of the Disclosure

FIG. 7 illustrates an example user interface including an example carousel display interface including network asset data object(s) in accordance with at least some example embodiments of the present disclosure. Specifically, FIG. 7 depicts an example user interface 700 embodying a web interface rendered via a user-facing web application comprising an example carousel display interface. The example user interface 700 may be rendered to a client device, for example a client device associated with an authenticated session for a particular user profile corresponding to a particular unique profile identifier. It should be appreciated that a similar user interface may be rendered as part of a user-facing native application executed on the client device.

The example user interface 700 includes a plurality of interface elements, including a carousel display interface 704 embodying a sub-interface of the example user interface 700. The carousel display interface 704 includes a plurality of network asset interface elements 702A-702D, each associated with a network asset data object of a network asset data object set provided associated with the unique profile identifier corresponding to the client device to which the example user interface 700 is rendered. In this regard, the network asset interface elements 702A-702D may each be configured to enable a user to interact with the corresponding network asset data object. For example, the network asset interface element 702A includes sub-interface elements that enable the user to select, view, and/or otherwise interact with a first network asset data object corresponding to Thrive Market Organic Bay Leaves. The network asset interface element 702B includes sub-interface elements that enable the user to select, view, and/or otherwise interact with a second network asset data object corresponding to Thrive Market Organic Thyme. The network asset interface element 702C includes sub-interface elements that enable the user to select, view, and/or otherwise interact with a third network asset data object corresponding to Thrive Market Organic Paprika. The network asset interface element 704D includes sub-interface elements that enable the user to select, view, and/or otherwise interact with a fourth network asset data object corresponding to Thrive Market Organic Curry Powder.

In some embodiments, the network asset interface elements 702A-702D each correspond to particular prioritized network asset data object(s) provided associated with the unique profile identifier. For example, the network asset interface elements 702A-702D may each correspond to a scored network asset data object that satisfies an asset prioritization threshold (e.g., the top 4 scored network asset data objects). In this regard, in some such embodiments, data representing or otherwise associated with the user interactions with the network asset interface elements 702A-702D may be stored and/or utilized by the network asset processing apparatus 200 as user interaction data associated with the unique profile identifier. The data may be utilized to further train one or more model(s), as described herein. For example, in a circumstance where a user interacts with the network asset interface element 702C (e.g., to select the network asset data object, initiate a transaction corresponding to the network asset data object, and/or the like), such interaction data may be generated, gathered, and/or otherwise stored by the network asset processing apparatus 200 for use in training such model(s) to indicate the user associated with the unique profile identifier has at least some interest in the corresponding network asset data object.

The carousel display interface 704 is associated with carousel updating interface elements 706. The carousel updating interface elements 706 are configured to update one or more of the sub-interfaces embodying network asset interface elements rendered within the carousel display interface 704. For example, upon user interaction with a right or "next" interface element of the carousel updating interface elements 706, each of the network asset interface elements 702A-702C may be replaced with new network asset interface elements corresponding to the next four network asset data objects of a network asset data set provided to the client device. In this regard, the user may utilize the carousel updating interface elements 706 to view and/or otherwise interact with the different network asset data object(s) provided as part of the network asset data set in a particular order. For example, as the user updates the carousel display interface 704 using a right or "next" interface element of the carousel updating interface elements 706, network asset interface elements associated with lower-scored network asset data objects may be rendered. Similarly, for example, as the user updates the carousel display interface 704 using a left or "previous" interface element of the carousel updating interface elements 706, network asset interface elements associated with higher-scored network asset data objects may be rendered. In this regard, the carousel display interface is specially configured to enable a user to interact with only a particular focused set of network asset data objects at a particular time, for example beginning with network assets determined to best meet a particular determination goal.

It should be appreciated that network assets may be provided through any of a myriad of user interfaces during a user's interactions with the network asset processing apparatus 200. For example, FIG. 8 illustrates another example user interface including network asset data object(s) in accordance with at least some example embodiments of the present disclosure. Specifically, FIG. 8 depicts an example user interface 800 embodying a second web interface rendered via a user-facing web application comprising network asset data object(s) provided to associated with a corresponding unique profile identifier corresponding to a particular user. The example user interface 800 may similarly be rendered to a client device, for example a client device associated with an authenticated session for a particular user profile corresponding to the particular unique profile identifier. It should be appreciated that a similar user interface may be rendered as part of a user-facing native application executed on the client device. The example user interface 800 may be rendered at a homepage, a search query page, and/or any other user interface where providing recommended network asset data objects, for example, is desired.

The example user interface 800 includes a plurality of sub-interfaces, including a network asset display interface 804. The network asset display interface 804 includes interface element(s) associated with one or more network asset data object(s) provided. For example, in some embodiments, the network asset display interface 804 includes network asset interface elements 802A-802F. In the displayed example context, each of these network asset interface elements correspond to a particular product available for transacting, for example via the network asset processing apparatus 200. Each of the network asset interface elements 802A-802F may include sub-interface elements as similarly described with respect to the network asset interface elements 702A-702D as depicted and described with respect to FIG. 7. Additionally or alternatively, each of the network asset interface elements 802A-802F may similarly be configured to be engageable by the user to view a page associated with the corresponding network asset data object, for example to view additional information associated with the network asset data object. In some embodiments, the user may click, tap, or otherwise provide user input on or associated with one of the network asset interface elements 802A-802F to view the specific product information page associated with the corresponding network asset data object, for example.

Example Processes of the Disclosure

Having discussed example systems, apparatuses, computing environments, and user interfaces associated with embodiments of the present disclosure, example flowcharts including various operations performed in accordance with embodiments of the present disclosure will now be discussed. It should be appreciated that each of the flowcharts depicts an example computer-implemented process that may be performed by one or more of the apparatuses, systems, and/or devices described herein, for example utilizing one or more of the components thereof. The blocks indicating operations of each process may be arranged in any of a number of ways, as depicted and described herein. In some such embodiments, one or more blocks of any of the processes described herein occur in-between one or more blocks of another process, before one or more blocks of another process, and/or otherwise operates as a sun-process of a second process. Additionally or alternative, any of the processes may include some or all of the steps described and/or depicted, including one or more optional operational blocks in some embodiments. In regards to the below flowcharts, one or more of the depicted blocks may be optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

FIG. 9 illustrates operations of an example process for providing network asset data object(s) in accordance with at least some example embodiments of the present disclosure. Specifically FIG. 9 depicts an example process 900 for generating training corpus(es) utilized to train one or more network asset scoring model for use in providing network asset data object(s). In some embodiments, the computer-implemented process 500 is embodied by computer program code stored on a non-transitory computer-readable medium of a computer program product configured for execution to perform the computer-implemented method. Alternatively or additionally, in some embodiments, the example process 900 may be performed by one or more specially configured computing devices, such as the asset provision system 102 embodied by the specially configured network asset processing apparatus 200. In this regard, in some such embodiments, the network asset processing apparatus 200 is specially configured by computer program instructions stored thereon, for example in the memory 204 and/or another component depicted and/or described herein, and/or otherwise accessible to the network asset processing apparatus 200, for performing the operations as depicted and described with respect to the example process 900. In some embodiments, the specially configured network asset processing apparatus 200 includes and/or otherwise is in communication with one or more external apparatuses, systems, devices, and/or the like, to perform one or more of the operations as depicted and described. For example, the network asset processing apparatus 200 may include and/or communicate with one or more external computing devices, such as client device(s) associated with various user(s), each authenticated associated with a particular user profile corresponding to a particular unique profile identifier.

The process 900 begins at operation 902. At operation 902, the network asset processing apparatus 200 includes network asset management circuitry 210, model management circuitry 212, network asset prioritization circuitry 214, data tag management circuitry 216, communications circuitry 208, input/output circuitry 206, processor 202, and/or the like, or a combination thereof, configured to accessing enterprise network interaction data comprising an interaction data set associated with a unique profile identifier. In some embodiments, the interaction data set is associated with at least one prioritized network asset data set provided associated with the unique profile identifier. Each prioritized network asset of the prioritized network asset data set satisfying an asset prioritization threshold. For example, the prioritized network assets may include the highest-ranked network asset data object(s) provided associated with the unique profile identifier, for example those ranked above a certain threshold (e.g., top 5, top 10, top 5%, and/or the like). In this regard, by collecting and utilizing data associated with a reduced set of network asset data object(s), for example only the prioritized network assets, the apparatus 200 may reduce the amount of computing resources utilized to gather and/or store such data. Similarly, the apparatus 200 reduces the amount of computing devices utilized to perform operations for training from such data.

At operation 904, the network asset processing apparatus 200 includes network asset management circuitry 210, model management circuitry 212, network asset prioritization circuitry 214, data tag management circuitry 216, communications circuitry 208, input/output circuitry 206, processor 202, and/or the like, or a combination thereof, configured to generate a network interaction training data corpus based at least on the enterprise network interaction data. In some embodiments, the network interaction training data corpus includes all of the enterprise network interaction data for each unique profile identifier. In some embodiments, the network interaction training data corpus includes only the interaction data associated with the particular unique profile identifier for which the network interaction training data corpus is to be utilized for training. For example, in a circumstance where the apparatus is performing such operations for a particular unique profile identifier (e.g., user_A_01), the network asset processing apparatus 200 creates the network interaction training data corpus based only on the interaction data corresponding to that unique profile identifier (e.g., the interaction data gathered for user_A_01).

In some embodiments, the network interaction training data corpus is generated by processing the enterprise network interaction data and/or portions thereof, such as at least the interaction data for the particular unique profile identifier. For example, in some embodiments, the enterprise network interaction data or a portion thereof is processed to determine value(s) for one or more features associated with such data. In this regard, the feature values generated may embody the network interaction training data corpus for use in subsequent training operations.

At operation 906, the network asset processing apparatus 200 includes network asset management circuitry 210, model management circuitry 212, network asset prioritization circuitry 214, data tag management circuitry 216, communications circuitry 208, input/output circuitry 206, processor 202, and/or the like, or a combination thereof, configured to train at least one network asset scoring model based on at least the network interaction training data corpus. In this regard, a network asset scoring model may be trained such that weighting for one or more feature(s) is performed based on data trends, patterns, and/or the like represented in the network interaction training data corpus. The training may be performed with respect to a particular determination goal (e.g., a target goal that the network asset scoring model may be trained to maximize and/or corresponding error that the network asset scoring model may be trained to minimize).

In one particular example, a network asset scoring model embodies a recommendation engine configured to maximize a user's propensity to purchase or otherwise initiate a transaction associated with one or more network asset data object(s). In this regard, the network asset scoring model may be trained to output and/or otherwise provide score(s) for a network asset data object and an associated unique profile identifier, where the score represents the propensity for the user associated with the unique profile identifier to interact with and/or otherwise initiate a transaction associated with the corresponding network asset data object. Alternatively or additionally, in some embodiments, the network asset scoring model may be trained to output and/or otherwise provide a set of scored network asset data object(s) embodying a ranked order of the network asset data objects based on the propensity for the user associated with the unique profile identifier to interact with and/or otherwise initiate a transaction associated with each of the corresponding network asset data objects.

At operation 908, the network asset processing apparatus 200 includes network asset management circuitry 210, model management circuitry 212, network asset prioritization circuitry 214, data tag management circuitry 216, communications circuitry 208, input/output circuitry 206, processor 202, and/or the like, or a combination thereof, configured to determine a scored network assets data set for the unique profile identifier. In some embodiments, the scored network assets data set is determined based on the trained at least one network asset scoring model. For example, the at least one network asset scoring model may be utilized to generate asset scores corresponding to each network asset data object of a particular network asset data set, and/or to rank each network asset data object of a network asset data set. In some embodiments, the scored network assets data set includes each network asset data object of an available network assets data set together with a corresponding asset score, and/or arranged into a particular ranked order.

At operation 910, the network asset processing apparatus 200 includes network asset management circuitry 210, model management circuitry 212, network asset prioritization circuitry 214, data tag management circuitry 216, communications circuitry 208, input/output circuitry 206, processor 202, and/or the like, or a combination thereof, configured to provide at least a portion of the scored network assets data set associated with the unique profile identifier. The at least a portion of the scored network assets data set may be provided via at least one network assets serving database. The network assets serving database may be specially configured to store an arrangement of network asset data object(s) that are to be rendered to one or more user interfaces provided to the user associated with the unique profile identifier.

For example, a network assets serving database may be communicated with to generate an email transmission to the user that includes at least the portion of the second network assets data set. Alternatively or additionally, a network assets serving database may be communicated with to generate a network assets display interface rendered during interactions of the unique profile identifier with the network asset processing apparatus 200. For example, in a circumstance where the user associated with the unique profile identifier accesses a home screen associated with accessing functionality of the network asset processing apparatus 200 and/or a corresponding platform, the network asset processing apparatus 200 may retrieve at least the portion of the scored network assets data set from the network assets serving database to render the network assets display interface providing at least the portion of the second network assets data set as recommendations.

In some embodiments, the network asset processing apparatus 200 provides all of the scored network assets data set. In some embodiments, the provided portion of the scored network assets data set includes one or more highest-ranked of the scored network assets data set. For example, only a threshold number of the highest-ranked scored network assets data set may be provided, such as the top 100 highest scored network assets data objects. Alternatively or additionally, in some embodiments, the portion of the scored network assets data set may include one or more prioritized network asset data objects. In some such embodiments, the network asset processing apparatus 200 may gather subsequent interaction data associated with at least the prioritized network asset data object(s) for use in subsequent iterations of training as described herein.

FIG. 10 illustrates operations of an example process for storing enterprise network interaction data for use, as part of providing network asset data object(s) in accordance with at least some example embodiments of the present disclosure. Specifically, FIG. 10 depicts an example process 1000 for storing enterprise network interaction data for use. In some embodiments, the computer-implemented process 1000 is embodied by computer program code stored on a non-transitory computer-readable medium of a computer program product configured for execution to perform the computer-implemented method. Alternatively or additionally, in some embodiments, the example process 1000 may be performed by one or more specially configured computing devices, such as the asset provision system 102 embodied by the specially configured network asset processing apparatus 200. In this regard, in some such embodiments, the network asset processing apparatus 200 is specially configured by computer program instructions stored thereon, for example in the memory 204 and/or another component depicted and/or described herein, and/or otherwise accessible to the network asset processing apparatus 200, for performing the operations as depicted and described with respect to the example process 1000. In some embodiments, the specially configured network asset processing apparatus 200 includes and/or otherwise is in communication with one or more external apparatuses, systems, devices, and/or the like, to perform one or more of the operations as depicted and described. For example, the network asset processing apparatus 200 may include and/or communicate with one or more external computing devices, such as client device(s) associated with various user(s), each authenticated associated with a particular user profile corresponding to a particular unique profile identifier.

The process 1000 begins at operation 1002. In some embodiments, the process 1000 begins after one or more operations of another process. Additionally or alternatively, in some embodiments, upon completion of the process 1000 flow proceeds to one or more operations of another process, such as the operation 904 of the process 900 as depicted and described. In other embodiments, the flow ends upon completion of the process 1000.

At operation 1002, the network asset processing apparatus 200 includes network asset management circuitry 210, model management circuitry 212, network asset prioritization circuitry 214, data tag management circuitry 216, communications circuitry 208, input/output circuitry 206, processor 202, and/or the like, or a combination thereof, configured to receive the enterprise network interaction data associated with the unique profile identifier in response to user interaction with at least one network asset display interface. In some embodiments for example, the user corresponding network asset display interface includes sub-interfaces associated with any number of network asset data object(s), for example corresponding to scored network asset data object(s) provided by the network asset processing apparatus 200. The user interaction may embody one or more tap(s), click(s), swipe(s), voice command(s), gesture(s), and/or other inputs associated with any of such sub-interface elements corresponding to the network asset data object(s), for example representing selection of the network asset data object, representing a request for rendering a user interface including product information for a particular network asset, and/or the like.

As described herein, in some embodiments the user initiates an authenticated session associated with a user profile corresponding to the particular unique profile identifier to access functionality of the network asset processing apparatus 200. In some such embodiments, as the user accesses such functionality, the enterprise network interaction data associated with the unique profile identifier is received and/or generated by the network asset processing apparatus 200.

At operation 1004, the network asset processing apparatus 200 includes network asset management circuitry 210, model management circuitry 212, network asset prioritization circuitry 214, data tag management circuitry 216, communications circuitry 208, input/output circuitry 206, processor 202, and/or the like, or a combination thereof, configured to store the enterprise network interaction data in an enterprise network interaction database. The enterprise network interaction data may be stored such that the user interaction data specific to the unique profile identifier may be retrieved via the unique profile identifier. In this regard, in subsequent operations where the network asset processing apparatus 200 is performing one or more operations for the unique profile identifier, for example to determine and/or provide network asset data object(s) as recommendations for the unique profile identifier, the network asset processing apparatus 200 may utilize the unique profile identifier as a key to retrieve the enterprise network interaction data from the enterprise network interaction database. It should be appreciated that the enterprise network interaction database may be embodied in hardware, software, firmware, and/or a combination thereof, and may be local to the network asset processing apparatus (e.g., embodied utilizing a non-transitory computer readable storage medium of the network asset processing apparatus 200) or a remote, cloud database.

For example, at optional operation 1006, the network asset processing apparatus 200 includes network asset management circuitry 210, model management circuitry 212, network asset prioritization circuitry 214, data tag management circuitry 216, communications circuitry 208, input/output circuitry 206, processor 202, and/or the like, or a combination thereof, configured to access the enterprise network interaction data from the enterprise network interaction database based on the unique profile identifier. In some such embodiments, the network asset processing apparatus 200 may query the enterprise network interaction database utilizing the unique profile identifier to access such enterprise network interaction data. In this regard, the enterprise network interaction data comprising the interaction data specific to the unique profile identifier may be retrieved and further processed as described with respect to FIG. 9.

FIG. 11 illustrates operations of an example process for training a network asset scoring model, as part of providing network asset data object(s) in accordance with at least some example embodiments of the present disclosure. Specifically, FIG. 11 depicts an example process 1100 for training a network asset scoring model. In some embodiments, the computer-implemented process 1100 is embodied by computer program code stored on a non-transitory computer-readable medium of a computer program product configured for execution to perform the computer-implemented method. Alternatively or additionally, in some embodiments, the example process 1100 may be performed by one or more specially configured computing devices, such as the asset provision system 102 embodied by the specially configured network asset processing apparatus 200. In this regard, in some such embodiments, the network asset processing apparatus 200 is specially configured by computer program instructions stored thereon, for example in the memory 204 and/or another component depicted and/or described herein, and/or otherwise accessible to the network asset processing apparatus 200, for performing the operations as depicted and described with respect to the example process 1100. In some embodiments, the specially configured network asset processing apparatus 200 includes and/or otherwise is in communication with one or more external apparatuses, systems, devices, and/or the like, to perform one or more of the operations as depicted and described. For example, the network asset processing apparatus 200 may include and/or communicate with one or more external computing devices, such as client device(s) associated with various user(s), each authenticated associated with a particular user profile corresponding to a particular unique profile identifier.

The process 1100 begins at operation 1102. In some embodiments, the process 1100 begins after one or more operations of another process, such as the operation 902 of the process 900 as depicted and described. Additionally or alternatively, in some embodiments, upon completion of the process 1100 flow proceeds to one or more operations of another process, such as the operation 906 of the process 900 as depicted and described. In other embodiments, the flow ends upon completion of the process 1100.

At operation 1102, the network asset processing apparatus 200 includes network asset management circuitry 210, model management circuitry 212, network asset prioritization circuitry 214, data tag management circuitry 216, communications circuitry 208, input/output circuitry 206, processor 202, and/or the like, or a combination thereof, configured to apply a transformation protocol to the enterprise network interaction data to create a first network interaction training data corpus. The transformation protocol may process the enterprise network interaction data into a format suitable for use in training one or more model(s), such as one or more network asset scoring model(s). For example, the transformation protocol may generate one or more feature values based on the enterprise network interaction data. In some embodiments, the transformation protocol is implemented via one or more ETL pipelines.

The transformation protocol(s) may include embedding of one or more data properties associated with a user profile and/or a network asset data object to be scored. For example, in some embodiments, the transformation protocol(s) include embedding data values for any number of data properties at a user profile level and a network asset data object level. Such embedding may provide a low-dimensional representation of the various values for such data properties in a particular embedding space. Generating such a low-dimensional embedding space improves the accuracy of recommendations generated therefrom and/or accurate exploration of the embedding space once a particular location in the embedding space representing an interest of the user is identified, generated, and/or otherwise determined.

At operation 1104, the network asset processing apparatus 200 includes network asset management circuitry 210, model management circuitry 212, network asset prioritization circuitry 214, data tag management circuitry 216, communications circuitry 208, input/output circuitry 206, processor 202, and/or the like, or a combination thereof, configured to receive a synchronous network interaction data set. The synchronous network interaction data set may embody or include interaction data corresponding to at least one unique profile identifier. For example, the synchronous network interaction data set may embody daily interaction data received associated with each user registered with the network asset processing apparatus 200. In this regard, the synchronous network interaction data set may represent new interactions performed by the user over a particular timestamp interval. Such new interaction data may supplement existing, historical interaction data for the user embodied in the enterprise network interaction data set earlier retrieved.

At operation 1106, the network asset processing apparatus 200 includes network asset management circuitry 210, model management circuitry 212, network asset prioritization circuitry 214, data tag management circuitry 216, communications circuitry 208, input/output circuitry 206, processor 202, and/or the like, or a combination thereof, configured to apply the transformation protocol to the synchronous network interaction data set to create a second network interaction training data corpus. The transformation protocol may process the synchronous network interaction data set into an appropriate format for training in a manner similar to that described with respect to the enterprise network interaction data at operation 1102. In this regard, it should be appreciated that the synchronous network interaction data set may be processed utilizing the same ETL pipelines in some embodiments, and in other embodiments the synchronous network interaction data set is processed by different ETL pipelines specifically configured for transforming the enterprise network interaction data.

At operation 1108, the network asset processing apparatus 200 includes network asset management circuitry 210, model management circuitry 212, network asset prioritization circuitry 214, data tag management circuitry 216, communications circuitry 208, input/output circuitry 206, processor 202, and/or the like, or a combination thereof, configured to generate the network interaction training data corpus from the first network interaction training data corpus and the second network interaction training data corpus. In some embodiments, the first network interaction training data corpus is combined with the second network interaction training data corpus, such that the resulting network interaction training data corpus includes a combination of the data in each individual network interaction training data corpus. Additionally or alternatively, in some embodiments, the network interaction training data corpus is derived from processing each of the first network interaction training data corpus and the second network interaction training data corpus. For example, feature values may be derived from the data values in each of the first network interaction training data corpus and the second network interaction training data corpus. The network interaction training data corpus generated based on at least the first network interaction training data corpus and the second network interaction training data corpus may then be utilized to train one or more model(s), such as network asset scoring model(s), as described herein.

FIG. 12 illustrates operations of an example process for causing rendering via a user-facing network asset transaction application, as part of providing network asset data object(s) in accordance with at least some example embodiments of the present disclosure. Specifically, FIG. 12 depicts an example process 1200 for causing rendering via a user-facing network asset transaction application. In some embodiments, the computer-implemented process 1200 is embodied by computer program code stored on a non-transitory computer-readable medium of a computer program product configured for execution to perform the computer-implemented method. Alternatively or additionally, in some embodiments, the example process 1200 may be performed by one or more specially configured computing devices, such as the asset provision system 102 embodied by the specially configured network asset processing apparatus 200.

In this regard, in some such embodiments, the network asset processing apparatus 200 is specially configured by computer program instructions stored thereon, for example in the memory 204 and/or another component depicted and/or described herein, and/or otherwise accessible to the network asset processing apparatus 200, for performing the operations as depicted and described with respect to the example process 1200. In some embodiments, the specially configured network asset processing apparatus 200 includes and/or otherwise is in communication with one or more external apparatuses, systems, devices, and/or the like, to perform one or more of the operations as depicted and described. For example, the network asset processing apparatus 200 may include and/or communicate with one or more external computing devices, such as client device(s) associated with various user(s), each authenticated associated with a particular user profile corresponding to a particular unique profile identifier.

The process 1200 begins at operation 1202. In some embodiments, the process 1200 begins after one or more operations of another process, such as the operation 908 of the process 900 as depicted and described. Additionally or alternatively, in some embodiments, upon completion of the process 1200 flow proceeds to one or more operations of another process. In other embodiments, the flow ends upon completion of the process 1200.

At operation 1202, the network asset processing apparatus 200 includes network asset management circuitry 210, model management circuitry 212, network asset prioritization circuitry 214, data tag management circuitry 216, communications circuitry 208, input/output circuitry 206, processor 202, and/or the like, or a combination thereof, configured to push at least the portion of the second network assets data set associated with the unique profile identifier via the at least one network assets serving database. In some embodiments, at least the portion of the scored network assets data set associated with the unique profile identifier is pushed from the at least one network assets serving database upon receiving a particular request associated with the unique profile identifier from a client device. For example, in some embodiments, the network asset processing apparatus 200 receives, from a particular client device associated with the unique profile identifier, a request to load a particular page provided by the network asset processing apparatus 200 that includes recommended network asset data object(s) for the user corresponding to the unique profile identifier, such as a homepage, a recommendations page, a search page, and/or the like. The at least portion of the scored network assets data set may be pushed via the network assets serving database by accessing the network asset data object(s) stored by the network asset scoring database that are associated with the unique profile identifier, which may represent the network asset data object(s) to be provided to the user associated with the unique profile identifier via one or more user interface(s).

In some embodiments, the network asset processing apparatus 200 maintains and/or otherwise is associated with a single network assets serving database that provides network asset data object(s) to be served via one or a plurality of modalities for accessing such network asset data objects recommended for a particular user profile. For example, in some embodiments, a single network assets serving database stores and provides network asset data object(s) upon access of the network asset processing apparatus 200 or an associated platform via a browser application, web applet, native application associated with the network asset processing apparatus and/or an associated platform, and/or a third-party application that serves network asset data object(s) (e.g., an SMS or text messaging service, an email service, and/or the like). In other embodiments, the network asset processing apparatus 200 maintains and/or otherwise is associated with a single network assets serving database provides network asset data object(s) to be served via a third-party application. For example, in some embodiments, the network asset processing apparatus 200 maintains a network assets serving database that provides network asset data object(s) for serving via a third-party application (e.g., an email service) and a second network assets serving database that provides network asset data object(s) for serving via one or more application(s) associated with and/or controlled by the network asset processing apparatus 200 and/or an associated platform (e.g., a client-facing native application or web application associated with the network asset processing apparatus 200).

At operation 1204, the network asset processing apparatus 200 includes network asset management circuitry 210, model management circuitry 212, network asset prioritization circuitry 214, data tag management circuitry 216, communications circuitry 208, input/output circuitry 206, processor 202, and/or the like, or a combination thereof, configured to cause, via interaction with the at least one network assets serving database, rendering of a network asset display interface. The network asset display interface may be rendered via a user-facing network asset transaction application executing on the client device, for example where the user-facing network asset transaction application provides access to functionality of the network asset processing apparatus 200 to view, select, transact, and/or otherwise interact with network asset data objects made available via the network asset processing apparatus 200. For example, the at least the portion of the scored network assets data set may be rendered via a user-facing native network asset transaction application executed on the client device, or a user-facing web network asset transaction application. The network asset display interface may include a plurality of interface elements, each corresponding to a particular network asset data object pushed for providing to the user.

For example, the network asset display interface may include at least the portion of the scored network assets data set pushed via the at least one network assets serving database where such data was stored. The push from the network assets serving database to the client device may cause rendering of the network asset display interface comprising at least the network asset data object (s0 pushed from the network assets serving database. In some embodiments, the network assets serving database pushes the network asset data object(s) in response to one or more request(s) from the client device, such as the requests for user interfaces described herein.

FIG. 13 illustrates operations of an example process for causing rendering via a third-party application, as part of providing network asset data object(s) in accordance with at least some example embodiments of the present disclosure. Specifically, FIG. 13 depicts an example process 1300 for causing rendering via a third-party application. In some embodiments, the computer-implemented process 1300 is embodied by computer program code stored on a non-transitory computer-readable medium of a computer program product configured for execution to perform the computer-implemented method. Alternatively or additionally, in some embodiments, the example process 1300 may be performed by one or more specially configured computing devices, such as the asset provision system 102 embodied by the specially configured network asset processing apparatus 200. In this regard, in some such embodiments, the network asset processing apparatus 200 is specially configured by computer program instructions stored thereon, for example in the memory 204 and/or another component depicted and/or described herein, and/or otherwise accessible to the network asset processing apparatus 200, for performing the operations as depicted and described with respect to the example process 1300. In some embodiments, the specially configured network asset processing apparatus 200 includes and/or otherwise is in communication with one or more external apparatuses, systems, devices, and/or the like, to perform one or more of the operations as depicted and described. For example, the network asset processing apparatus 200 may include and/or communicate with one or more external computing devices, such as client device(s) associated with various user(s), each authenticated associated with a particular user profile corresponding to a particular unique profile identifier.

The process 1300 begins at operation 1302. In some embodiments, the process 1300 begins after one or more operations of another process, such as the operation 908 of the process 900 as depicted and described. Additionally or alternatively, in some embodiments, upon completion of the process 1300 flow proceeds to one or more operations of another process. In other embodiments, the flow ends upon completion of the process 1300.

At operation 1302, the network asset processing apparatus 200 includes network asset management circuitry 210, model management circuitry 212, network asset prioritization circuitry 214, data tag management circuitry 216, communications circuitry 208, input/output circuitry 206, processor 202, and/or the like, or a combination thereof, configured to push at least the portion of the scored network assets data set associated with the unique profile identifier via at least one network assets serving database. In this regard, the network asset processing apparatus 200 may perform similarly to that described herein with respect to operation 1202 in the process 1200. It should be appreciated that, in operation 1302, the at least one network assets serving database may be a different network assets serving database than that to which data is pushed in operation 1302. For example, in some embodiments, the network asset processing apparatus 200 pushes the data to at least one network assets serving database specific to the third-party application described with respect to operation 1304.

At operation 1304, the network asset processing apparatus 200 includes network asset management circuitry 210, model management circuitry 212, network asset prioritization circuitry 214, data tag management circuitry 216, communications circuitry 208, input/output circuitry 206, processor 202, and/or the like, or a combination thereof, configured to cause, via interaction with the at least one network assets serving database, rendering of a network asset display interface. The network asset display interface may be rendered via a third-party application executing on the client device, for example an email application or other application offered by an entity other than the entity that owns and/or operates the network asset processing apparatus 200 and renders user interface(s) including information sent from third-party entities and/or systems. For example, the at least the portion of the scored network assets data set may be rendered by generating and/or otherwise initiating one or more specially configured transmissions including at least the portion of the scored network assets data set from the network assets serving database. In some embodiments, the at least one network assets serving database pushes the scored network assets data set to the third-party application associated with the particular unique profile identifier at one or more predetermined timestamp intervals, for example daily.

In some embodiments, the network asset processing apparatus 200 stores and/or maintains a third-party application profile identifier corresponding to the unique profile identifier that is utilized to push the portion of the scored network assets data set and/or otherwise cause rendering of the user interface. For example, in an example context, the third-party application embodies an email application associated with the user. In this example context, the network asset processing apparatus 200 may store a third-party application profile identifier embodying an email address corresponding to the user. In this regard, at least the portion of the scored network assets data set pushed from the at least one network assets serving database may be utilized to transmit an email transmission including the user interface for rendering via the email application on the client device associated with the user. It should be appreciated that similar user interfaces may be rendered via other third-party application(s), such as third-party distributed marketing application(s) that distribute third-party user interfaces as advertisements within the user interface(s) any of a number of applications.

FIG. 14 illustrates operations of an example process for causing rendering via a plurality of applications, as part of providing network asset data object(s) in accordance with at least some example embodiments of the present disclosure. Specifically, FIG. 14 depicts an example process 1400 for causing rendering via a plurality of applications. In some embodiments, the computer-implemented process 1400 is embodied by computer program code stored on a non-transitory computer-readable medium of a computer program product configured for execution to perform the computer-implemented method. Alternatively or additionally, in some embodiments, the example process 1400 may be performed by one or more specially configured computing devices, such as the asset provision system 102 embodied by the specially configured network asset processing apparatus 200. In this regard, in some such embodiments, the network asset processing apparatus 200 is specially configured by computer program instructions stored thereon, for example in the memory 204 and/or another component depicted and/or described herein, and/or otherwise accessible to the network asset processing apparatus 200, for performing the operations as depicted and described with respect to the example process 1400. In some embodiments, the specially configured network asset processing apparatus 200 includes and/or otherwise is in communication with one or more external apparatuses, systems, devices, and/or the like, to perform one or more of the operations as depicted and described. For example, the network asset processing apparatus 200 may include and/or communicate with one or more external computing devices, such as client device(s) associated with various user(s), each authenticated associated with a particular user profile corresponding to a particular unique profile identifier.

The process 1400 begins at operation 1402. In some embodiments, the process 1400 begins after one or more operations of another process, such as the operation 908 of the process 900 as depicted and described. Additionally or alternatively, in some embodiments, upon completion of the process 1400 flow proceeds to one or more operations of another process. In other embodiments, the flow ends upon completion of the process 1400.

At operation 1402, the network asset processing apparatus 200 includes network asset management circuitry 210, model management circuitry 212, network asset prioritization circuitry 214, data tag management circuitry 216, communications circuitry 208, input/output circuitry 206, processor 202, and/or the like, or a combination thereof, configured to push at least the portion of the second network assets data set associated with the unique profile identifier to a first network assets serving database and a second network assets serving database. In this regard, each of the network assets serving database may be associated with a particular application, for example such that data is pushed from the network asset scoring database to the particular corresponding application for rendering. In an example context, the first network assets serving database corresponds to a first application embodying a user-facing network transaction application, and the second network assets serving database corresponds to a second application embodying a third-party application such as an email application. In this regard, each of the network assets serving databases may perform in the manner described with respect to operations 1202 and/or 1302, as described herein.

At operation 1404, the network asset processing apparatus 200 includes network asset management circuitry 210, model management circuitry 212, network asset prioritization circuitry 214, data tag management circuitry 216, communications circuitry 208, input/output circuitry 206, processor 202, and/or the like, or a combination thereof, configured to cause via interaction with the first network assets serving database, rendering of a network asset display interface comprising at least the portion of the network assets data set via a user-facing network asset transaction application on a client device. In this regard, the first network asset serving database may be accessed and/or otherwise provide the scored network assets data set to the client device for rendering via the user-facing network asset transaction application. The network asset processing apparatus 200 may perform in a manner similar to that described with respect to operation 1302.

At operation 1406, the network asset processing apparatus 200 includes network asset management circuitry 210, model management circuitry 212, network asset prioritization circuitry 214, data tag management circuitry 216, communications circuitry 208, input/output circuitry 206, processor 202, and/or the like, or a combination thereof, configured to cause, via interaction with the second network assets serving database, rendering of a user interface comprising at least the portion of the scored network assets data set via a third-party application on the client device. In this regard, the second network asset serving database may be accessed and/or otherwise provide the scored network assets data set to the third-party application for rendering. The network asset processing apparatus 200 may perform in a manner similar to that described with respect to operation 1402.

It should be appreciated that such embodiments may provide various representations of the scored network assets data set. In this regard, the scored network assets data set may be provided for viewing by the user corresponding to the unique profile identifier via any of a myriad of mechanisms. For example, the network asset display interface of the scored network assets data set may be rendered within the user-facing network asset transaction application in circumstances where the user accesses the user-facing network asset transaction application. Additionally or alternatively, the user interface provided via the third-party application may be accessed in a circumstance where the user is not accessing the third-party application.

Example Data Tagged Network Management of the Disclosure

Example computing environments associated with additional aspects of example embodiments of the present disclosure will now be described. It should be appreciated that each computing environment may be embodied in any of a myriad of manners. In some embodiments, a computing environment is embodied as a software environment executed via one or more computing device(s), such as the network asset processing apparatus 200. The computing environment embodied as a software environment may be maintained via a single computing device or across multiple computing devices working with one another to provide particular functionality, as described herein.

FIG. 15 illustrates a computing environment for managing data tagged network asset(s), in accordance with at least some example embodiments of the present disclosure. In this regard, the computing environment includes data objects structured in a manner that enables data tagged network object management. It should be appreciated that the data objects and/or relationships between such data object(s) as depicted and described may be maintained in one or more databases to enable creation and/or processing of the depicted computing environments.

The depicted computing environment includes a plurality of data tagged network asset(s) 1502A-1502H (collectively, "data tagged network assets 1502"). In this regard, each of the data tagged network assets 1502 is linked to one or more other network asset(s) maintained and/or otherwise made available via the network asset processing apparatus 200. Such network asset data objects may be linked via at least one network asset data tag, such as the network asset data tags 1504A, 1504B, and 1504C (collectively, "network asset data tags 1504"). In this regard, each of the network asset data tags 1504 may categorically link together any number of the data tagged network assets 1502.

Each of the network asset data tags 1504 may embody a different categorical link between network asset data object(s). In one example embodiment, each network asset data tag of the network asset data tags 1504 represents a different theme of network asset. In one example context, network asset data tag 1504A may represent a categorical link between network asset data object(s) related to a "Chocolate Lovers" theme. In this regard, each of the network asset data objects 1502A, 1502B, 1502C, and 1502D associated with the network asset data tag 1504A may correspond to a chocolate item available via the network asset processing apparatus 200. Continuing this example context, network asset data tag 1504B may represent a categorical link between network asset data object(s) related to a "Chili Snack Party" theme, with each of the data tagged network assets 1502E, 1502F, and 1502G associated with the network asset data tag 1504B corresponding to snack items containing chili pepper(s). Finally, continuing this example context, network asset data tag 1504C may represent a categorical link between network asset data object(s) related to a "Primal Diet" theme, with the data tagged network asset 1502H associated with the network asset data tag 1504C corresponding to an item fitting certain diet restrictions. In this regard, network assets 1502A-1502D embody a first data tagged network assets set associated with a shared network asset data tag (specifically, network asset data tag 1504A), data tagged network assets 1502E-1502G embody a second data tagged network assets set associated with a second shared network asset data tag (specifically, network asset data tag 1504B), data tagged network assets 1502H embodies a third data tagged network assets set associated with a third shared network asset data tag (specifically, network asset data tag 1504C).

It should be appreciated that a network asset data tag may represent any categorical link between network asset data object(s), and that any number of network asset data objects may be associated with a single network asset data tag. For example, a single network asset data tag may be associated with a single network asset data object, a few network asset data objects, many network asset data objects, and/or the like. Further, a data tagged network asset may be associated with any number of network asset data tags. For example, a particular network asset data object representing a chili snack that meets requirements associated with the "Primal Diet" theme may be associated with both the network asset data tag 1504B and the network asset data tag 1504C. In a circumstance where such a network asset data object further represents a chocolate snack, it may be further associated with the network asset data tag 1504A as well.

In some embodiments, the network asset processing apparatus 200 maintains network asset data tags particular to each registered user profile. In this regard, one or more of the network asset data tags for a particular user profile may represent categorical links between network asset data objects specifically for providing associated with the user profile. It should be appreciated that, in some such embodiments, different user profiles may be associated with one or more different network asset data tags linking different network asset data object(s). Additionally or alternatively, in some embodiments, the network asset processing apparatus 200 maintains one or more network asset data tag(s) that are associated with every registered user profile. In this regard, for example, the network asset processing apparatus 200 may maintain certain standardized categorical links between network asset data object(s) that are determined as relevant to multiple users, for example.

The network asset data tags 1504 may be generated in any of a myriad of manners. In some embodiments, network asset data tags are manually inputted by a user. For example, in some such embodiments, an administrator of the network asset processing apparatus 200 may manually generate one or more network asset data tag(s) to be stored by the network asset processing apparatus 200, and/or associate one or more network asset data object(s) to such one or more network asset data tag(s). Additionally or alternatively, in some embodiments, the network asset processing apparatus 200 automatically generates one or more of the network asset data tag(s) and/or one or more associations between network asset data object(s) and network asset data tag(s). For example, in some embodiments, the network asset processing apparatus 200 processes interaction data associated with a particular unique profile identifier to generate one or more network asset data tag(s) that each represent a grouping of network asset data object(s) associated with a particular characteristic determined to likely be of interest based on the interaction data. In some such embodiments, one or more network asset data object(s) may be generated based on one or more shared characteristics derived from asset information for each of a plurality of network asset data object(s) alone and/or together with interaction data associated with the unique profile identifier.

In one example context, the network asset processing apparatus 200 processes the interaction data to identify a network asset data set with which the user has interacted (e.g., to initiate transaction(s)), generates network asset data tag(s) based on asset information corresponding to each network asset data object that represents one or more characteristic(s) of the asset network data object, and associate any number of available network asset data object(s) with the generated network asset data tag(s) based on the characteristics corresponding to each of the network asset data tag(s). In some such embodiments, the network asset data tag(s) generated may be unique to each unique profile identifier, and provided to the user associated with the unique profile identifier to improve the likelihood that the user interacts with one of the network asset data object(s) associated with the network asset data tag. Alternatively or additionally, in some embodiments, the network asset processing apparatus 200 processes an enterprise network interaction data set associated with a plurality of unique profile identifiers to generate one or more network asset data tag(s) linking one or more network asset data object(s). In this regard, such network asset data tags may each correspond to characteristics for network asset data object(s) with which a majority of users are interested based on each user's interaction data.

FIG. 16 illustrates a computing environment for selecting data tagged network asset(s) and/or network asset scoring model(s), in accordance with at least some example embodiments of the present disclosure. Specifically, the computing environment depicts selection of a network asset scoring model 1610 and/or data tagged network asset set 1612 via a multi-armed bandit model 1608. In some embodiments, a multi-armed bandit model 1608 may select a network asset scoring model 1610 from a set of network asset scoring model(s) 1602 available to the network asset processing apparatus 200. In other embodiments, a multi-armed bandit model 1608 is configured to select a data tagged network asset set 1612 from a set of data tagged network asset sets 1606. In yet other embodiments, the multi-armed bandit model 1608 is configured to select both a data tagged network asset set 1612 from a set of data tagged network asset sets 1606 and a network asset scoring model 1610 from a set of network asset scoring models 1602, as depicted and described.

The multi-armed bandit model 1608 may be trained to select data for a particular unique profile identifier. In this regard, the multi-armed bandit model 1608 may be trained based on some or all of the enterprise network interaction data set 1604. In this regard, training of the multi-armed bandit model 1608 occurs during use, such that the multi-armed bandit model 1608 may be configured for the weights embodying the multi-armed bandit model 1608 to be updated during execution of the multi-armed bandit model 1608. For example, in some embodiments, the network interaction data set 1604 includes an interaction data set for each unique profile identifier corresponding to a registered user profile. The multi-armed bandit model 1608 may be configured to determine data trends, patterns, and/or inferences from the enterprise network interaction data set 1604 to determine the selected network asset scoring model 1610 and/or selected data tagged network asset set 1612 to maximize a particular determination goal (e.g., maximize the likelihood the user initiates a transaction associated with the top-ranked network asset data object produced by the selected network asset scoring model 1610, based on the selected data tagged network asset set 1612). In some embodiments, the multi-armed bandit model 1608 specific to a particular unique profile identifier is trained based on the interaction data set from the enterprise network interaction data set 1604 specifically corresponding to the unique profile identifier. In this regard, it should be appreciated that different multi-armed bandit models, such as the multi-armed bandit model 1608, may be configured for each unique profile identifier.

For example, based on user interaction data associated with the particular unique profile identifier, the multi-armed bandit model 1608 may be trained to select the selected network asset scoring model 1610 determined to best meet a determination goal. For example, in some embodiments, the multi-armed bandit model 1608 may be configured based on the user interaction data associated with a particular unique profile identifier to determine the selected network asset scoring model 1610 from the set of network asset scoring models 1602 as best for scoring network asset data objects such that the highest-ranked scored network asset data object is most likely to be transacted with by the user corresponding to the user profile identifier. Alternatively or additionally, in some embodiments, the multi-armed bandit model 1608 may be configured based on the user interaction data associated with the unique profile identifier to determine the selected data tagged network asset set 1612 from the set of data tagged network asset sets 1606 that includes network asset data object(s) most likely to be transacted with by the user corresponding to the user profile identifier. For example, in one example context, the selected data tagged network asset set 1612 may include network asset data object(s) each associated with a particular shared network asset data tag that is determined to likely be of interest to the user based on the user interaction data corresponding to the unique profile identifier.

In some embodiments, one or more multi-armed bandit model(s) are utilized to provide particular desired technical advantages. For example, in some embodiments, a single multi-armed bandit model outputs both a selected network asset scoring model and a selected shared network asset data tag (or selected data tagged network asset set). In this regard, use of the single multi-armed bandit model reduces the complexity for implementing and maintaining multiple multi-armed bandit model(s). Further, a single model may identify particular data patterns associated with particular combinations of selected network assets scoring model and selected shared network asset data tag (or selected data tagged network asset set corresponding therewith). Alternatively or additionally, in some embodiments, multiple multi-armed bandit model(s) are utilized to generate the selected network asset scoring model and the selected shared network asset data tag. In this regard, utilizing multiple multi-armed bandit models improves the accuracy of each individual model and enables updated model(s) for each individual selection to be replaced without retraining and/or negatively impacting other selection(s) and/or without retraining all model(s).

FIG. 17 illustrates an example user interface including data tagged network tagged data object(s) associated with a first example network asset data tag, in accordance with at least some example embodiments of the present disclosure. Specifically, FIG. 17 depicts an example user interface 1700 for data tagged network assets associated with a particular shared network asset data tag. In the particular context as depicted, the shared network asset data tag embodies a chocolate lovers theme of network assets. In this regard, the various network asset data object(s) as depicted may each be associated with particular asset detail information properties indicating that the network asset corresponds to a chocolate item, for example. It should be appreciated that, in other contexts, the network asset data object(s) to be included in the user interface 1700 may be based on another data property associated with the asset detail information for each network asset data object, and/or may include a set of data tagged network asset sets each including data tagged network assets associated with different network asset data tags.

In some embodiments, the data tagged network assets associated with the particular shared network asset data tag are scored and/or otherwise ranked amongst each other for providing via the corresponding user interface 1700. In some embodiments, for example, a trained scoring model to may generate a model score corresponding to each particular network asset corresponding to one of the network asset interface elements 1702A-1702E to determine which of the network asset data object(s) the corresponding user has a propensity to initiate a transaction with (e.g., to purchase). In this regard, a trained multi-armed bandit model, for example, may be selected and utilized for purposes of scoring and/or ranking the data tagged network assets for displaying to via the corresponding user interface 1700.

The example user interface 1700 includes a plurality of sub-interfaces, including a network asset display interface 1704. The network asset display interface 1704 includes interface element(s) associated with one or more network asset data object(s) provided. For example, in some embodiments, the network asset display interface 1704 includes network asset interface elements 1702A-1702F. In the displayed example context, each of these network asset interface elements correspond to a particular network asset data object available for transacting, for example via the network asset processing apparatus 200. Specifically, each of the network asset data objects corresponding to one of the network asset interface elements 1702A-1072F may be associated with a particular shared network asset data tagged selected for which network asset data assets are to be provided associated with the unique profile identifier.

Each of the network asset interface elements 1702A-1702F may include sub-interface elements as similarly described with respect to the network asset interface elements 802A-802F as depicted and described with respect to FIG. 8. Additionally or alternatively, each of the network asset interface elements 802A-802F may similarly be configured to be engageable by the user to view a page associated with the corresponding network asset data object, for example to view additional information associated with the network asset data object. In some embodiments, the user may click, tap, or otherwise provide user input on or associated with one of the network asset interface elements 1702A-1702F to view the specific product information page associated with the corresponding network asset data object, for example.

In some embodiments, the data tagged network assets of the data tagged network asset set depicted may be providing via any of a myriad of user interfaces and/or display formats. For example, in some embodiments, data tagged network assets corresponding to a particular shared network asset data tag may be provided via a carousel display interface as described herein. Alternatively or additionally, in some embodiments, the data tagged network assets associated with a particular shared network asset data tag may be provided via one or more user interfaces rendered and/or otherwise provided via one or more third-party application(s).

FIG. 18 illustrates another example user interface including data tagged network tagged data object(s) associated with a second example network asset data tag, in accordance with at least some example embodiments of the present disclosure. Specifically, FIG. 188 depicts an example user interface 1800 including a network asset display interface 1804 for providing a second data tagged network assets set including data tagged network assets 1802A-1802F. corresponding to a second shared network asset data tag. It should be appreciated that, as depicted, the second shared network asset data tag may correspond to a second theme of network assets, for example a "Vegan Diet" theme of network assets. Such data tagged network assets may be associated with a shared portion of asset detail information, for example at least one shared data value for one or more data properties indicating the network asset data object corresponds to a vegan item. The user interface 1800 may otherwise function in a manner similar to that as depicted and described with respect to user interface 1700 of FIG. 17.

Additionally or alternatively, as depicted, the user interface 1800 may include one or more interface elements visually indicating the shared network asset data tag corresponding to each data tagged network asset data object. For example, the user interface 1800 includes text interface element 1806 that includes a textual representation of the shared network asset data tag (e.g., "Vegan Diet"). In other embodiments, the text shared network asset data tag may be represented via an image element, multiple text element(s), and/or the like that may be utilized by a user to identify the shared network asset data tag associated with the data tagged network assets being displayed. In this regard, a specially trained multi-armed bandit model, for example, may be configured to select the particular shared network asset data tag for which network asset data objects is to be displayed. The selected network asset data tag is determined to maximize a particular determination goal based on interaction data for the corresponding unique profile identifier (e.g., maximize the chance the user corresponding to the particular unique profile identifier initiates a transaction associated with such network asset data objects). In one example context, the trained multi-armed bandit model may select a theme from a set of item themes, where the selected theme is determined to be associated with products that the user is most likely to initiate a transaction with (e.g., to purchase and/or otherwise order).

Example Data Tagged Network Asset Providing Processes of the Disclosure

FIG. 19 illustrates operations of an example process for providing data tagged network asset(s), in accordance with at least some example embodiments of the present disclosure. Specifically FIG. 19 depicts an example process 1900 for providing data tagged network asset(s). In some embodiments, the computer-implemented process 1900 is embodied by computer program code stored on a non-transitory computer-readable medium of a computer program product configured for execution to perform the computer-implemented method. Alternatively or additionally, in some embodiments, the example process 1900 may be performed by one or more specially configured computing devices, such as the asset provision system 102 embodied by the specially configured network asset processing apparatus 200. In this regard, in some such embodiments, the network asset processing apparatus 200 is specially configured by computer program instructions stored thereon, for example in the memory 204 and/or another component depicted and/or described herein, and/or otherwise accessible to the network asset processing apparatus 200, for performing the operations as depicted and described with respect to the example process 1900. In some embodiments, the specially configured network asset processing apparatus 200 includes and/or otherwise is in communication with one or more external apparatuses, systems, devices, and/or the like, to perform one or more of the operations as depicted and described. For example, the network asset processing apparatus 200 may include and/or communicate with one or more external computing devices, such as client device(s) associated with various user(s), each authenticated associated with a particular user profile corresponding to a particular unique profile identifier.

The process 1900 begins at operation 1902. At operation 1902, the network asset processing apparatus 200 includes network asset management circuitry 210, model management circuitry 212, network asset prioritization circuitry 214, data tag management circuitry 216, communications circuitry 208, input/output circuitry 206, processor 202, and/or the like, or a combination thereof, configured to access enterprise network interaction data comprising an interaction data set associated with a unique profile identifier. At least a portion of the enterprise network interaction data may be accessed from an enterprise network interaction database. Additionally or alternatively, a second portion of the enterprise network interaction data may be accessed from a second enterprise network interaction database, such as a database configured for storing real-time interaction data for a particular timestamp interval (e.g., daily interaction data). In some embodiments, the enterprise network interaction data may be accessed in the manner described herein with respect to operation 902, for example.

At operation 1904, the network asset processing apparatus 200 includes network asset management circuitry 210, model management circuitry 212, network asset prioritization circuitry 214, data tag management circuitry 216, communications circuitry 208, input/output circuitry 206, processor 202, and/or the like, or a combination thereof, configured to access a set of data tagged network asset sets. The set of data tagged network asset sets may include any number of individual data tagged network asset sets. Each data tagged network asset set may be associated with a shared network asset tag data object of a shared network asset tag data object set. In this regard, the network asset processing apparatus 200 may maintain each of the shared network asset tag data objects of the shared network asset tag data object set (e.g., in one or more repositories maintained or otherwise accessible to the network asset processing apparatus 200), and retrieve some or all network asset tag data object(s) embodying the shared network asset tag data object set.

At operation 1906, the network asset processing apparatus 200 includes network asset management circuitry 210, model management circuitry 212, network asset prioritization circuitry 214, data tag management circuitry 216, communications circuitry 208, input/output circuitry 206, processor 202, and/or the like, or a combination thereof, configured to train at least one multi-armed bandit model. The multi-armed bandit model may be trained to, based on the enterprise network interaction data and the set of data tagged network asset sets, provide a selected network asset scoring model from a network asset scoring model set and/or a selected data tagged network asset set from the set of data tagged network asset sets. In this regard, the network asset processing apparatus 200 may train the multi-armed bandit to provide a selected network asset scoring model and/or selected data tagged network asset set that maximize a particular determination goal. For example, based on the enterprise network interaction data at least, the network asset processing apparatus 200 may train the multi-armed bandit model to select a network asset scoring model and a selected data tagged network asset set that maximizes the predicted probability that the user corresponding to the unique profile identifier transacts with the higher-ranked network asset data objects of the selected data tagged network asset set when ranked utilizing the selected network asset scoring model.

In some embodiments, one or more of the selected network asset scoring model and/or the selected data tagged network asset set is preselected and/or otherwise static. For example, in some embodiments, the selected network asset scoring model is a particular determined network asset scoring model to be utilized for providing network asset data object(s) as recommendations to all user profiles. Alternatively or additionally, in some embodiments, selected data tagged network asset set is determined for some or all user profiles. In some embodiments, during a particular timestamp interval a particular shared network asset data tag may be utilized to identify corresponding data tagged network asset(s) for providing associated with each user profile. For example, during a holiday time period, the selected data tagged network asset set may embody holiday items tagged with a particular shared network asset data tag. In this regard, in such embodiments, the multi-armed bandit may perform one or more selection(s) in circumstances where a default and/or otherwise preselected determination is not active.

At operation 1908, the network asset processing apparatus 200 includes network asset management circuitry 210, model management circuitry 212, network asset prioritization circuitry 214, data tag management circuitry 216, communications circuitry 208, input/output circuitry 206, processor 202, and/or the like, or a combination thereof, configured to provide at least a portion of the data tagged network asset set associated with the unique profile identifier based on the selected network asset scoring model and the selected data tagged network asset set. For example, in some embodiments, the network asset processing apparatus 200 provides only a certain number of the top-ranked data tagged network assets of the data tagged network asset set based on the assert scores for such network asset data object(s) as generated by the network asset scoring model. Alternatively or additionally, the network asset processing apparatus 200 may provide the data tagged network asset data object(s) in portions upon request by the client device, for example starting with a first portion (e.g., the top 10 network asset data objects), then a second portion (e.g., the next 10 network asset data objects), and the like. In some embodiments, the network asset processing apparatus 200 provides the data tagged network asset set in a particular arrangement generated by the selected network asset scoring model, and/or based on the network asset scores generated by the selected network asset scoring model.

FIG. 20 illustrates operations of an example process for generating a data tagged network asset set based on historical network asset transaction data, as part of providing network asset data object(s) in accordance with at least some example embodiments of the present disclosure. Specifically, FIG. 20 depicts an example process 2000 generating a data tagged network asset set based on historical network asset transaction data. In some embodiments, the computer-implemented process 2000 is embodied by computer program code stored on a non-transitory computer-readable medium of a computer program product configured for execution to perform the computer-implemented method. Alternatively or additionally, in some embodiments, the example process 2000 may be performed by one or more specially configured computing devices, such as the asset provision system 102 embodied by the specially configured network asset processing apparatus 200. In this regard, in some such embodiments, the network asset processing apparatus 200 is specially configured by computer program instructions stored thereon, for example in the memory 204 and/or another component depicted and/or described herein, and/or otherwise accessible to the network asset processing apparatus 200, for performing the operations as depicted and described with respect to the example process 2000. In some embodiments, the specially configured network asset processing apparatus 200 includes and/or otherwise is in communication with one or more external apparatuses, systems, devices, and/or the like, to perform one or more of the operations as depicted and described. For example, the network asset processing apparatus 200 may include and/or communicate with one or more external computing devices, such as client device(s) associated with various user(s), each authenticated associated with a particular user profile corresponding to a particular unique profile identifier.

The process 2000 begins at operation 2002. In some embodiments, the process 2000 begins after one or more operations of another process, such as the operation 1902 of the process 1900 as depicted and described. Additionally or alternatively, in some embodiments, upon completion of the process 2000 flow proceeds to one or more operations of another process, such as the operation 1904 of the process 1900 as depicted and described. In other embodiments, the flow ends upon completion of the process 2000.

At operation 2002, the network asset processing apparatus 200 includes network asset management circuitry 210, model management circuitry 212, network asset prioritization circuitry 214, data tag management circuitry 216, communications circuitry 208, input/output circuitry 206, processor 202, and/or the like, or a combination thereof, configured to identify an available network asset set. In some embodiments, the network asset processing apparatus 200 maintains an asset storage repository that indicates the availability of all available network asset data object(s). Alternatively or additionally, in some embodiments, the network asset processing apparatus 200 communicates with a third-party asset storage system that provides indications of the available network asset data objects. It should be appreciated that network asset data object(s) may be unavailable for any of a myriad of reasons, for example in a circumstance where such network asset data object(s) are out of stock. In some such embodiments, the available network asset set is utilized to ensure that network asset data objects provided associated with a particular shared network asset tag data object are presently available for transacting by a user.

At operation 2004, the network asset processing apparatus 200 includes network asset management circuitry 210, model management circuitry 212, network asset prioritization circuitry 214, data tag management circuitry 216, communications circuitry 208, input/output circuitry 206, processor 202, and/or the like, or a combination thereof, configured to generate a selected shared network asset tag data object based on historical network asset transaction data associated with the unique profile identifier. In at least one example context, the historical network asset transaction data embodies historical purchase transactions associated with one or more network asset data objects performed via a particular user profile corresponding to the particular unique profile identifier. In this regard, the network asset processing apparatus 200 may extract particular data properties from asset detail information associated with network asset data objects with which the particular user profile has transacted based on the historical network asset transaction data, and create the selected shared network asset tag data object corresponding to such particular data properties. For example, in a circumstance where a user initiated a transaction with a chili snack, the network asset processing apparatus 200 may generate a selected shared network asset tag data object embodying a "Chili Snack" that corresponds to asset detail information including chili peppers as an ingredient in the product represented by the network asset data object.

At operation 2006, the network asset processing apparatus 200 includes network asset management circuitry 210, model management circuitry 212, network asset prioritization circuitry 214, data tag management circuitry 216, communications circuitry 208, input/output circuitry 206, processor 202, and/or the like, or a combination thereof, configured to associate one or more network assets from the available network asset set with the selected shared network asset tag data object. In some embodiments, each network asset data object is associated based on asset detail information for the network asset data object. For example, in an example context where the selected shared network asset tag data object represents a particular theme corresponding to one or more values for particular data properties of the asset detail information, network asset(s) associated with asset detail information including such values may be associated with the selected shared network asset tag data object. In one particular example context, the selected shared network asset data tag generated may represent a "Chocolate Lovers" theme based on network asset data objects associated with asset detail information indicating chocolate as an ingredient (e.g., asset detail information including a data property representing an ingredient list) having been ordered by the user. In this context, other network asset data objects representing items similarly including chocolate as an ingredient (as identified based on asset detail information for each such network asset data object) may similarly be identified from the available network asset data objects and associated with the shared selected network asset data tag. In some embodiments, the network asset processing apparatus 200 may associate the one or more network assets network assets based on the historical network asset transaction data and/or historical network asset transaction data associated with other unique profile identifiers. For example, network asset data object(s) for which the user or multiple users initiate transactions with together, or in succession, may be identified based on such historical network asset transaction data.

In some embodiments, network asset data objects are associated with a particular shared network asset tag data object based on embedding of one or more data properties for such network asset data object(s) and/or the corresponding user profile. For example, network asset data object(s) may be mapped to a particular embedding space such that network asset data objects having similar values for particular data properties are located closer to one another in the embedding space. Additionally or alternatively, location(s) and/or area(s) of interest for a user profile may be identified within the embedding space, and subsequently utilized to identify nearby network asset data object(s) that may be of interest to the user profile based on one or more particular data properties. In this regard, a shared network asset data tag may be generated that represents the data value for such data properties and links all such network asset data object(s) to generate a corresponding selected data tagged network asset set.

FIG. 21 illustrates operations of an example process for generating a data tagged network asset set based on asset detail information, as part of providing network asset data object(s) in accordance with at least some example embodiments of the present disclosure. Specifically, FIG. 21 depicts an example process 2100 for generating a data tagged network asset set based on asset detail information. In some embodiments, the computer-implemented process 2100 is embodied by computer program code stored on a non-transitory computer-readable medium of a computer program product configured for execution to perform the computer-implemented method. Alternatively or additionally, in some embodiments, the example process 2100 may be performed by one or more specially configured computing devices, such as the asset provision system 102 embodied by the specially configured network asset processing apparatus 200. In this regard, in some such embodiments, the network asset processing apparatus 200 is specially configured by computer program instructions stored thereon, for example in the memory 204 and/or another component depicted and/or described herein, and/or otherwise accessible to the network asset processing apparatus 200, for performing the operations as depicted and described with respect to the example process 2100. In some embodiments, the specially configured network asset processing apparatus 200 includes and/or otherwise is in communication with one or more external apparatuses, systems, devices, and/or the like, to perform one or more of the operations as depicted and described. For example, the network asset processing apparatus 200 may include and/or communicate with one or more external computing devices, such as client device(s) associated with various user(s), each authenticated associated with a particular user profile corresponding to a particular unique profile identifier.

The process 2100 begins at operation 2102. In some embodiments, the process 2100 begins after one or more operations of another process, such as the operation 1902 of the process 1900 as depicted and described. Additionally or alternatively, in some embodiments, upon completion of the process 2100 flow proceeds to one or more operations of another process, such as the operation 1904 of the process 1900 as depicted and described. In other embodiments, the flow ends upon completion of the process 2100.

At operation 2102, the network asset processing apparatus 200 includes network asset management circuitry 210, model management circuitry 212, network asset prioritization circuitry 214, data tag management circuitry 216, communications circuitry 208, input/output circuitry 206, processor 202, and/or the like, or a combination thereof, configured to identify an available network asset set. The available network asset set may be identified in a manner similar to that described herein with respect to operation 2002.

At operation 2104, the network asset processing apparatus 200 includes network asset management circuitry 210, model management circuitry 212, network asset prioritization circuitry 214, data tag management circuitry 216, communications circuitry 208, input/output circuitry 206, processor 202, and/or the like, or a combination thereof, configured to generate a selected shared network asset tag data object based on asset detail information associated with one or more network assets of the available network asset set. For example, data property values shared between the most available network asset data objects may be utilized to generate a corresponding selected shared network asset data tag. Alternatively or additionally, for example, the network asset processing apparatus 200 may identify particular data values corresponding to one or more data properties shared between one or more of such available network asset data objects representing a particular selected shared network asset tag data object. In some such embodiments, a selected shared network asset tag data object is selected from a plurality of predetermined shared network asset tag data objects maintained by the network asset processing apparatus 200 based on the asset detail information for such available network asset data objects.

In some embodiments, one or more network asset tag data object(s) are generated utilizing one or more embedding algorithms. For example, in some embodiments, one or more word embedding algorithm(s) are utilized to embed data values for network asset data object(s) in a particular embedding space, such that the resulting embedding space associates network asset data objects that have similar characteristics with nearby locations within the embedding space. In this regard, one or more network asset tag data object(s) may be created by clustering and/or otherwise grouping network asset data objects within a particular threshold distance in the embedding space. The resulting network asset tag data object may be labeled, named, and/or otherwise identified based on a meaning derived and/or otherwise known for such location(s) in the embedding space. For example, the network asset processing apparatus 200 may embed a plurality of network asset data objects (e.g., utilizing word embedding based on data values for any number of data properties associated with the network asset data object), cluster and/or otherwise group network asset data objects, and identify a subset of network asset data object(s) proximate to a location in the embedding space representing chocolate products. The network asset processing apparatus 200 may subsequently generate a network asset tag data object labeled and/or otherwise indicated as representing a "chocolate" theme. It should be appreciated that, based on the embedding space and/or by generating multiple embedding spaces, any number of network asset tag data object(s) may be generated, each of which representing one or more associated characteristics between network asset data object(s) linked to said network asset tag data object.

At operation 2106, the network asset processing apparatus 200 includes network asset management circuitry 210, model management circuitry 212, network asset prioritization circuitry 214, data tag management circuitry 216, communications circuitry 208, input/output circuitry 206, processor 202, and/or the like, or a combination thereof, configured to associate the one or more network assets from the available network asset set with the selected shared network asset tag data object. For example, in some embodiments, each network asset data object identified as associated with a particular data value for a data property utilized in generating the selected shared network asset tag data object may be associated with the selected shared network asset tag data object. In some embodiments, the network asset processing apparatus 200 stores data representing associations between a network asset data object and a corresponding network asset tag data object. In this regard, the network asset data objects associated with the selected shared network asset tag data object may be identified by querying for network asset data objects having an association with the selected shared network asset tag data object.

In some embodiments, a shared network asset data tag is generated and one or more network asset data object(s) are assigned to the shared network asset data tag based on an embedding of the network asset data object(s). For example, network asset data object(s) may be embedded within a particular embedding space based on data properties associated with the network asset data object and/or metadata associated with the network asset data object(s). In one such example context, the network asset data object(s) are embedded based on category data, brand name data, product data tags, description data, ingredient data, and/or the like for each network asset data object. In this regard, similar network asset data object(s) may be located proximate to one another in the embedding space resulting therefrom. It should be appreciated that such data may include embedded text data, numeric data, categorical data, and/or the like. Network asset data object(s) may be clustered and/or otherwise linked, for example utilizing one or more clustering algorithm(s), and associated with a shared network asset data tag that represents the similarities of data properties between such clustered network asset data objects. In some embodiments, particular individual data properties or groupings of network asset data object(s) may correspond to particular shared network asset data tag(s) of a determined set of possible network asset data tags. Continuing the chocolate theme example described above, the network asset data object(s) utilized to generate the theme may each be associated with the shared network asset tag data object. Alternatively or additionally, in some embodiments, the network asset data object(s) associated with a newly generated shared network asset tag data object may be additional to those utilized to generate the shared network asset tag data object and/or alternative to those utilized to generate the shared network asset tag data object. For example, new network asset data object(s) that are associated with one or more particular characteristics (e.g., based on the data value for one or more data properties of the network asset data object) may subsequently be associated with the shared network asset tag data object.

FIG. 22 illustrates operations of an example process for providing one or more scored network data asset(s), as part of providing network asset data object(s) in accordance with at least some example embodiments of the present disclosure. Specifically, FIG. 22 depicts an example process 2200 for providing one or more scored network data asset(s). In some embodiments, the computer-implemented process 2200 is embodied by computer program code stored on a non-transitory computer-readable medium of a computer program product configured for execution to perform the computer-implemented method. Alternatively or additionally, in some embodiments, the example process 2200 may be performed by one or more specially configured computing devices, such as the asset provision system 102 embodied by the specially configured network asset processing apparatus 200. In this regard, in some such embodiments, the network asset processing apparatus 200 is specially configured by computer program instructions stored thereon, for example in the memory 204 and/or another component depicted and/or described herein, and/or otherwise accessible to the network asset processing apparatus 200, for performing the operations as depicted and described with respect to the example process 2200. In some embodiments, the specially configured network asset processing apparatus 200 includes and/or otherwise is in communication with one or more external apparatuses, systems, devices, and/or the like, to perform one or more of the operations as depicted and described. For example, the network asset processing apparatus 200 may include and/or communicate with one or more external computing devices, such as client device(s) associated with various user(s), each authenticated associated with a particular user profile corresponding to a particular unique profile identifier.

The process 2200 begins at operation 2202. In some embodiments, the process 2200 begins after one or more operations of another process, such as the operation 1906 of the process 1900 as depicted and described. Additionally or alternatively, in some embodiments, upon completion of the process 2200 flow proceeds to one or more operations of another process. In other embodiments, the flow ends upon completion of the process 2200.

At operation 2202, the network asset processing apparatus 200 includes network asset management circuitry 210, model management circuitry 212, network asset prioritization circuitry 214, data tag management circuitry 216, communications circuitry 208, input/output circuitry 206, processor 202, and/or the like, or a combination thereof, configured to generate, utilizing the selected network asset scoring model, a scored network asset data set from the selected data tagged network asset set. In this regard, the selected network asset scoring model may be specially trained to generate an asset score for each particular network asset data object of the selected data tagged network asset set. The asset score may represent the fit of the network asset data object for a particular determination goal, for example the propensity for a particular user corresponding to a unique profile identifier to initiate a transaction associated with the higher-score network asset data objects. The selected network asset scoring model may be trained to generate a network score for a particular network asset data object based on asset detail information for that network asset data object. In some embodiments, the scored network asset data set includes each network asset data object together with an asset score for the network asset data object generated via the selected network asset scoring model. Alternatively or additionally, in some embodiments, the scored network asset data set includes network asset data objects arranged based on the selected network asset scoring model, for example in descending order of the asset scores generated via the selected network asset scoring model.

At operation 2204, the network asset processing apparatus 200 includes network asset management circuitry 210, model management circuitry 212, network asset prioritization circuitry 214, data tag management circuitry 216, communications circuitry 208, input/output circuitry 206, processor 202, and/or the like, or a combination thereof, configured to provide at least a portion of the scored network data asset set. In some embodiments, the scored network data asset set is provided via one or more specially configured user interfaces. For example, in some embodiments, the scored network asset data set is provided via a network asset display interface rendered to a user-facing asset transaction application, or a user interface rendered to a third-party application.

In some embodiments, the portion of the scored network data asset set embodies the entirety of the scored network data asset set. Alternatively or additionally, in some embodiments, the portion of the scored network data asset set embodies a subset of the scored network data asset set. For example, in some embodiments, a threshold number of the top-ranked network asset data objects from the scored network asset data set is provided. In one such context, for example, the top 10 ranked scored network asset data objects is provided. Additionally or alternatively, in some embodiments, one or more second portions of the scored network asset data set may be provided. For example, in some embodiments, the network asset processing apparatus 200 is configured to receive data indicating a user inputted request for a second portion the scored network asset data set (e.g., a certain number of the next top-ranked scored network asset data objects from the set).

FIG. 23 illustrates operations of an example process for storing enterprise network interaction data, as part of providing network asset data object(s) in accordance with at least some example embodiments of the present disclosure.

Specifically, FIG. 23 depicts an example process 2300 for storing enterprise network interaction data. In some embodiments, the computer-implemented process 2300 is embodied by computer program code stored on a non-transitory computer-readable medium of a computer program product configured for execution to perform the computer-implemented method. Alternatively or additionally, in some embodiments, the example process 2300 may be performed by one or more specially configured computing devices, such as the asset provision system 102 embodied by the specially configured network asset processing apparatus 200. In this regard, in some such embodiments, the network asset processing apparatus 200 is specially configured by computer program instructions stored thereon, for example in the memory 204 and/or another component depicted and/or described herein, and/or otherwise accessible to the network asset processing apparatus 200, for performing the operations as depicted and described with respect to the example process 2300. In some embodiments, the specially configured network asset processing apparatus 200 includes and/or otherwise is in communication with one or more external apparatuses, systems, devices, and/or the like, to perform one or more of the operations as depicted and described. For example, the network asset processing apparatus 200 may include and/or communicate with one or more external computing devices, such as client device(s) associated with various user(s), each authenticated associated with a particular user profile corresponding to a particular unique profile identifier.

The process 2300 begins at operation 2302. In some embodiments, the process 2300 begins after one or more operations of another process. Additionally or alternatively, in some embodiments, upon completion of the process 2300 flow proceeds to one or more operations of another process. In other embodiments, the flow ends upon completion of the process 2300.

At operation 2302, the network asset processing apparatus 200 includes network asset management circuitry 210, model management circuitry 212, network asset prioritization circuitry 214, data tag management circuitry 216, communications circuitry 208, input/output circuitry 206, processor 202, and/or the like, or a combination thereof, configured to receive enterprise network interaction data associated with the unique profile identifier. In some embodiments, the network asset processing apparatus 200 receives the enterprise network interaction data in response to user interaction with at least one network asset display interface. For example, a client device associated with a particular unique profile identifier may render a network asset display interface comprising interface elements for any number of network asset data objects provided associated with the corresponding unique profile identifier. The user may interact with any number of such interface elements, and the network asset processing apparatus 200 may receive enterprise network interaction data in response to such user interactions.

At operation 2304, the network asset processing apparatus 200 includes network asset management circuitry 210, model management circuitry 212, network asset prioritization circuitry 214, data tag management circuitry 216, communications circuitry 208, input/output circuitry 206, processor 202, and/or the like, or a combination thereof, configured to store the enterprise network interaction data in an enterprise network interaction database. For example, the network asset processing apparatus 200 may maintain the enterprise network interaction data comprising a network interaction data set embodying user interactions performed by the user associated with the unique profile identifier. The network interaction data for a particular unique profile identifier, for example, may represent user clicks, taps, loaded pages, transmitted requests, selected network asset data objects, transactions associated with network asset data object(s), and/or the like. In some embodiments, the enterprise network interaction data is received only for user interactions associated with a prioritized network asset data set, for example the top-ranked network asset data objects provided via one or more network asset display interfaces. In some embodiments, the network asset processing apparatus 200 accesses the enterprise network interaction database based on the unique profile identifier to accesses the enterprise network interface data for further processing.

FIG. 24 illustrates operations of an example process for updating at least one model based on enterprise network interaction data, as part of providing network asset data object(s) in accordance with at least some example embodiments of the present disclosure. Specifically, FIG. 24 depicts an example process 2400 for updating at least one model based on enterprise network interaction data. In some embodiments, the computer-implemented process 2400 is embodied by computer program code stored on a non-transitory computer-readable medium of a computer program product configured for execution to perform the computer-implemented method. Alternatively or additionally, in some embodiments, the example process 2400 may be performed by one or more specially configured computing devices, such as the asset provision system 102 embodied by the specially configured network asset processing apparatus 200. In this regard, in some such embodiments, the network asset processing apparatus 200 is specially configured by computer program instructions stored thereon, for example in the memory 204 and/or another component depicted and/or described herein, and/or otherwise accessible to the network asset processing apparatus 200, for performing the operations as depicted and described with respect to the example process 2400. In some embodiments, the specially configured network asset processing apparatus 200 includes and/or otherwise is in communication with one or more external apparatuses, systems, devices, and/or the like, to perform one or more of the operations as depicted and described. For example, the network asset processing apparatus 200 may include and/or communicate with one or more external computing devices, such as client device(s) associated with various user(s), each authenticated associated with a particular user profile corresponding to a particular unique profile identifier.

The process 2400 begins at operation 2402. In some embodiments, the process 2400 begins after one or more operations of another process, such as the operation 1908 as depicted and described with respect to the process 1900. Additionally or alternatively, in some embodiments, upon completion of the process 2400 flow proceeds to one or more operations of another process. In other embodiments, the flow ends upon completion of the process 2400.

At operation 2402, the network asset processing apparatus 200 includes network asset management circuitry 210, model management circuitry 212, network asset prioritization circuitry 214, data tag management circuitry 216, communications circuitry 208, input/output circuitry 206, processor 202, and/or the like, or a combination thereof, configured to update the at least one multi-armed bandit associated with the unique profile identifier based at least on the enterprise network interaction data associated with the unique profile identifier. In this regard, the enterprise network interaction data may include user interactions associated with one or more network asset data object(s). Such user interactions may include user-initiated clicks, page loads, transaction(s), and/or the like. The multi-armed bandit may be updated based on the enterprise network interaction data to configure the multi-armed bandit model to adjust one or more weights based on the user interactions represented therein. For example, in circumstances where the enterprise network interaction data includes interactions associated with certain data tagged network assets associated with a particular network asset data tag, the multi-armed bandit model may be updated to increase the likelihood that the multi-armed bandit model selects the network asset data tag.

FIG. 25 illustrates operations of an example process for providing at least a portion of the data tagged network asset set by causing rendering of a network asset display interface, as part of providing network asset data object(s) in accordance with at least some example embodiments of the present disclosure. Specifically, FIG. 25 depicts an example process 2500 for providing at least a portion of the data tagged network asset set. In some embodiments, the computer-implemented process 2500 is embodied by computer program code stored on a non-transitory computer-readable medium of a computer program product configured for execution to perform the computer-implemented method. Alternatively or additionally, in some embodiments, the example process 2500 may be performed by one or more specially configured computing devices, such as the asset provision system 102 embodied by the specially configured network asset processing apparatus 200. In this regard, in some such embodiments, the network asset processing apparatus 200 is specially configured by computer program instructions stored thereon, for example in the memory 204 and/or another component depicted and/or described herein, and/or otherwise accessible to the network asset processing apparatus 200, for performing the operations as depicted and described with respect to the example process 2500. In some embodiments, the specially configured network asset processing apparatus 200 includes and/or otherwise is in communication with one or more external apparatuses, systems, devices, and/or the like, to perform one or more of the operations as depicted and described. For example, the network asset processing apparatus 200 may include and/or communicate with one or more external computing devices, such as client device(s) associated with various user(s), each authenticated associated with a particular user profile corresponding to a particular unique profile identifier.

The process 2500 begins at operation 2502. In some embodiments, the process 2500 begins after one or more operations of another process, such as the operation 1906 as depicted and described with respect to the process 1900. Additionally or alternatively, in some embodiments, upon completion of the process 2500 flow proceeds to one or more operations of another process. In other embodiments, the flow ends upon completion of the process 2500.

At operation 2502, the network asset processing apparatus 200 includes network asset management circuitry 210, model management circuitry 212, network asset prioritization circuitry 214, data tag management circuitry 216, communications circuitry 208, input/output circuitry 206, processor 202, and/or the like, or a combination thereof, configured to cause rendering of a network asset display interface comprising at least the portion of the data tagged network asset set associated with the unique profile identifier. In some embodiments, the network asset display interface is rendered via a user-facing asset transaction application executed on a client device. Alternatively or additionally, in some embodiments, the network asset display interface is rendered via a third-party application.

In some embodiments, the rendered network asset display interface comprises a prioritized network asset data object set. The prioritized network asset data object set may, for example, include all network asset data objects of a scored network asset data set that satisfy an asset prioritization threshold maintained by the network asset processing apparatus 200. In one example context, for example, the asset prioritization threshold defines a cutoff for top-ranked scored network asset data objects, such that scored network asset data objects above the cutoff (e.g., associated with asset scores that satisfy the asset prioritization threshold and/or that are ranked above the asset prioritization threshold in an arrangement of the scored network asset data objects) are rendered for display to the user. Alternatively or additionally, in some embodiments, representations associated with prioritized network asset data objects are rendered together with representations associated with other network asset data objects via the same network asset display interface.

The network asset display interface may be configured such that network interaction data embodying user interactions associated with a prioritized network asset data set is collected via the network asset processing apparatus 200. For example, the network asset display interface in some embodiments is configured such that, in a circumstance where a user interacts with a representation corresponding to a prioritized network asset data object, data representing the user interaction is transmitted to the network asset processing apparatus 200 from the client device. Alternatively or additionally, in some embodiments, the network asset display interface is configured such that, in a circumstance where a user interacts with a representation corresponding to a prioritized network asset data object, data representing the user interaction is stored by the client device for transmitting to the network asset processing apparatus 200 at a later time (e.g., daily, hourly, weekly, and/or the like). In this regard, the network asset processing apparatus 200 may retrieve and/or otherwise process the data associated with the prioritized network asset data objects to update, train, and/or otherwise improve one or more model(s), such as an asset scoring model and/or multi-armed bandit model as described herein. In some such embodiments, by limiting the collected network interaction data to interactions associated with prioritized network asset data object(s), such data may be utilized to train the model(s) in a manner that prioritizes network asset data objects previously thought to be best for a particular determination goal. In this regard, the impact of the interactions on updating the weights of the model(s) to focus on particular prioritized data values for a particular user is improved while additionally or alternatively minimizing the amount of data that needs to be collected. For example, user interaction data associated with each and every network asset data object provided via a network asset display interface need not be collected in some embodiments, and user interaction data associated with the prioritized network asset data object(s) may be utilized instead to minimize wasted computing resources (e.g., processor, network, and memory resources for such data collection, storage, and transmission to the network asset processing apparatus 200 for example).

CONCLUSION

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communications network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communications network. Examples of communications networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communications network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An apparatus comprising a processor and a memory, the memory comprising instructions that cause the apparatus to:
   access enterprise network interaction data comprising an interaction data set, wherein the interaction data set indicates at least one interaction with at least one prioritized network asset of at least one prioritized network asset data set rendered via a display comprising an arrangement of (i) the at least one prioritized network asset in the at least one prioritized network asset data set and (ii) at least one other network asset not in the at least one prioritized network asset data set, wherein each prioritized network asset of the at least one prioritized network asset data set satisfies an asset prioritization threshold that defines a cutoff for top-ranked network asset data objects in the arrangement, and
   wherein the at least one interaction is initiated by at least one user corresponding to at least one user identifier;
   generate a network interaction training data corpus based on the interaction data set associated with the prioritized network asset data set;
   train at least one network asset scoring model based on the network interaction training data corpus;
   determine a scored network assets data set for a selected unique profile identifier based on the trained at least one network asset scoring model; and
   provide at least a portion of the scored network assets data set associated with the selected unique profile identifier via at least one network assets serving database.

2. The apparatus according to claim 1, the apparatus further caused to:
   select the at least one network asset scoring model from a possible model set utilizing a trained multi-armed bandit model.

3. The apparatus according to claim 1, wherein the prioritized network asset data set comprises a subset of a second scored network assets data set, the subset of the second scored network assets data set comprising one or more network assets of the second scored network assets data set satisfying the asset prioritization threshold based on an arrangement of the second scored network assets data set.

4. The apparatus according to claim 3, wherein the portion of the scored network assets data set associated with the selected unique profile identifier comprises a second prioritized network asset data set arranged based on the scored network assets data set for the selected unique profile identifier.

5. The apparatus according to claim 1, wherein to provide at least the portion of the scored network assets data set associated with the selected unique profile identifier via the at least one network assets serving database, the apparatus is configured to:
   push at least the portion of the scored network assets data set associated with the selected unique profile identifier via the at least one network assets serving database; and
   cause, via interaction with the at least one network assets serving database, rendering of a network asset display interface comprising at least the portion of the scored network assets data set via a user-facing network asset transaction application on a client device.

6. The apparatus according to claim 1, wherein to provide at least the portion of the scored network assets data set associated with the selected unique profile identifier via the at least one network assets serving database, the apparatus is configured to:
   push at least the portion of the scored network assets data set associated with the selected unique profile identifier via the at least one network assets serving database; and
   cause, via interaction with the at least one network assets serving database, rendering of a user interface comprising at least the portion of the scored network assets data set via a third-party application on a client device.

7. The apparatus according to claim 1, wherein to generate the network interaction training data corpus, the apparatus is further configured to:
   generate at least one embedding space by embedding one or more of the prioritized network asset data set, user profile data associated with the selected unique profile identifier, and the enterprise network interaction data associated with the selected unique profile identifier; and
   generate the network interaction training data based on the at least one embedding space.

8. A computer-implemented method comprising:
accessing enterprise network interaction data comprising an interaction data set, wherein the interaction data set indicates at least one interaction with at least one prioritized network asset of at least one prioritized network asset data set rendered via a display comprising an arrangement of (i) the at least one prioritized network asset in the at least one prioritized network asset data set and (ii) at least one other network asset not in the at least one prioritized network asset data set,
wherein each prioritized network asset of the at least one prioritized network asset data set satisfies an asset prioritization threshold that defines a cutoff for top-ranked network asset data objects in the arrangement, and
wherein the at least one interaction is initiated by at least one user corresponding to at least one user identifier;
generating a network interaction training data corpus based on the interaction data set associated with the prioritized network asset data set;
training at least one network asset scoring model based on the network interaction training data corpus;
determining a scored network assets data set for a selected unique profile identifier based on the trained at least one network asset scoring model; and
providing at least a portion of the scored network assets data set associated with the selected unique profile identifier via at least one network assets serving database.

9. The computer-implemented method according to claim 8, the computer-implemented method further comprising:
selecting the at least one network asset scoring model from a possible model set utilizing a trained multi-armed bandit model.

10. The computer-implemented method according to claim 8, wherein the prioritized network asset data set comprises a subset of a second scored network assets data set, the subset of the second scored network assets data set comprising one or more network assets of the second scored network assets data set satisfying the asset prioritization threshold based on an arrangement of the second scored network assets data set.

11. The computer-implemented method according to claim 10, wherein the portion of the scored network assets data set associated with the selected unique profile identifier comprises a second prioritized network asset data set arranged based on the scored network assets data set for the selected unique profile identifier.

12. The computer-implemented method according to claim 8, wherein providing at least the portion of the scored network assets data set associated with the selected unique profile identifier via the at least one network assets serving database comprises:
pushing at least the portion of the scored network assets data set associated with the selected unique profile identifier via the at least one network assets serving database; and
causing, via interaction with the at least one network assets serving database, rendering of a network asset display interface comprising at least the portion of the scored network assets data set via a user-facing network asset transaction application on a client device.

13. The computer-implemented method according to claim 8, wherein providing at least the portion of the scored network assets data set associated with the selected unique profile identifier via the at least one network assets serving database comprises:
pushing at least the portion of the scored network assets data set associated with the selected unique profile identifier via the at least one network assets serving database; and
causing, via interaction with the at least one network assets serving database, rendering of a user interface comprising at least the portion of the scored network assets data set via a third-party application on a client device.

14. The computer-implemented method according to claim 8, wherein generating the network interaction training data corpus further comprises:
generating at least one embedding space by embedding one or more of the prioritized network asset data set, user profile data associated with the selected unique profile identifier, and the enterprise network interaction data associated with the selected unique profile identifier; and
generating the network interaction training data based on the at least one embedding space.

15. A computer program product comprising at least one non-transitory computer-readable storage medium having computer program code stored thereon, wherein the computer program code in execution with at least one processor configures the computer program product for:
accessing enterprise network interaction data comprising an interaction data set, wherein the interaction data set indicates at least one interaction with at least one prioritized network asset of at least one prioritized network asset data set rendered via a display comprising an arrangement of (i) the at least one prioritized network asset in the at least one prioritized network asset data set and (ii) at least one other network asset not in the at least one prioritized network asset data set,
wherein each prioritized network asset of the at least one prioritized network asset data set satisfies an asset prioritization threshold that defines a cutoff for top-ranked network asset data objects in the arrangement, and
wherein the at least one interaction is initiated by at least one user corresponding to at least one user identifier;
generating a network interaction training data corpus based on the interaction data set associated with the prioritized network asset data set;
training at least one network asset scoring model based on the network interaction training data corpus;
determining a scored network assets data set for a selected unique profile identifier based on the trained at least one network asset scoring model; and
providing at least a portion of the scored network assets data set associated with the selected unique profile identifier via at least one network assets serving database.

16. The computer program product according to claim 15, the computer program product further configured for:
selecting the at least one network asset scoring model from a possible model set utilizing a trained multi-armed bandit model.

17. The computer program product according to claim 15, wherein the prioritized network asset data set comprises a subset of a second scored network assets data set, the subset of the second scored network assets data set comprising one or more network assets of the second scored network assets data set satisfying the asset prioritization threshold based on an arrangement of the second scored network assets data set.

18. The computer program product according to claim 17, wherein the portion of the scored network assets data set associated with the selected unique profile identifier comprises a second prioritized network asset data set arranged based on the scored network assets data set for the selected unique profile identifier.

19. The computer program product according to claim 15, wherein providing at least the portion of the scored network assets data set associated with the selected unique profile identifier via the at least one network assets serving database comprises:
   pushing at least the portion of the scored network assets data set associated with the selected unique profile identifier via the at least one network assets serving database; and
   causing, via interaction with the at least one network assets serving database, rendering of a network asset display interface comprising at least the portion of the scored network assets data set via a user-facing network asset transaction application on a client device.

20. The computer program product according to claim 15, wherein generating the network interaction training data corpus further comprises:
   generating at least one embedding space by embedding one or more of the prioritized network asset data set, user profile data associated with the selected unique profile identifier, and the enterprise network interaction data associated with the selected unique profile identifier; and
   generating the network interaction training data based on the at least one embedding space.

* * * * *